United States Patent

Yamakaji et al.

Patent Number: 5,825,454
Date of Patent: Oct. 20, 1998

[54] ASPHERICAL SPECTACLE LENS

[75] Inventors: Tetsuma Yamakaji; Hua Qi; Atsuo Minato, all of Tokyo, Japan

[73] Assignee: Hoya Corporation, Tokyo, Japan

[21] Appl. No.: 782,286

[22] Filed: Jan. 13, 1997

[30] Foreign Application Priority Data

Jan. 16, 1996 [JP] Japan .................................. 8-005242
Jan. 16, 1996 [JP] Japan .................................. 8-005243

[51] Int. Cl.$^6$ ...................................................... G02C 7/02
[52] U.S. Cl. ................................................................ 351/159
[58] Field of Search .................................. 351/168, 169, 351/170, 171, 172, 159, 167

[56] References Cited

U.S. PATENT DOCUMENTS 4,784,482  11/1988  Guilino .................................. 351/169

FOREIGN PATENT DOCUMENTS

| A-52-136644 | 11/1977 | Japan . |
| A-53-84742 | 7/1978 | Japan . |
| A-53-94947 | 8/1978 | Japan . |
| A-58-24112 | 2/1983 | Japan . |
| A-59-41164 | 3/1984 | Japan . |
| A-60-15248 | 1/1985 | Japan . |
| A-61-501113 | 5/1986 | Japan . |
| A-64-040926 | 2/1989 | Japan . |
| A-64-40926 | 2/1989 | Japan . |
| A-64-50012 | 2/1989 | Japan . |
| A-2-289818 | 11/1990 | Japan . |
| A-2-289819 | 11/1990 | Japan . |
| A-5-215994 | 8/1993 | Japan . |
| A-53-84741 | 7/1978 | Jordan . |

Primary Examiner—Scott J. Sugarman
Attorney, Agent, or Firm—Oliff & Berridge, PLC

[57] ABSTRACT

An aspherical spectacle lens that has a pair of first and second refractive surfaces, one or both of which have an aspherical shape. In this lens, the first refractive surface and/or the second refractive surface is defined by the following equation:

$$X(\rho) = \frac{C\rho^2}{1 + \sqrt{1 - C^2\rho^2 k}} + \sum_{i=1}^{n} A_{m_i}\rho^{m_i}$$

where $m_i$ designates a real number which is not less than 2; $n$ an integer which is not less than 1; $X$ a length of a perpendicular drawn from a point, which is positioned on the aspherical surface and is located at a distance $\rho$ from an optical axis, to a meridional plane, which contacts the aspherical surface at a vertex thereof; $C$ curvature at the vertex of the aspherical surface; $\rho$ a distance from the optical axis; $k$ what is called a cone constant; and $A_{mi}$ what is called an aspherical-surface coefficient of $\rho^{mi}$. Thus, there is provided an aspherical spectacle lens in which decentration aberration is small. Moreover, the design of the lens is performed by taking oblique astigmatic error and mean oblique error due to decentration into consideration. Thus, the performance degradation due to the decentration occurring in the aspherical lens can be reduced.

14 Claims, 73 Drawing Sheets

F I G. 2
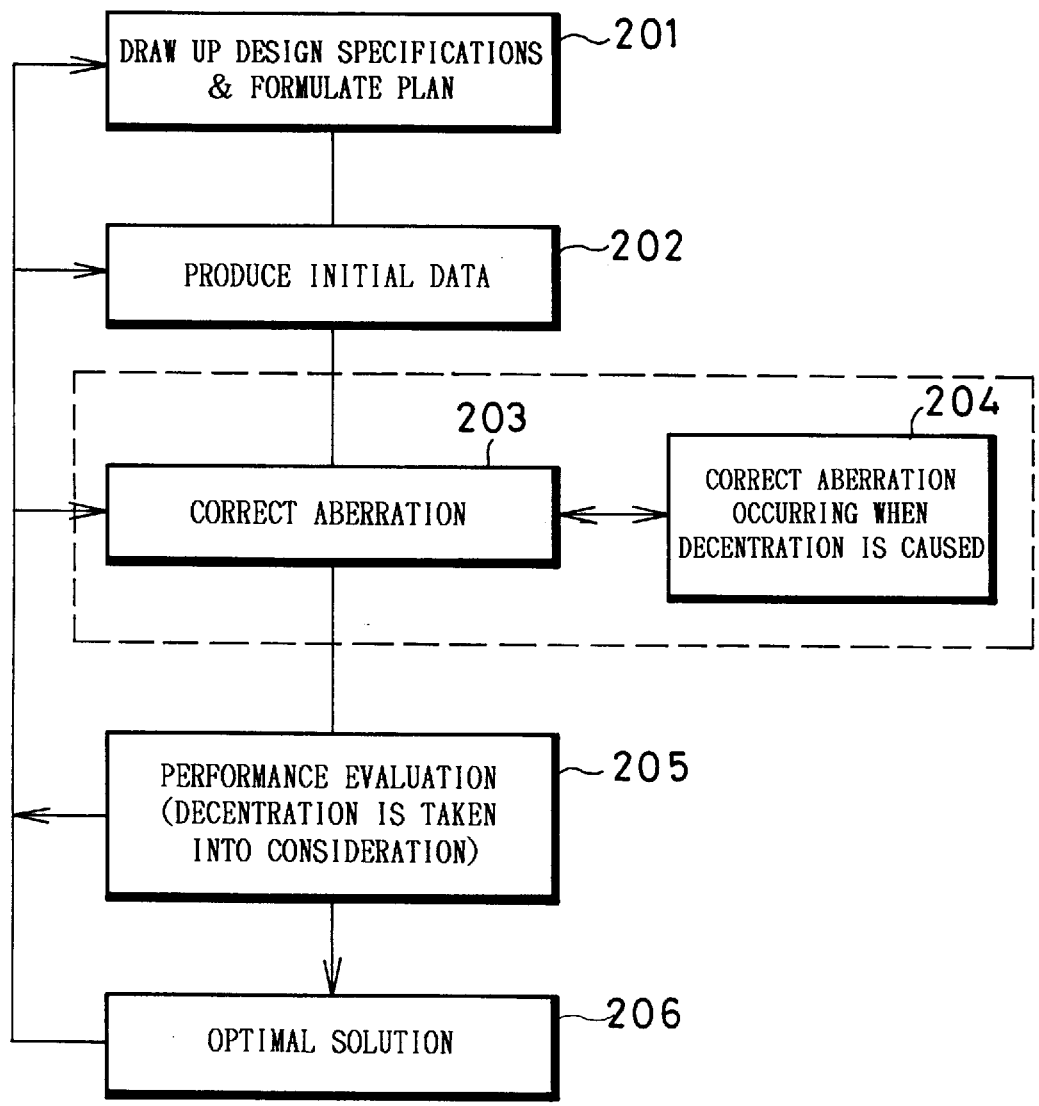

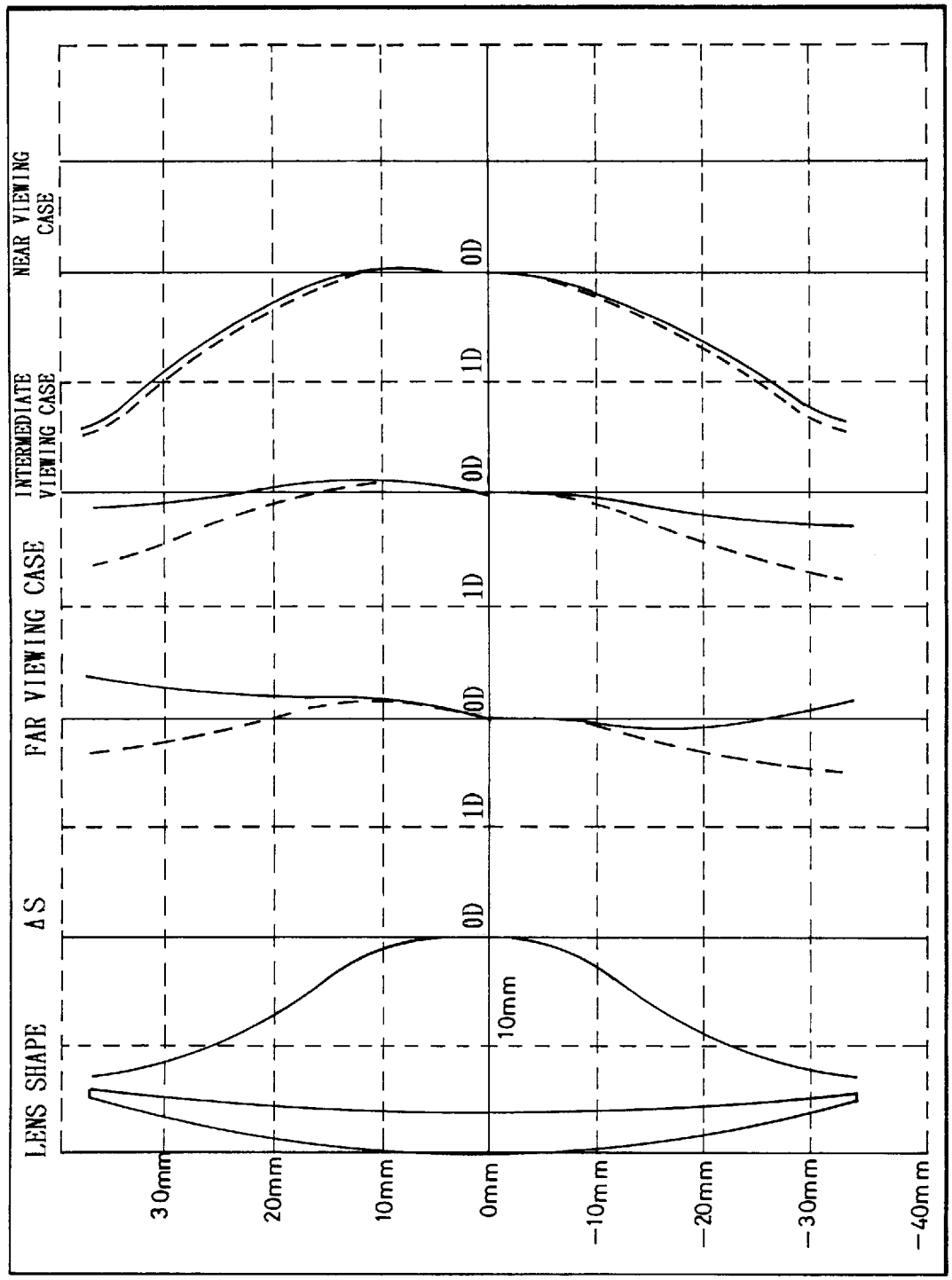
F I G. 3

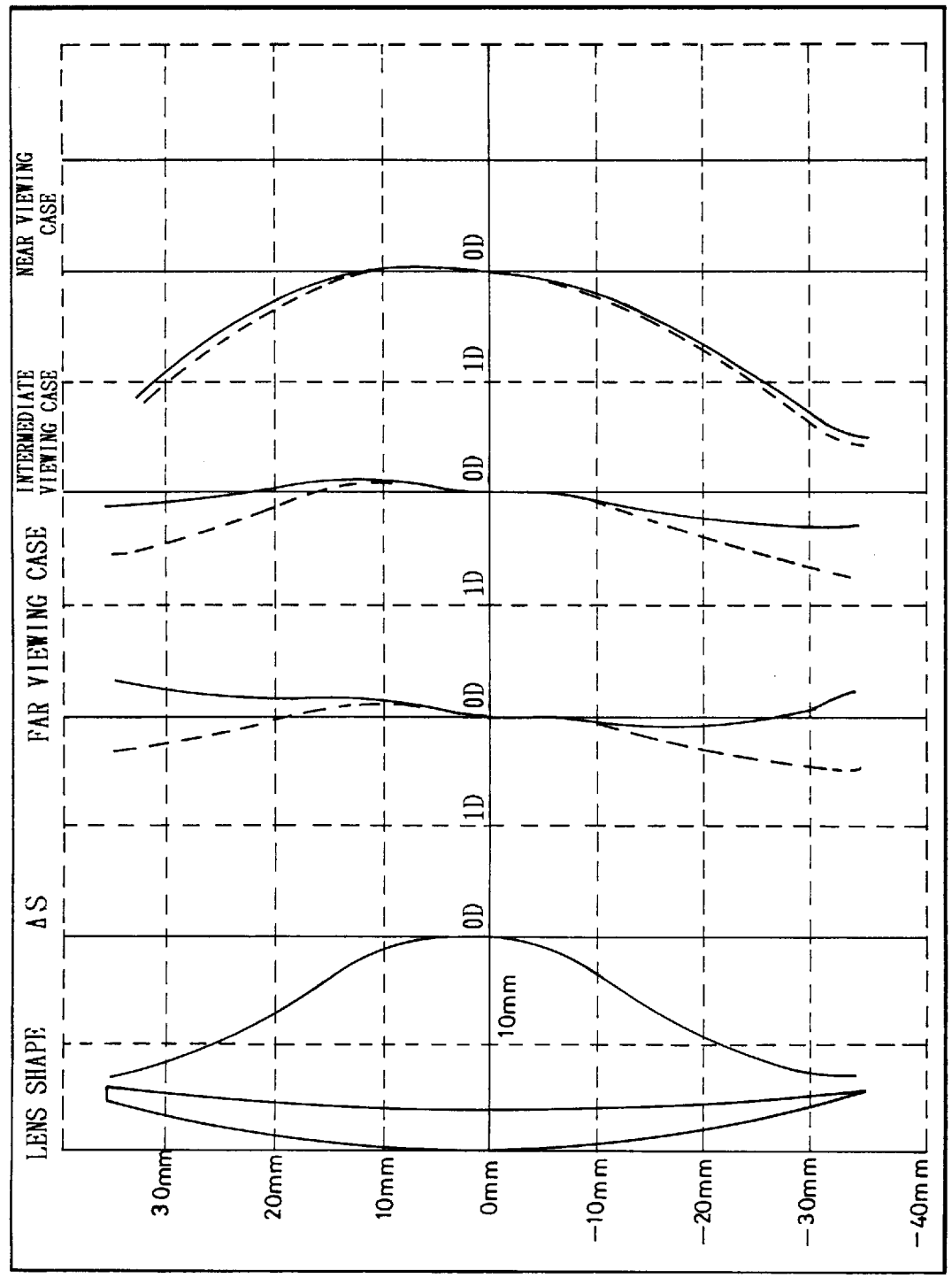

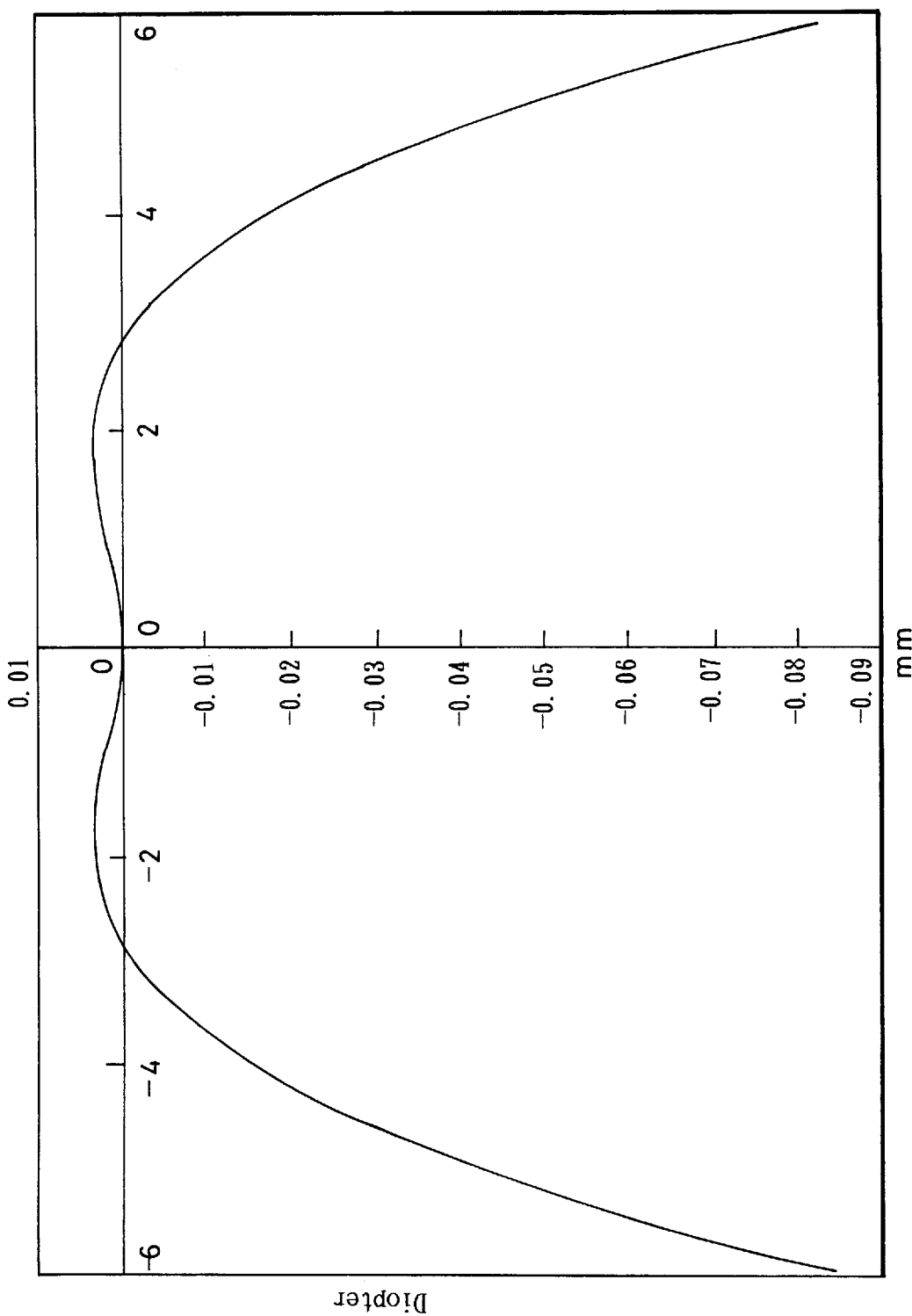

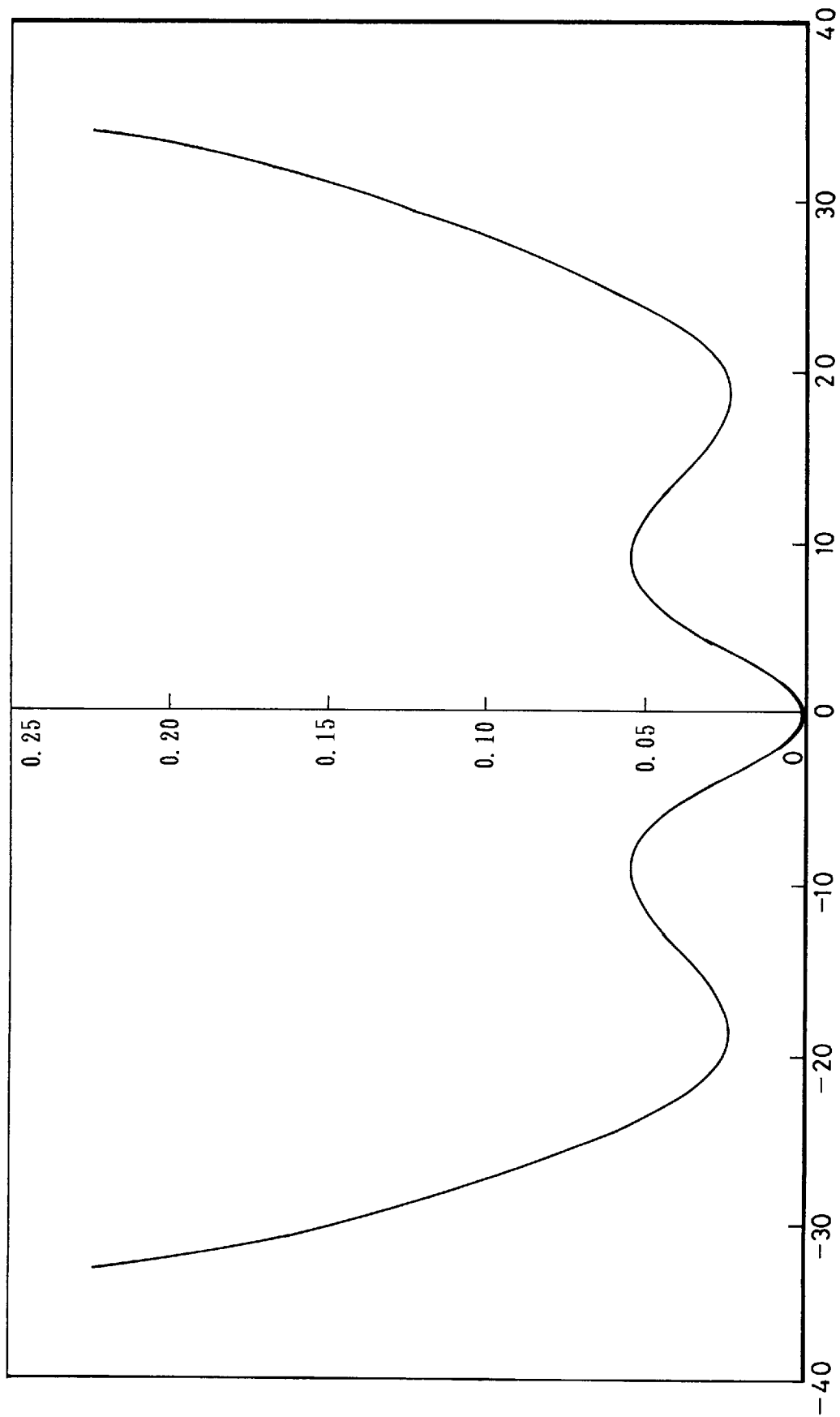

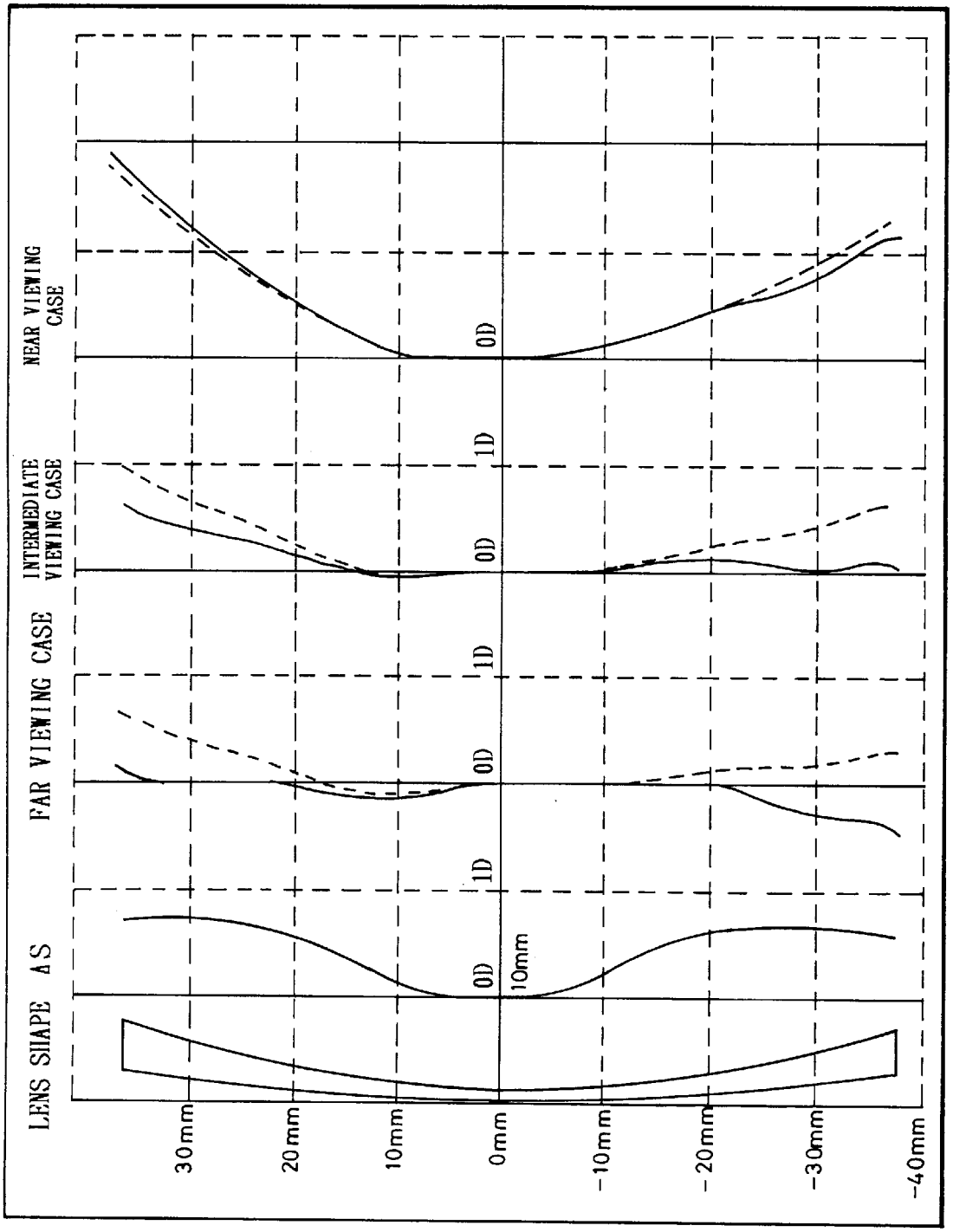
F I G. 34

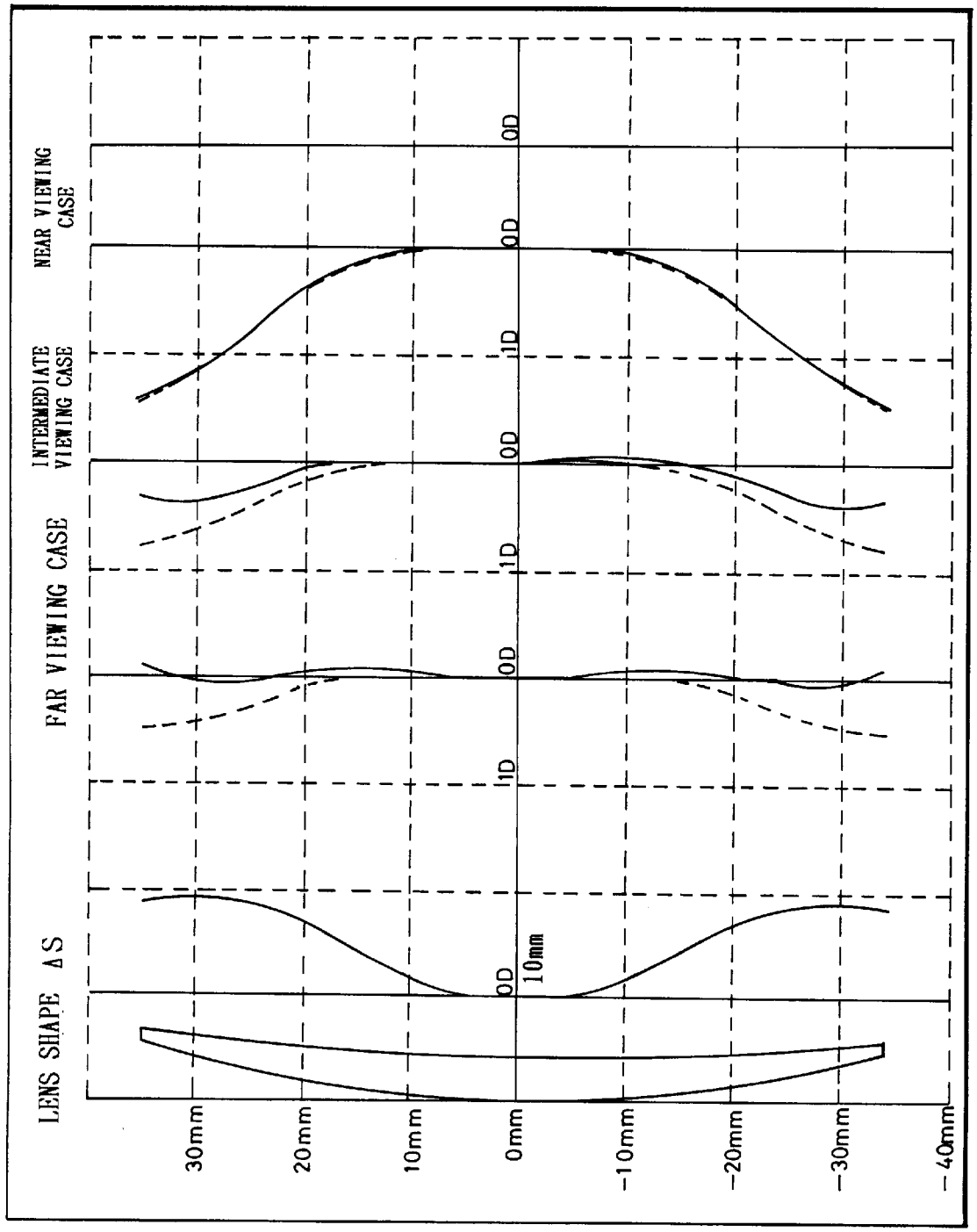

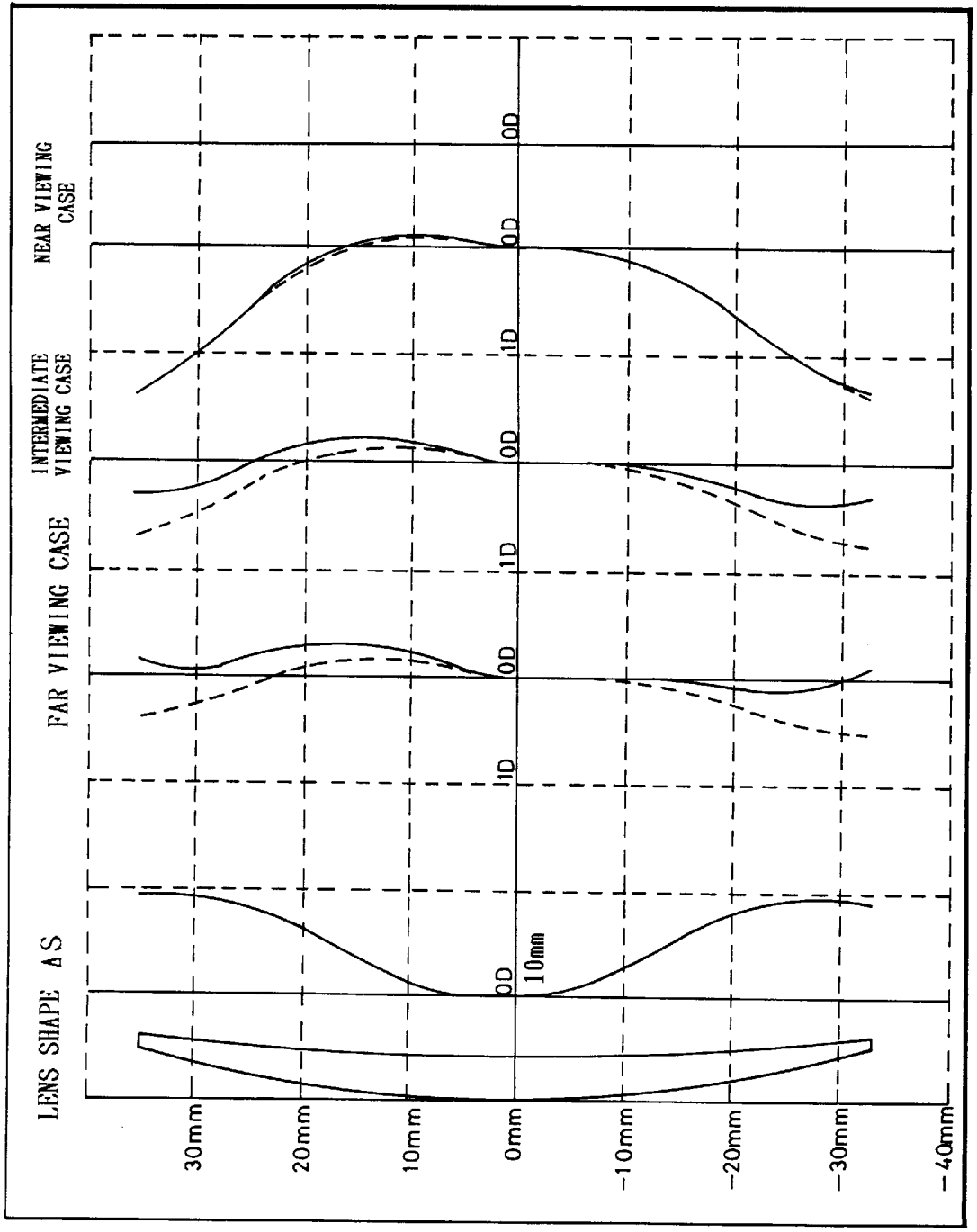
F I G. 5 1

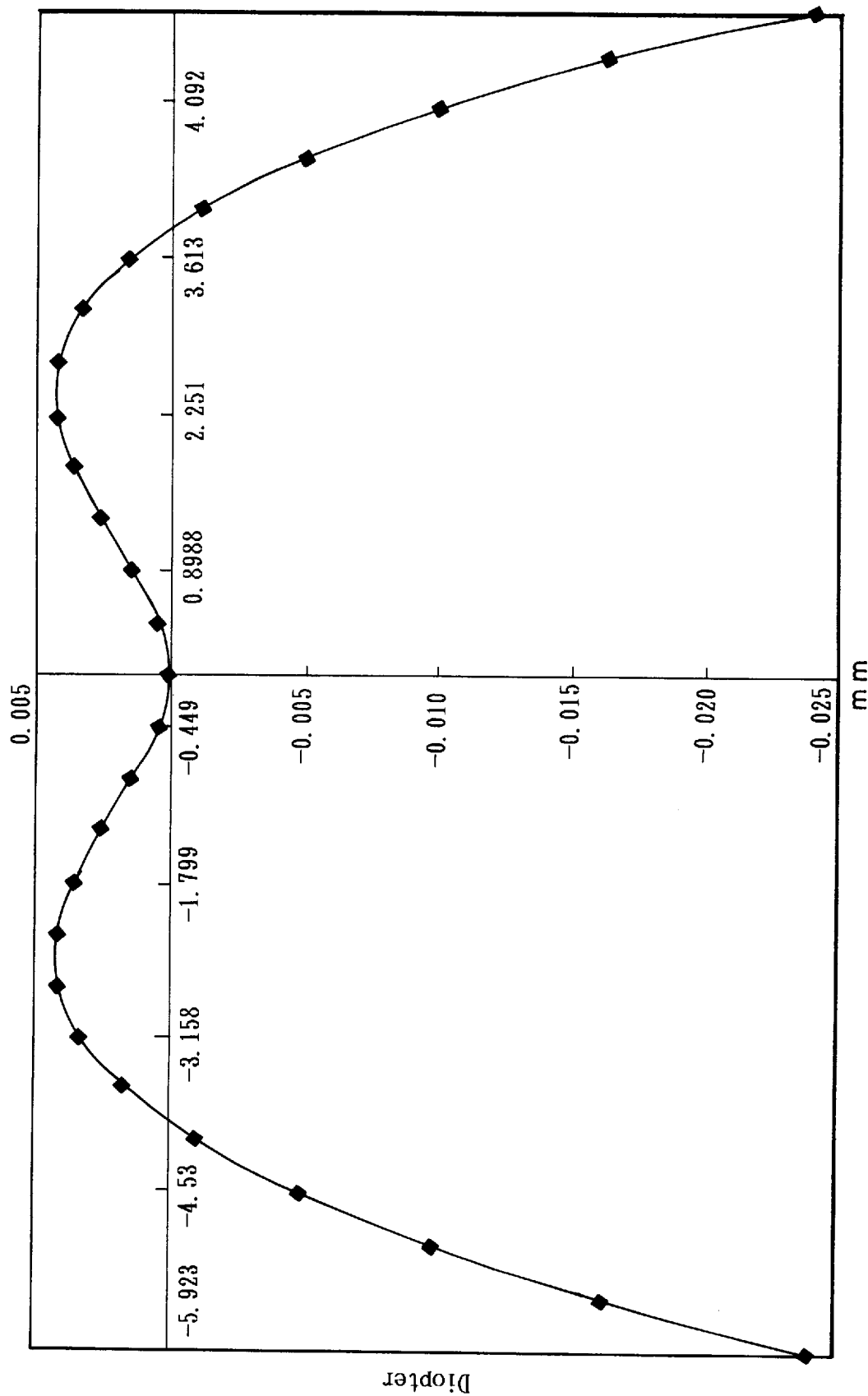
F I G. 5 9

ASPHERICAL SPECTACLE LENS

BACKGROUND OF THE INVENTION

1. Field of The Invention

The present invention relates to an aspherical single-vision spectacle lens having a pair of first and second refracting surfaces, each of which has an aspherical shape.

2. Description of The Related Art

Most of conventional spectacle lenses are produced in view of easiness of machining (or processing) thereof so that both of first and second refractive (or refracting) surfaces (hereunder sometimes referred to simply as first and second surfaces) thereof have spherical shapes. In the case of such spherical spectacle lenses, when the refractive power (namely, the spectacle refraction) of the lens and the refractive index of a material thereof are determined, a base surface power (namely, the refractive power of the first surface of the lens), which can be used to restrict aberration within a permissible range thereof, is automatically determined (namely, such a refractive power of the first surface of the lens is limited to within a specific range thereof).

In the case of a spectacle lens for correcting hyperopia (or hypermetropia), the thickness thereof (particularly, the center thickness thereof (namely, the thickness of the central portion thereof)) increases rapidly with increase in the refractive power thereof. This is undesirable from the viewpoint of the external appearance of such a spectacle lens.

To solve this problem, there have been proposed several spectacle lenses, at least one of the refractive surfaces of each of which is formed in such a manner as to have an aspherical shape with a view to obtaining a lens, whose (center) thickness is smaller than that of a lens having a same refractive power (see the Japanese Patent Laying-open Nos. 52-136644/1979, 58-24112/1983, 60-15248/1985, 64-40926/1989 and 2-289819/1990 Official Gazettes).

Further, in the case of a spectacle lens for correcting myopia, the thickness thereof (particularly, the edge thickness thereof (namely, the thickness of the peripheral portion thereof)) increases rapidly with increase in the refractive power thereof. This is undesirable from the viewpoint of the external appearance of such a spectacle lens.

In order to solve this problem, there have been proposed several spectacle lenses, at least one of the refractive surfaces of each of which is formed in such a manner as to have an aspherical shape with a view to obtaining a lens, whose (edge) thickness is smaller than that of a lens having a same refractive power (see the Japanese Patent Laying-open Nos. 5-215994/1993, 2-289818/1990, 64-50012/1989, 59-41164/1984, 53-94947/1978, 53-84742/1978 and 53-84741/1978 Official Gazettes).

It is effective in reduction in the center or edge thickness of a spectacle lens to form at least one of the refractive surfaces of the spectacle lens in an aspherical shape. The conventional aspherical lenses, however, have problems in that the curvature at a place on the refractive surface of such a lens changes from a value corresponding to the optical axis thereof if the place is off from the optical axis thereof, that a change in the refractive power due to the deviation of the optical axis thereof is liable to increase, that when the refractive power is measured by a lensmeter (or lensometer), it is very difficult to measure the refractive power at the optical center thereof in a state in which no decentration is caused, and that thus a measurement error due to the deviation of the optical axis (namely, due to the decentration) thereof at the time of measuring the refractive power is apt to occur.

Usually, when a wearer wears eyeglasses or spectacles, the lenses are prone to be decentered 1 mm or so owing to errors of the machining (or processing) and centering thereof and to the decentration thereof caused by the spectacle frame. Further, when forming the lens, the lens decentration is caused owing to errors of the fitting an upper mold (or die) into a lower die and to the relative displacement therebetween. Decentration aberration occurring at such a time in a peripheral portion of an aspherical lens is larger than that occurring in a peripheral portion of a spherical lens. This results in deterioration in the optical performance of an aspherical lens. Consequently, there is the necessity of reducing the machining tolerance of the aspherical spectacle lens considerably. High-precision machining techniques are, therefore, required to produce the aspherical spectacle lens.

It is, accordingly, an object of the present invention to provide an aspherical spectacle lens that has a refractive power, which can be measured easily to the same extent as the case of measuring the refractive power of a spherical spectacle lens, and that undergoes little performance degradation and excels at wearing stability, by ensuring that decentration caused therein is within a decentration tolerance.

SUMMARY OF THE INVENTION

To achieve the foregoing object, in accordance with an aspect of the present invention, there is provided a single-vision aspherical spectacle lens (hereunder sometimes referred to as a first single-vision aspherical spectacle lens of the present invention) that has a pair of first and second refractive surfaces, one or both of which have an aspherical shape. In this lens, the first surface and/or the second surface is defined by the following equation (1):

$$X(\rho) = \frac{C\rho^2}{1 + \sqrt{1 - C^2\rho^2 k}} + \sum_{i=1}^{n} A_{m_i}\rho^{m_i} \tag{1}$$

where mi designates a real number which is not less than 2; n an integer which is not less than 1; X a length of a perpendicular dropped or drawn from a point, which is positioned on the aspherical surface and is located at a distance ρ from an optical axis, to a meridian plane (or meridional plane), which contacts (or touches) the aspherical surface at a vertex thereof; C curvature of a reference spherical surface at the vertex of the aspherical surface; ρ a distance from the optical axis; k a cone constant (namely, a conic constant); and $A_{mi}$ what is called an aspherical-surface coefficient of $\rho^{mi}$.

In the case of an embodiment (hereunder sometimes referred to as a second single-vision aspherical spectacle lens of the present invention) of the first single-vision aspherical spectacle lens of the present invention, the numbers n and mi take the following values.

Namely, n=7, m=2, m2=3, m3=4, m4=5, m5=6, m6=7 and m7=8.

In the case of an embodiment (hereunder sometimes referred to as a third single-vision aspherical spectacle lens of the present invention) of the first or second single-vision aspherical spectacle lens of the present invention, the number mi is defined by:

$$mi = a + (i-1)b$$

incidentally, a>2.0, b>0 but b≠an integer.

In the case of an embodiment (hereunder sometimes referred to as a fourth single-vision aspherical spectacle lens of the present invention) of the third single-vision aspherical spectacle lens of the present invention, the numbers a, b and n take the following values, respectively:

$$a=4.0; b=0.7; \text{ and } n=4$$

In the case of an embodiment (hereunder sometimes referred to as a fifth single-vision aspherical spectacle lens of the present invention) of the first single-vision aspherical spectacle lens of the present invention, the first refractive surface thereof is defined by the equation. Here, let S(ρ) denote the meridional surface power of the first refractive surface, which is defined as follows:

$$S(\rho) = (n_e - 1) \frac{\frac{d^2X}{d\rho^2}}{\left\{ 1 + \left\{ \frac{dX}{d\rho} \right\}^2 \right\}^{3/2}}$$

where $n_e$ designates the refractive index. Further, the refractive power D (in diopters) thereof and the distance ρ (in mm) meets the following conditions:

$$-6.0 \leq D \leq 6.0 \text{ and } 0 < \rho \leq 5,$$

the difference ΔS (=S(ρ)–S(0)) of a meridional surface power S(ρ) (in diopters) of the first refractive surface between the place at the distance ρ and the vertex satisfies the following condition:

$$-0.05 \leq \Delta S \leq 0.05.$$

In the case of an embodiment (hereunder sometimes referred to as a sixth single-vision aspherical spectacle lens of the present invention) of the first single-vision aspherical spectacle lens of the present invention, the second refractive surface of this embodiment is defined by the equation. Here, let S(ρ) denote the meridional surface power of the second refractive surface, which is defined as follows:

$$S(\rho) = (n_e - 1) \frac{\frac{d^2X}{d\rho^2}}{\left\{ 1 + \left\{ \frac{dX}{d\rho} \right\}^2 \right\}^{3/2}}$$

where $n_e$ designates the refractive index. Further, the refractive power D (in diopters) thereof and the distance ρ (in mm) meets the following conditions:

$$-6.0 \leq D \leq 6.0 \text{ and } 0 < \rho \leq 5,$$

the difference ΔS (=S(ρ)–S(0)) of a meridional surface power S(ρ) (in diopters) of the second refractive surface between the place at the distance ρ and the vertex satisfies the following condition:

$$-0.05 \leq \Delta S \leq 0.05.$$

When taking the decentration of the aspherical spectacle lens into consideration, if the distance ρ and the difference ΔS are not within the corresponding ranges in the case of the conditions of the fifth and sixth single-vision aspherical spectacle lenses of the present invention, respectively, the oblique astigmatic error and the mean oblique error, which occur in the vicinity of the optical axis of the lens when the decentration is caused, cannot be made to be sufficiently small. Namely, by setting the difference ΔS at a value, which is so small that the difference ΔS can be neglected, within a 10-mm radius from the optical axis of the lens (incidentally, 0<ρ5 (mm)), the oblique astigmatic error and the mean oblique error at the time of an occurrence of the decentration can be made to be sufficiently small.

When the refractive power D (in diopters) of the lens meets the condition: $-6.0 \leq D \leq 6.0$, if the difference ΔS is set in such a manner as to satisfy the condition: $-0.05 \leq \Delta S \leq 0.05$ in the case that the distance ρ is within and outside the range 0<ρ≦5 (mm) (namely, even in the case that the distance ρ is in a region where ρ>5 (mm)), the oblique astigmatic error cannot be corrected in the far-viewing case within a range, which has a diameter of 40 mm, around the optical axis of the lens (incidentally, in the range where 0<ρ≦20 (mm)) in such a way that the oblique astigmatic error is between ±0.15 (in diopters). Moreover, the mean oblique error cannot be corrected in the far-viewing case within a range, which has a diameter of 30 mm, around the optical axis of the lens (incidentally, in the range where 0<ρ≦15 (mm)) in such a manner that the mean oblique error is between ±0.20 (in diopters).

Additionally, it is further preferable that the refractive power D (in diopters) of the lens meets the condition: $-3.0 \leq D \leq 3.0$ and that the difference ΔS satisfies the following condition: $-0.05 \leq \Delta S \leq 0.05$ in the range where 0<ρ≦7 (mm).

When the refractive power D (in diopters) of the lens meets the condition: $-3.0 \leq D \leq 3.0$, if the difference ΔS is set in such a manner as to satisfy the condition: $-0.05 \leq \Delta S \leq 0.05$ in the case that the distance ρ is within and outside the range 0<ρ≦7 (mm) (namely, even in the case that the distance ρ is in a region where ρ>7 (mm)), the oblique astigmatic error cannot be corrected in the far-viewing case in a range, which having a diameter of 40 mm, around the optical axis of the lens (namely, in the range where 0<ρ≦20 (mm)) in such a way that the oblique astigmatic error is between ±0.125 (in diopters). Moreover, the mean oblique error cannot be corrected in the far-viewing case within a range, which has a diameter of 30 mm, around the optical axis of the lens (incidentally, in the range where 0<ρ≦15 (mm)) in such a manner that the mean oblique error is between ±0.10 (in diopters).

In the case of an embodiment (hereunder sometimes referred to as a seventh single-vision aspherical spectacle lens of the present invention) of the first single-vision aspherical spectacle lens of the present invention, the first refractive surface of this embodiment is defined by the aforementioned equation (1). Further, the second refractive surface thereof has a spherical shape. The refractive power thereof is positive. Moreover, the difference ΔS(ρ) of the first refractive surface takes a positive value at least once in the following range of the distance ρ: 0<ρ≦5 (mm). Furthermore, the difference ΔS(ρ) of the first refractive surface takes a negative value in the peripheral portion of the lens.

In the case of an embodiment (hereunder sometimes referred to as an eighth single-vision aspherical spectacle lens of the present invention) of the first single-vision aspherical spectacle lens of the present invention, the first refractive surface of this embodiment is defined by the aforementioned equation (1). Further, the second refractive surface thereof has a spherical shape. The refractive power thereof is negative. Moreover, the difference ΔS(ρ) of the first refractive surface takes a negative value at least once in the following range of the distance ρ: 0<ρ≦5 (mm). Furthermore, the difference ΔS takes a positive value in the peripheral portion of the lens.

In the case of an embodiment (hereunder sometimes referred to as a ninth single-vision aspherical spectacle lens of the present invention) of the first single-vision aspherical spectacle lens of the present invention, the first refractive surface thereof has a spherical shape. Further, the second refractive surface of this embodiment is defined by the aforementioned equation (1). The refractive power thereof is positive. Moreover, the difference $\Delta S(\rho)$ of the second refractive surface takes a positive value at least once in the following range of the distance $\rho$: $0<\rho\leq 5$ (mm). Furthermore, the difference $\Delta S(\rho)$ of the second refractive surface takes a negative value in the peripheral portion of the lens.

In the case of an embodiment (hereunder sometimes referred to as a tenth single-vision aspherical spectacle lens of the present invention) of the first single-vision aspherical spectacle lens of the present invention, the first refractive surface of this embodiment has a spherical shape. Further, the second refractive surface thereof is defined by the equation. The refractive power thereof is negative. Moreover, the difference $\Delta S(\rho)$ of the second refractive surface takes a negative value at least once in the following range of the distance $\rho$: $0<\rho\leq 5$ (mm). Furthermore, the difference $\Delta S(\rho)$ of the second refractive surface takes a positive value in the peripheral portion of the lens.

In the case of an embodiment (hereunder sometimes referred to as an eleventh single-vision aspherical spectacle lens of the present invention) of the first single-vision aspherical spectacle lens of the present invention, one of the first and second refractive surfaces is defined by the aforementioned equation (1) Further, the curvature of a reference spherical surface at the vertex of the aspherical surface corresponding to the refractive surface defined by the aforementioned equation (1) is larger than that of a reference spherical surface at the vertex of the aspherical surface corresponding to the other refractive surface.

In the case that the refractive power of the lens is positive, the curvature of the first refractive surface is larger than that of the second refractive surface. Therefore, in the case when the lens shape is determined by equally balancing between the astigmatic errors, the (center) thickness of the lens in the case of defining the first refractive surface according to the aforementioned equation and shaping the second refractive surface into a spherical surface can be made to be further smaller than that of the lens in the case of defining the second refractive surface according to the aforementioned equation and shaping the first refractive surface into a spherical surface.

Similarly, in the case that the refractive power of the lens is negative, the curvature of the second refractive surface is larger than that of the first refractive surface. Therefore, in the case when the lens shape is determined by equally balancing between the astigmatic errors, the edge thickness of the lens in the case of defining the second refractive surface according to the aforementioned equation and shaping the first refractive surface into a spherical surface can be made to be further smaller than that of the lens in the case of defining the first refractive surface according to the aforementioned equation and shaping the second refractive surface into a spherical surface.

In accordance with another aspect of the present invention, there is provided a single-vision aspherical spectacle lens (hereunder sometimes referred to as a twelfth single-vision aspherical spectacle lens of the present invention) that has a pair of first and second refractive surfaces, one or both of which have an aspherical shape. The shape of this lens is determined in a design phase or stage by taking decentration of the aspherical lens into consideration.

In the case of an embodiment (hereunder sometimes referred to as a thirteenth single-vision aspherical spectacle lens of the present invention) of the twelfth single-vision aspherical spectacle lens of the present invention, an initial shape of the aspherical spectacle lens is determined in the design stage. Then, the shape of the lens is further determined by calculating an oblique astigmatic error and/or a mean oblique error in the case when no decentration is caused, and also calculating an oblique astigmatic error and/or a mean oblique error in the case when decentration is caused, by performing a ray tracing (method) so that performance degradation due to decentration is small.

In the case of an embodiment (hereunder sometimes referred to as a fourteenth single-vision aspherical spectacle lens of the present invention) of the twelfth single-vision aspherical spectacle lens of the present invention, the decentration, the range of which is at least in the following range:

$$0.04 \leq (K/H) \leq 0.08$$

where K designates a vertical change (mm); and H a maximum outside-diameter (mm), in the design stage.

Oblique Astigmatic Error (OAE) is defined by the following equation:

Oblique Astigmatic Error $(OAE) = F_m - F_s$ where $F_m$ (in diopters) denotes the refractive power in the direction of a meridional (or tangential) plane; and $F_s$ (in diopters) the refractive power in the direction of a sagittal plane.

Further, Mean Oblique Error (MOE) is defined by the following equation from the aforementioned conditions:

$$MOP = \frac{1}{2}(F_m + F_s)$$

Mean Oblique Error (MOE)=MOP−D where D represents the refractive power of the lens.

Moreover, the meridional plane is a plane which includes the optical axis and the principal (or chief) ray. Furthermore, a sagittal plane is a plane which is perpendicular to the meridional plane.

As above described, in accordance of the present invention, the shape of the first or second surface of an aspherical spectacle lens is defined according to the equation (1). Thereby, the center or edge thickness of the lens can be made to be thinner than that of a spherical lens. Consequently, there can be obtained an aspherical lens that excels in the wearing stability thereof.

Further, the design of the lens is performed by taking an oblique astigmatic error and/or a mean oblique error, which is caused owing to decentration, into consideration. Thus, the performance degradation due to the decentration occurring in the aspherical lens can be lowered or reduced. Consequently, measurement error due to decentration can be reduced.

Moreover, there can be produced an aspherical spectacle lens, the performance degradation of which is small even if the diameter and the refractive index thereof is changed.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 2 is a flowchart for illustrating the process of the design of the aspherical spectacle lens of the present invention;

FIG. 3 is a graph for showing the relation among the shape of the positive-refractive-power aspherical spectacle lens (namely, the first embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case;

FIG. 4 is a graph for showing the relation among the shape of the positive-refractive-power aspherical spectacle lens (namely, the first embodiment of the present invention), in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case;

FIG. 5 is a graph for showing the difference ΔS caused in the positive-refractive-power aspherical spectacle lens (namely, the first embodiment of the present invention);

FIG. 6 is a graph for showing the oblique astigmatic error caused in the positive-refractive-power aspherical spectacle lens (namely, the first embodiment of the present invention);

FIG. 34 is a graph for showing the relation among the shape of the negative-refractive-power aspherical spectacle lens (namely, the sixth embodiment of the present invention), in which only one of the refractive surfaces, namely, the first surface is shifted from the optical axis by 2 mm, the difference ΔS caused therein, oblique astigmatic error caused therein in the far-viewing case, the oblique astigmatic error caused therein in the intermediate-viewing case and the oblique astigmatic error caused therein in the near-viewing case;

FIG. 50 is a graph for showing the relation among the shape of a positive-refractive-power aspherical spectacle lens (namely, a ninth embodiment of the present invention), in which no decentration is caused, the difference ΔS caused therein, the oblique astigmatic error caused therein in the far-viewing case, the mean astigmatic error caused therein in the intermediate-viewing case and the oblique astigmatic error caused therein in the near-viewing case;

FIG. 51 is a graph for showing the relation among the shape of this positive-refractive-power aspherical spectacle lens (namely, the ninth embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case;

FIG. 59 is a graph for showing the difference ΔS caused in the negative-refractive-power aspherical spectacle lens (namely, the tenth embodiment of the present invention);

DETAILED DESCRIPTION OF THE PREFERRED EMBODIMENTS

Hereinafter, the preferred embodiments of the present invention will be described in detail by referring to the accompanying drawings.

First, positive-refractive-power aspherical spectacle lenses embodying the present invention will be described hereinbelow.

First Embodiment

Figure 1:
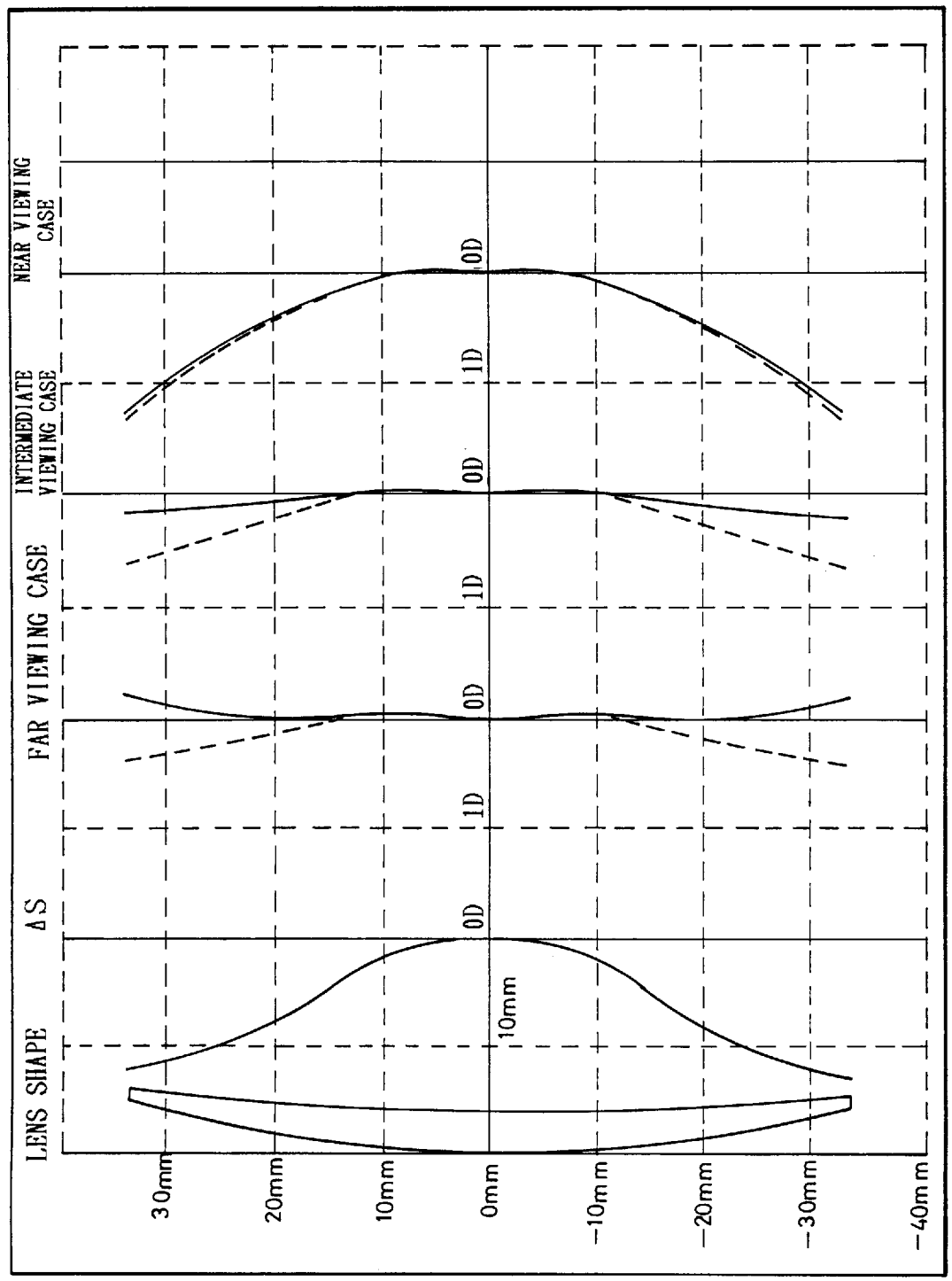
FIG. 1 is a graph for showing the relation among the shape of a positive-refractive-power aspherical spectacle lens (namely, a first embodiment of the present invention), the difference ΔS caused therein, the oblique astigmatic error caused therein in the case of viewing long-distance places (hereunder sometimes referred to simply as the far-viewing case), the oblique astigmatic error caused therein in the case of viewing middle-distance places (hereunder sometimes referred to simply as the intermediate-viewing case) and the oblique astigmatic error caused therein in the case of viewing short-distance places (hereunder sometimes referred to simply as the near-viewing case)

FIG. 1 illustrates the relation among the (lens) shape of a positive-refractive-power aspherical spectacle lens (namely, the first embodiment of the present invention) in which no decentration is caused, the difference ΔS, the oblique astigmatic error and the mean oblique error caused therein in the case of viewing long-distance (or infinite-distance) places (hereunder sometimes referred to simply as the case of far (or infinite (vision)) viewing), the oblique astigmatic error and the mean oblique error caused therein in the case of viewing middle-distance places (namely, in the case of viewing places located at a distance of 1 m (hereunder sometimes referred to simply as the case of intermediate (or 1-m) viewing)) and the oblique astigmatic error and the mean oblique error caused therein in the case of viewing short-distance places (namely, in the case of viewing places located at a distance of 0.3 m (hereunder sometimes referred to simply as the case of near (or 0.3-m (vision)) viewing). Here, the difference ΔS is corresponding to the first surface. In the graphs of FIG. 1 respectively corresponding to the case of viewing long-distance places, that of viewing middle-distance places and that of viewing short-distance places, solid curves represent oblique astigmatic errors, and broken (or dashed) curves represent mean oblique errors. Incidentally, in the graphs of ΔS and the oblique astigmatic errors and the mean oblique errors in the cases of viewing long-distance places, of viewing middle-distance places and of viewing short-distance places, abscissas or abscissae are represented in units of diopters.

The first surface of the positive-refractive-power aspherical spectacle lens of FIG. 1 is defined by the following equation (2):

$$X(\rho) = C\rho^2/(1 + \sqrt{1 - C^2\rho^2 k}) + A_2\rho^2 + A_3\rho^3 + \quad (2)$$
$$A_4\rho^4 + A_5\rho^5 + A_6\rho^6 + A_7\rho^7 + A_8\rho^8$$

where X designates a length of a perpendicular dropped or drawn from a point, which is positioned on the aspherical surface and is located at a distance ρ from the optical axis thereof, to a meridionl plane, which contacts the aspherical surface at a vertex thereof; C the curvature of a reference spherical surface at the vertex of the aspherical surface; ρ a distance from the optical axis; k a cone (or conic) constant; $A_2$ an aspherical coefficient of $\rho^2$; $A_3$ an aspherical coefficient of $\rho^3$; $A_4$ an aspherical coefficient of $\rho^4$; $A_5$ an aspherical coefficient of $\rho^5$; $A_6$ an aspherical coefficient of $\rho^6$; $A_7$ an aspherical coefficient of $\rho^7$; and $A_8$ an aspherical coefficient of $\rho^8$.

A first term of the right side of the equation (2) represents a conicoid (namely, a quadratic surface) of revolution; and second to eighth terms thereof represent a displacement or deviation from the quadratic surface thereof.

Further, the second refractive surface of the positive-refractive-power aspherical spectacle lens of FIG. 1 has a spherical shape.

Moreover, in the case of the positive-refractive-power aspherical spectacle lens of FIG. 1, the design thereof in a starting stage is performed by taking decentration aberration, which is caused when this lens is "shifted" 4 mm from the optical axis thereof (incidentally, decentration in a direction perpendicular to the optical axis thereof is called "a shift"), into consideration as a target value of optimization, in addition to a usual target value of optimization. Moreover, the design of this lens is performed by further taking decentration aberration, which is caused when only the first surface of this lens is "shifted" 4 mm from the optical axis thereof, into consideration as a target value of optimization.

The procedure of designing a positive-refractive-power aspherical spectacle lens by taking decentration into consideration will be described hereinbelow with reference to a flowchart of FIG. 2.

First, the design specifications of the positive-refractive-power aspherical spectacle lens are drawn up. Further, a plan or plot is formulated (in step 201). Then, the refractive-power and the material (thus, the refractive index) of the lens are determined. Further, initial data for the equation (2) is produced (in step 202).

At that time, the initial data is produced in such a manner that the first surface is spherical. Incidentally, the initial data is arbitrary. Thus, the initial data may be produced so that the first surface is aspherical.

Subsequently, an oblique astigmatic error and a mean oblique error, which are caused when no decentration occurs, are calculated by performing the ray tracing method (in step 203). Further, an oblique astigmatic error and a mean oblique error, which are caused when decentration occurs, are calculated by performing the ray tracing method (in step 204).

Thereafter, the evaluation of the performance of the positive-refractive-power aspherical spectacle lens is performed according to the oblique astigmatic error and the mean oblique error obtained by the ray tracing method (in step 205). At that time, the performance evaluation is performed by taking the oblique astigmatic error and the mean oblique error, which occur when decentration is caused and which are obtained in step 204, into consideration.

Thus, the operations to be performed in steps 203, 204 and 205 are repeated the desired number of times. Thereby, each of the coefficients of the equation (2) is determined. Hence, an optimum solution for the positive-refractive-power aspherical spectacle lens is obtained. Consequently, the shape of the lens is determined (in step 206).

Further, the refractive-power, diameter, refractive index and shape of the positive-refractive-power aspherical spectacle lens of FIG. 1, whose first surface (namely, the left-side surface as shown in FIG. 1) is an aspherical surface defined by the equation (2), are presented in the following "TABLE 1".

TABLE 1

| Refractive Power: | 3.0 D |
| Lens Diameter: | φ70 mm |
| Refractive Index ($n_e$): | 1.501 |
| Center Thickness: | 4.05 mm |
| Front-surface Curvature: | $8.87439 \times 10^{-3}$ |
| Back-surface Curvature: | $2.99401 \times 10^{-3}$ |
| Aspherical Coefficients: | |
| $A_2 = 0.00000$ | |
| $A_3 = 0.00000$ | |
| $A_4 = 2.74261 \times 10^{-7}$ | |
| $A_5 = -6.94380 \times 10^{-8}$ | |
| $A_6 = 2.79060 \times 10^{-9}$ | |
| $A_7 = -4.83308 \times 10^{-11}$ | |
| $A_8 = -3.22705 \times 10^{-13}$ | |

Although an optimum solution is obtained in the case of the conventional lens by using only the aspherical coefficients of even degrees (or orders) as parameters, the aspherical coefficients of odd degrees are also used as parameters in the case of this embodiment of the present invention and thus, the necessity of using the aspherical coefficients of higher degrees is eliminated. If the aspherical coefficients of higher degrees are used as parameters, it is very difficult to balance target (or desired) oblique astigmatic error and target mean oblique error with oblique astigmatic error and mean oblique error, which occur when the decentration is caused, respectively. In contrast, in the case of this embodiment of the present invention, the use of the aspherical coefficients of odd degrees as parameters facilitates the balancing of the target errors against the errors occurring upon causing the decentration.

In the case of this embodiment of the present invention, the decentration corresponding to the ratio (K/H)=4/70= 0.057 (incidentally, K designates a vertical change in decentration (namely, an amount of the shift taken into account when designing the lens (mm); and H a maximum outside-diameter (namely, a lens diameter) (mm)) is taken into consideration.

Referring next to FIG. 3, there is shown the relation among the (lens) shape of the positive-refractive-power aspherical spectacle lens of FIG. 1, which is "shifted" 2 mm from the optical axis thereof, the difference ΔS, the oblique astigmatic error and the mean oblique error caused therein in the case of far or infinite viewing, the oblique astigmatic error and the mean oblique error caused therein in the case of intermediate (or 1-m) viewing and the oblique astigmatic error and the mean oblique error caused therein in the case of near (or 0.3-m) viewing.

Further, referring now to FIG. 4, there is shown the relation among the (lens) shape of the positive-refractive-power aspherical spectacle lens of FIG. 1, in which only first surface is "shifted" 2 mm from the optical axis thereof, the difference ΔS, the oblique astigmatic error and the mean oblique error caused therein in the case of far or infinite viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 62:
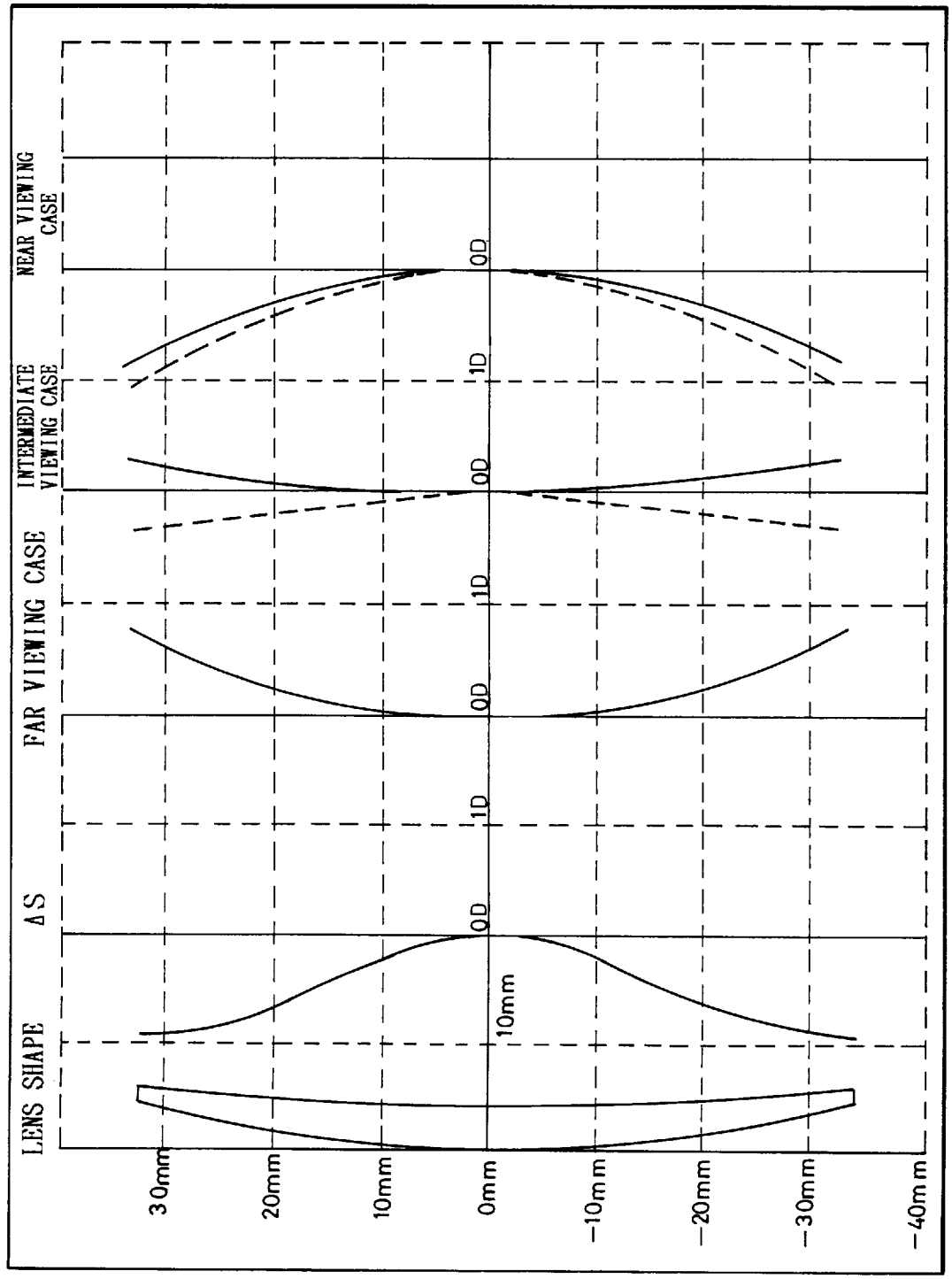
FIG. 62 is a graph for showing the relation among the shape of a conventional positive-refractive-power aspherical spectacle lens designed without taking decentration into consideration, in which no decentration is caused, the difference ΔS caused therein, the oblique astigmatic error caused therein in the far-viewing case, the oblique astigmatic error caused therein in the intermediate-viewing case and the oblique astigmatic error caused therein in the near-viewing case.
Figure 63:
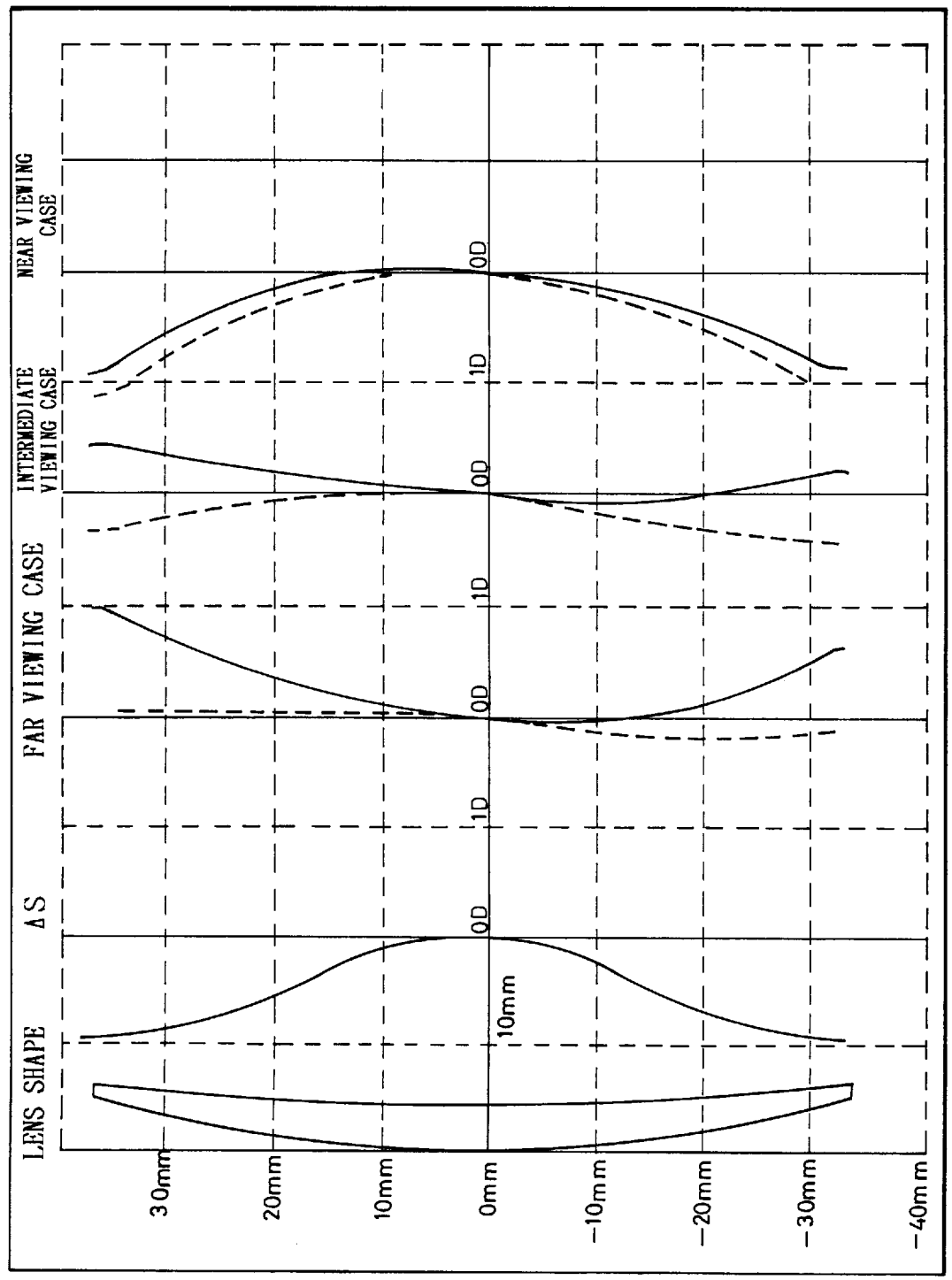
FIG. 63 is a graph for showing the relation among the shape of a conventional positive-refractive-power aspherical spectacle lens, which is designed without taking decentration into consideration and is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.
Figure 64:
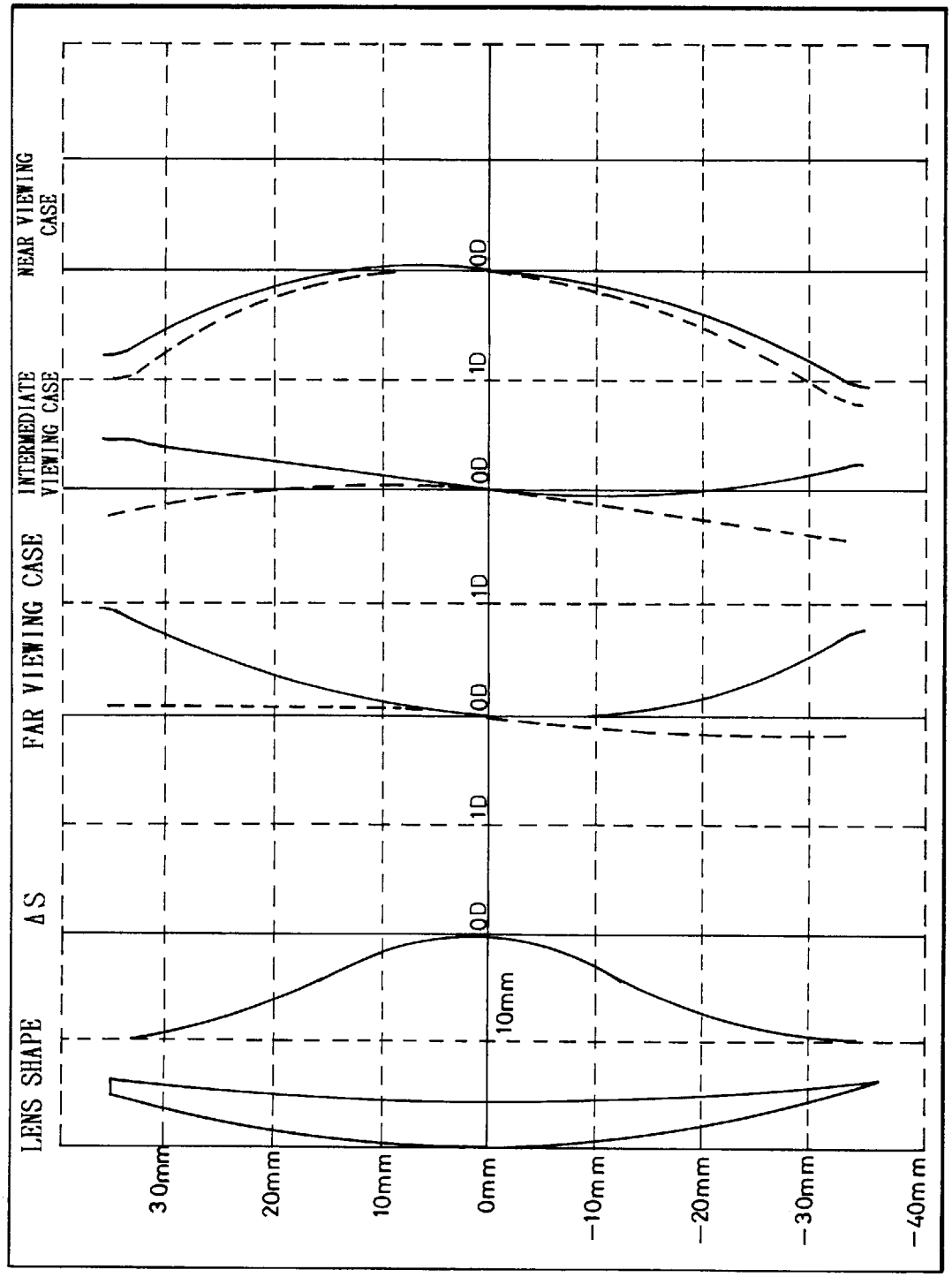
FIG. 64 is a graph for showing the relation among the shape of a conventional positive-refractive-power aspherical spectacle lens designed without taking decentration into consideration, in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Moreover, FIGS. 62, 63 and 64 respectively correspond to a case where no decentration is caused in a conventional positive-refractive-power aspherical spectacle lens designed without taking decentration into consideration, another case where the conventional positive-refractive-power aspherical spectacle lens is "shifted" 2 mm from the optical axis thereof, and still another case where only the first surface of the conventional positive-refractive-power aspherical spectacle lens is "shifted" 2 mm from the optical axis thereof. Furthermore, each of FIGS. 62, 63 and 64 illustrates the relation among the (lens) shape of the conventional positive-refractive-power aspherical spectacle lens in the corresponding case, the difference ΔS, the oblique astigmatic error and the mean oblique error caused therein in the case of far or infinite viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 65:
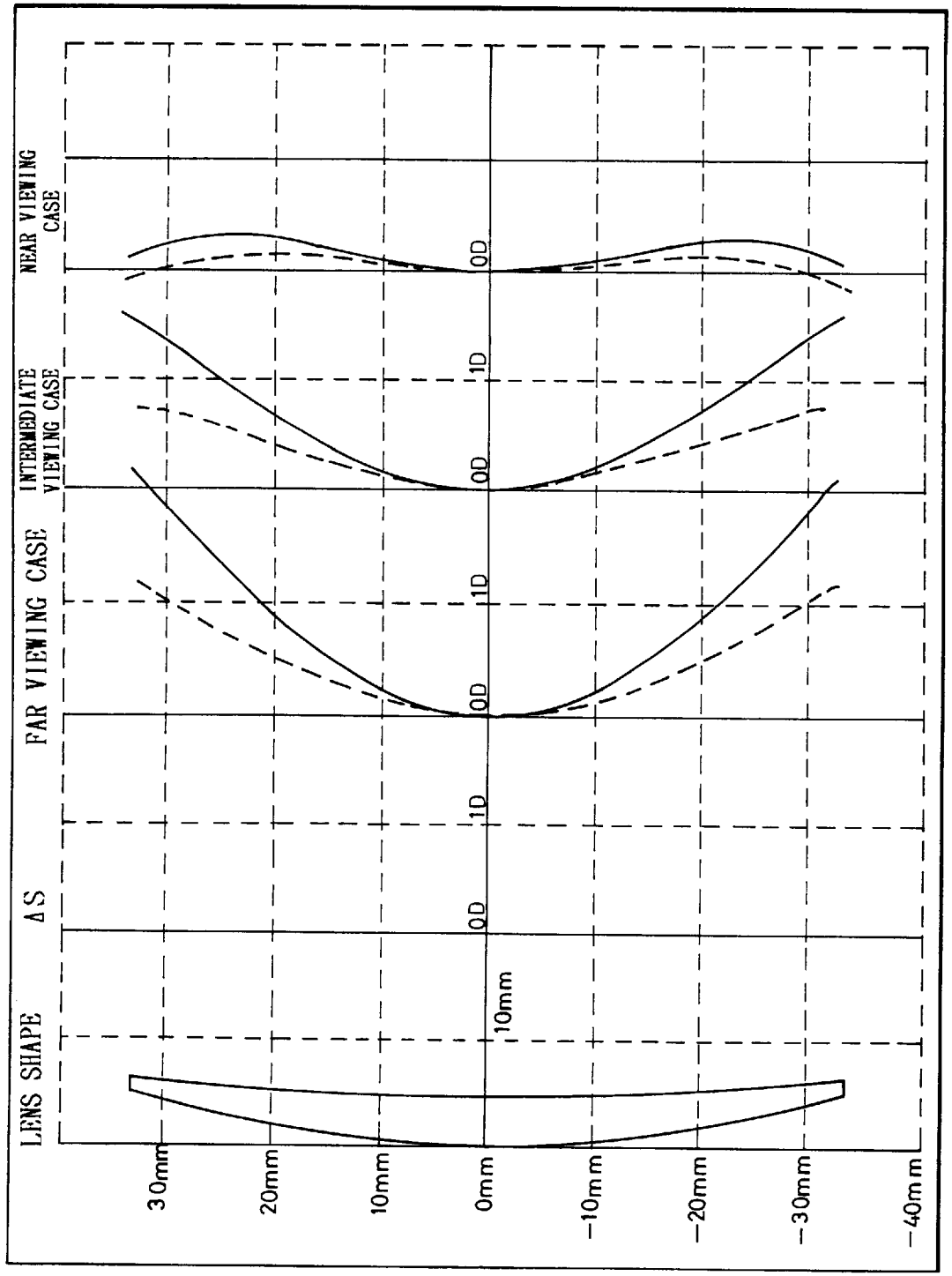
FIG. 65 is a graph for showing the relation among the shape of a conventional positive-refractive-power aspherical spectacle lens, in which no decentration is caused, the difference ΔS caused therein, the oblique astigmatic error caused therein in the far-viewing case, the oblique astigmatic error caused therein in the intermediate-viewing case and the oblique astigmatic error caused therein in the near-viewing case.
Figure 66:
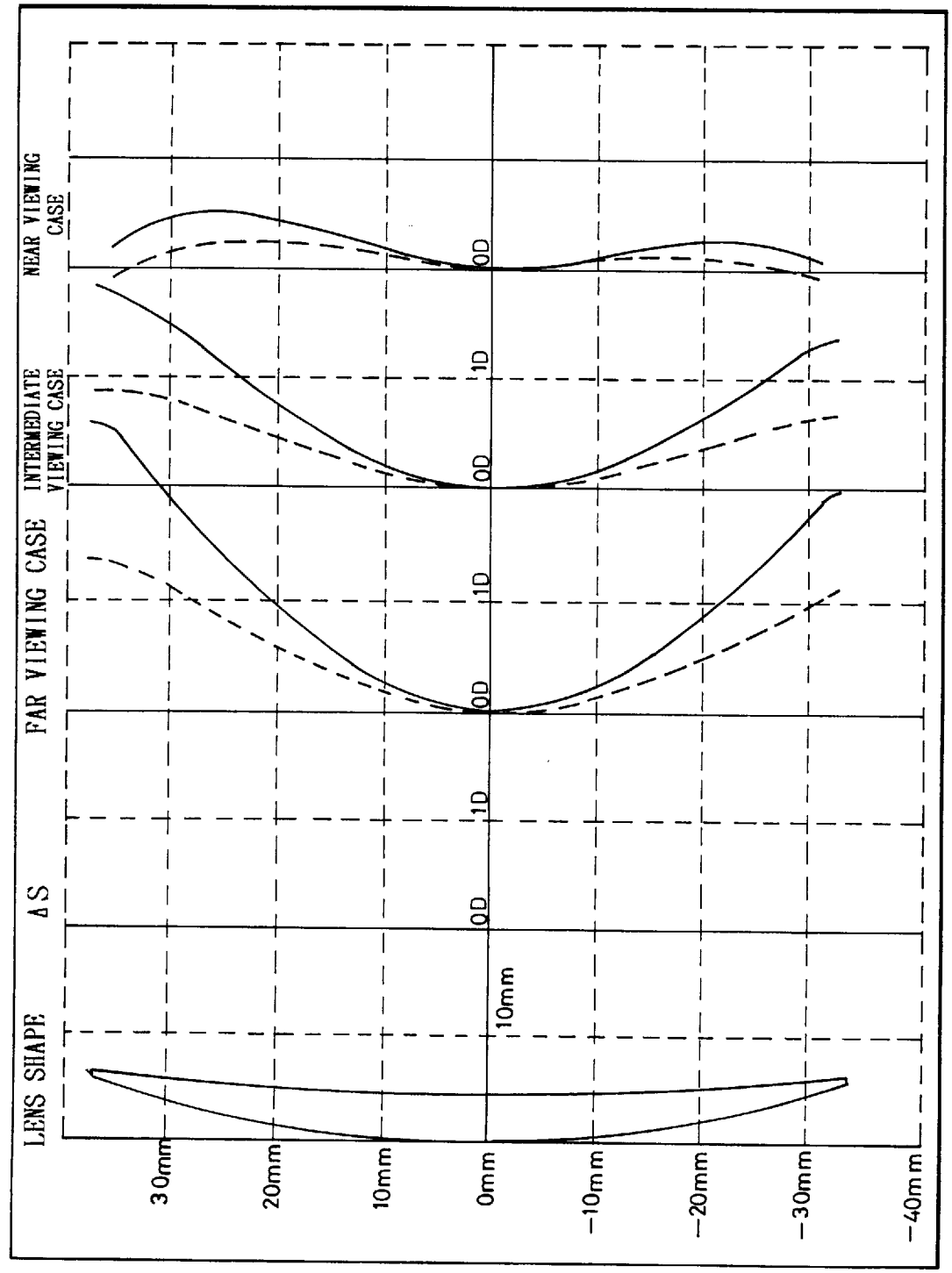
FIG. 66 is a graph for showing the relation among the shape of a conventional positive-refractive-power aspherical spectacle lens, which is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.
Figure 67:
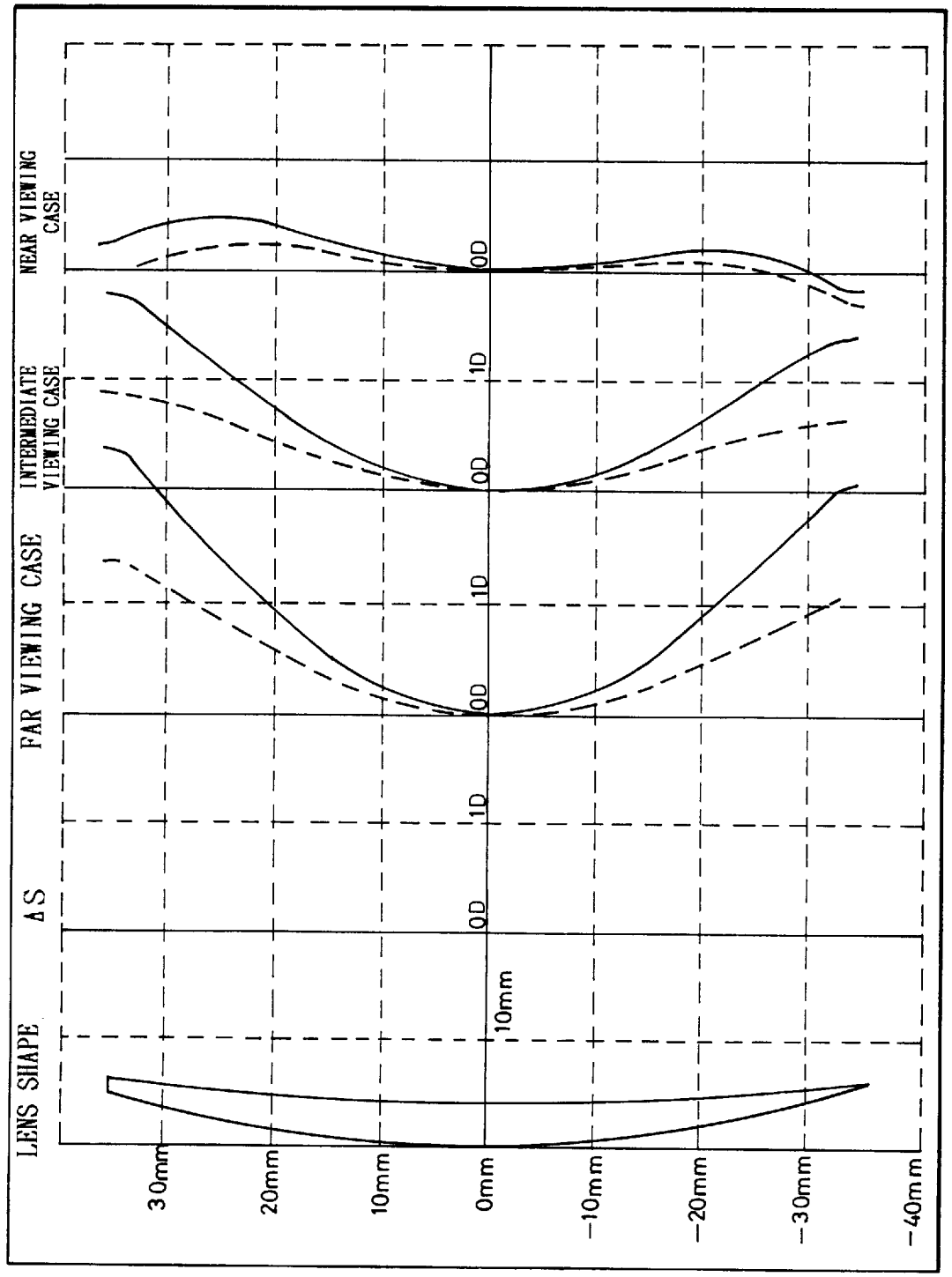
FIG. 67 is a graph for showing the relation among the shape of a conventional positive-refractive-power aspherical spectacle lens, in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Additionally, FIGS. 65, 66 and 67 respectively correspond to a case where no decentration is caused in a conventional positive-refractive-power aspherical spectacle lens, another case where the conventional positive-refractive-power aspherical spectacle lens is "shifted" 2 mm from the optical axis thereof, and still another case where only the first surface of the conventional positive-refractive-power aspherical spectacle lens is "shifted" 2 mm from the optical axis thereof. Further, each of FIGS. 65, 66 and 67 illustrates the relation among the (lens) shape of the conventional positive-refractive-power aspherical spectacle lens in the corresponding case, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of viewing long-distance places, that of viewing middle-distance places and that of viewing short-distance places, of FIGS. 3, 4, 62 to 67, solid curves represent the oblique astigmatic error, and broken curves represent the mean oblique errors. Incidentally, in the graphs of ΔS and the oblique astigmatic error and the mean oblique errors in the cases of viewing long-distance places, of viewing middle-distance places and of viewing short-distance places, abscissas are represented in units of diopters.

As is seen or understood from these figures, in the case of the positive-refractive-power aspherical spectacle lenses of FIGS. 1, 3 and 4, variation in the oblique astigmatic error due to the decentration is small in the vicinity of the optical axis (namely, a region in which the distance from the optical axis ranges from 5 to 10 mm) in comparison with the conventional positive-refractive-power aspherical spectacle lenses of FIGS. 62, 63 and 64.

Further, in the case of the conventional positive-refractive-power aspherical spectacle lenses of FIGS. 62, 63 and 64, as is seen from these figures, mean oblique error is caused owing to the influence of the aspherical surface at a place which is slightly off the optical axis thereof, so that a deviation in the refractive power of the lens occurs when measuring the refractive power thereof by using a lens meter. In the case of the positive-refractive-power aspherical spectacle lenses according to the first embodiment of FIGS. 1, 3 and 4, as is seen from these figures, there is very little mean oblique error at places located in the vicinity of the optical axis even if the places are off the optical axis thereof, so that a deviation in the refractive power of the lens at the time of measuring the refractive power is small.

The following "TABLE 2" presents ΔS in the case of the positive-refractive-power aspherical spectacle lens of FIG. 1. Further, FIG. 5 illustrates ΔS caused in the proximity of the optical axis in the case of the positive-refractive-power aspherical spectacle lens of FIG. 1.

TABLE 2

| $\rho$ (mm) | ΔS (in diopters) |
|---|---|
| 0.000 | 0.00000 |
| 0.979 | 0.00096 |
| 1.959 | 0.00168 |
| 2.942 | −0.00052 |
| 3.930 | −0.00767 |
| 4.952 | −0.02118 |

As is shown in TABLE 2 and FIG. 5, the following inequality or condition is satisfied in a region of 10-mm diameter from the optical axis:

$$-0.05 \leq \Delta S \leq +0.05 \tag{3}$$

Namely, in the region of 10-mm diameter from the optical axis, ΔS is very small sufficiently to the extent that ΔS is considered as being negligible.

If ΔS exceeds the upper and lower limits thereof indicated in the inequality (3), the performance of the lens is affected by the aspherical surface. Further, the decentration tolerance in the case of causing the decentration cannot be secured.

Further, as is seen from TABLE 2 and FIG. 5, ΔS takes a positive value at least once at the distance $\rho$ in the range: $0 < \rho \leq 5$ (mm). Moreover, ΔS takes a negative value in a peripheral portion of the lens.

FIG. 6 shows the oblique astigmatic error caused in the positive-refractive-power aspherical spectacle lens of FIG. 1. In FIG. 6, abscissas represent the distance from the optical axis thereof (in mm); and ordinates the oblique astigmatic error (in diopters).

As is seen from FIG. 6, in a region, which has a diameter of 40 mm, around the optical axis, in the far-viewing case, the oblique astigmatic error is within the range between ±0.15 (in diopters).

Figure 7:
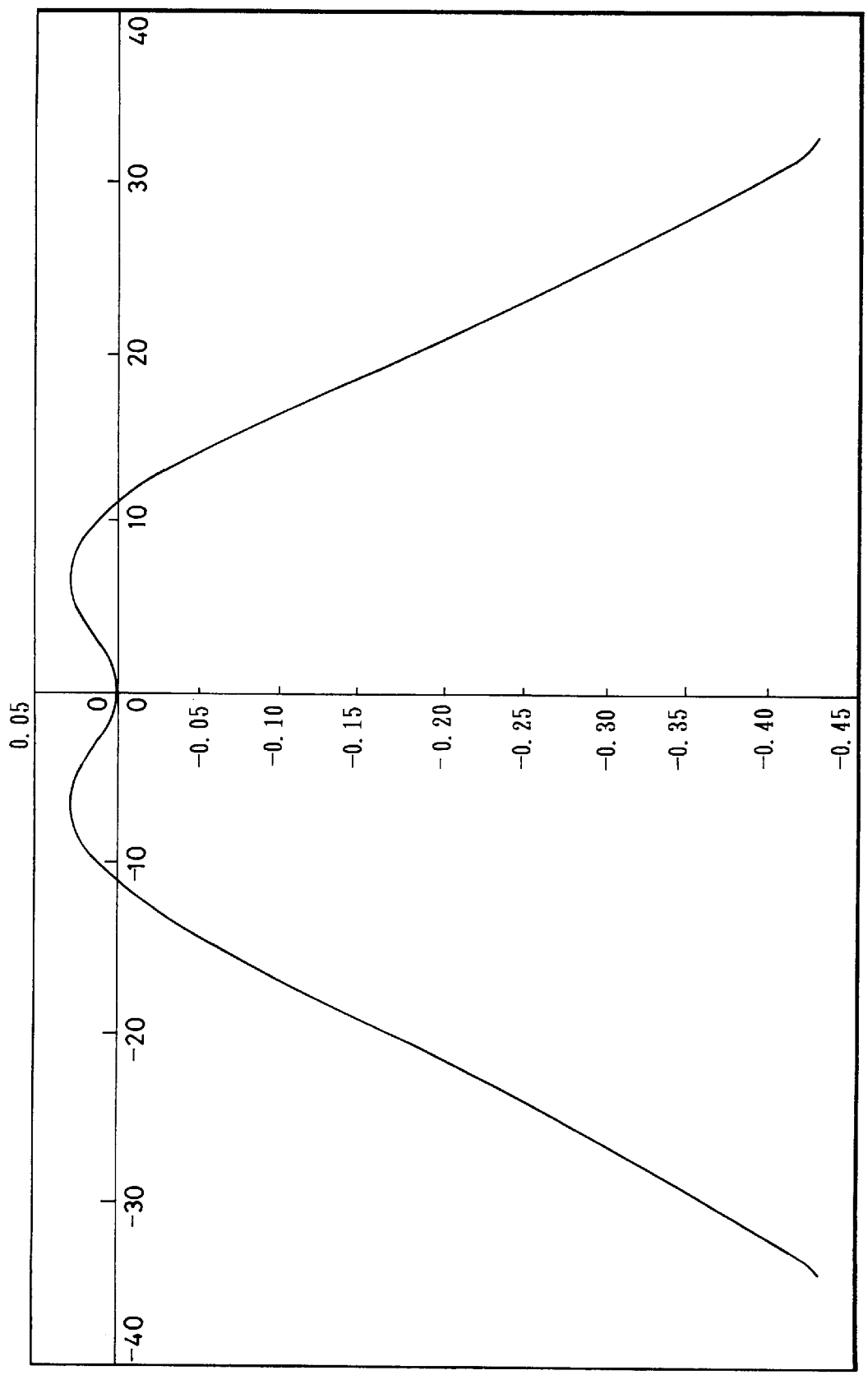
FIG. 7 is a graph for showing the mean oblique error caused in the positive-refractive-power aspherical spectacle lens (namely, the first embodiment of the present invention)

FIG. 7 is a graph for showing the mean oblique error caused in the positive-refractive-power aspherical spectacle lens of FIG. 1. In FIG. 7, abscissas represent the distance from the optical axis thereof (in mm); and ordinates the mean oblique error (in diopters).

As is seen from FIG. 7, in a region, which has a diameter of 30 mm, around the optical axis, in the far-viewing case, the mean oblique error is within the range between ±0.20 (in diopters).

As above described, the first surface is determined as defined in the equation (2). Thereby, the (center) thickness of the lens is small in comparison with that of the conventional spherical lens. Moreover, the design of the lens is performed by taking the decentration into consideration. Thus, the performance degradation due to the decentration is reduced.

Second Embodiment

Figure 8:
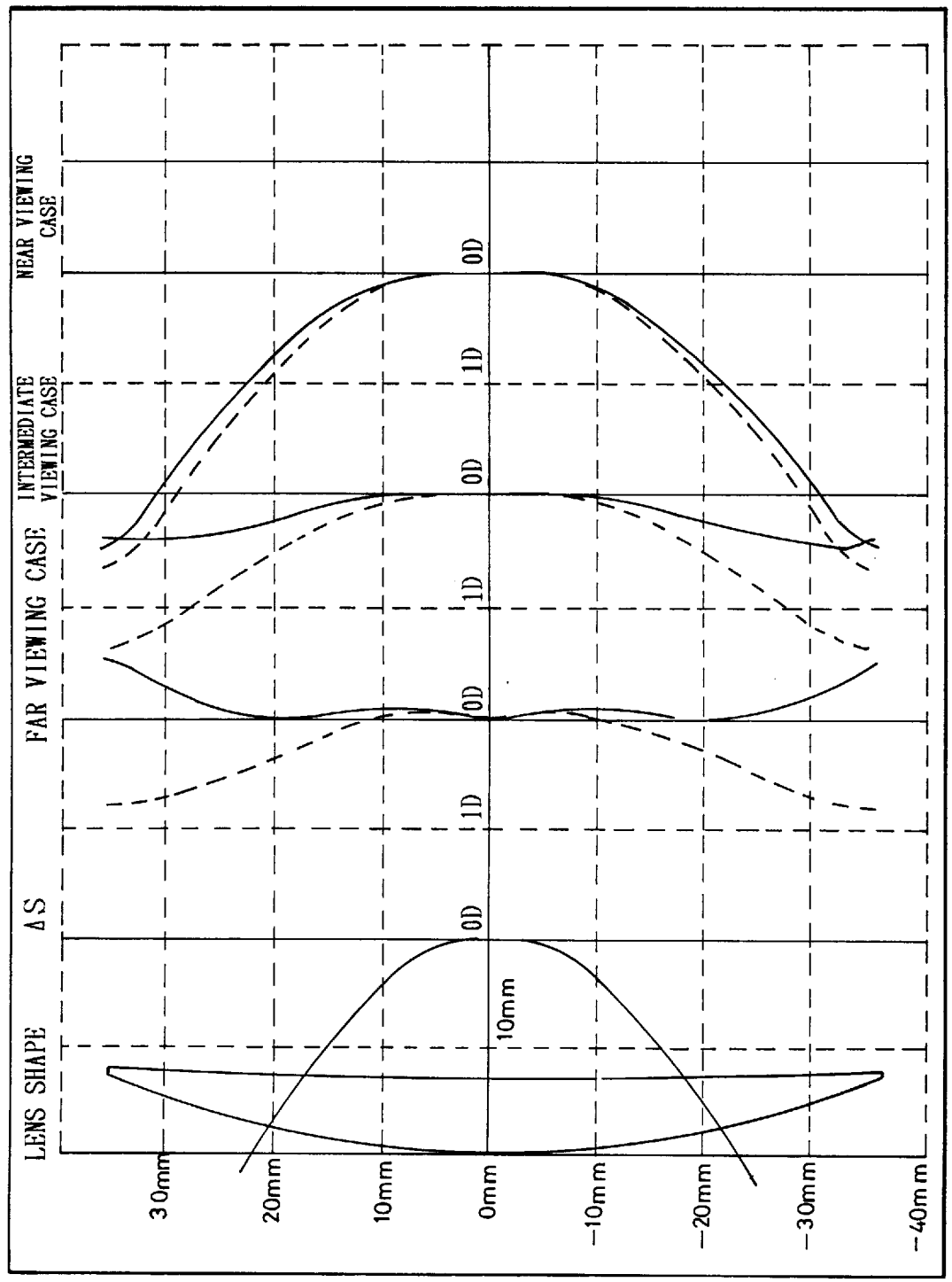
FIG. 8 is a graph for showing the relation among the shape of a positive-refractive-power aspherical spectacle lens (namely, a second embodiment of the present invention), in which no decentration is caused, the difference ΔS caused therein, the oblique astigmatic error caused therein in the far-viewing case, the oblique astigmatic error caused therein in the intermediate-viewing case and the oblique astigmatic error caused therein in the near-viewing case.

FIG. 8 illustrates the relation among the lens shape of another positive-refractive-power aspherical spectacle lens (namely, the second embodiment of the present invention) in which no decentration is caused, ΔS, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. Here, note that ΔS is corresponding to the first surface. In the graphs of FIG. 8 respectively corresponding to the case of far viewing, that of intermediate viewing and that of near viewing, solid curves represent the oblique astigmatic error, and broken curves represent the mean oblique errors. Incidentally, in the graphs of ΔS and the oblique astigmatic errors and the mean oblique errors in the cases of far viewing, of intermediate viewing and of near viewing, abscissas are represented in units of diopters.

The first surface of the positive-refractive-power aspherical spectacle lens of FIG. 8 is defined by the equation (2). Further, in the case of this positive-refractive-power aspherical spectacle lens, the design thereof in a starting stage is performed by taking decentration aberration, which is caused when this lens is "shifted" 4 mm from the optical axis thereof, into consideration as a target value of optimization, in addition to a usual target value of optimization. Moreover, the design of this lens is performed by further taking decentration aberration, which is caused when only the first surface of this lens is "shifted" 4 mm from the optical axis thereof, into consideration as a target value of optimization. Furthermore, the design of this lens is performed by setting the refractive power thereof at 6.0 diopters (D).

Further, the second refractive surface of the positive-refractive-power aspherical spectacle lens of FIG. 8 has a spherical shape.

Moreover, the refractive-power, diameter, refractive index and shape of the positive-refractive-power aspherical spectacle lens of FIG. 8, whose first surface (namely, the left-side surface as shown in FIG. 8) is an aspherical surface defined by the equation (2), are presented in the following "TABLE 3".

TABLE 3

| | |
|---|---|
| Refractive Power: | 6.0 D |
| Lens Diameter: | φ70 mm |
| Refractive Index ($n_e$): | 1.501 |
| Center Thickness: | 7.18 mm |
| Front-surface Curvature: | $1.25828 \times 10^{-2}$ |
| Back-surface Curvature: | $9.98004 \times 10^{-4}$ |
| Aspherical Coefficients: | |
| $A_2 = 0.00000$ | |
| $A_3 = 0.00000$ | |
| $A_4 = 3.39527 \times 10^{-7}$ | |
| $A_5 = -1.08334 \times 10^{-7}$ | |
| $A_6 = 4.00919 \times 10^{-9}$ | |
| $A_7 = -6.70180 \times 10^{-11}$ | |
| $A_8 = 4.40787 \times 10^{-13}$ | |

In the case of this embodiment of the present invention, the decentration corresponding to the ratio (K/H)=4/70= 0.057 (incidentally, K designates a vertical change in decentration (namely, an amount of the shift taken into account when designing the lens (mm); and H a maximum outside-diameter (namely, a lens diameter) (mm)) is taken into consideration.

Figure 9:
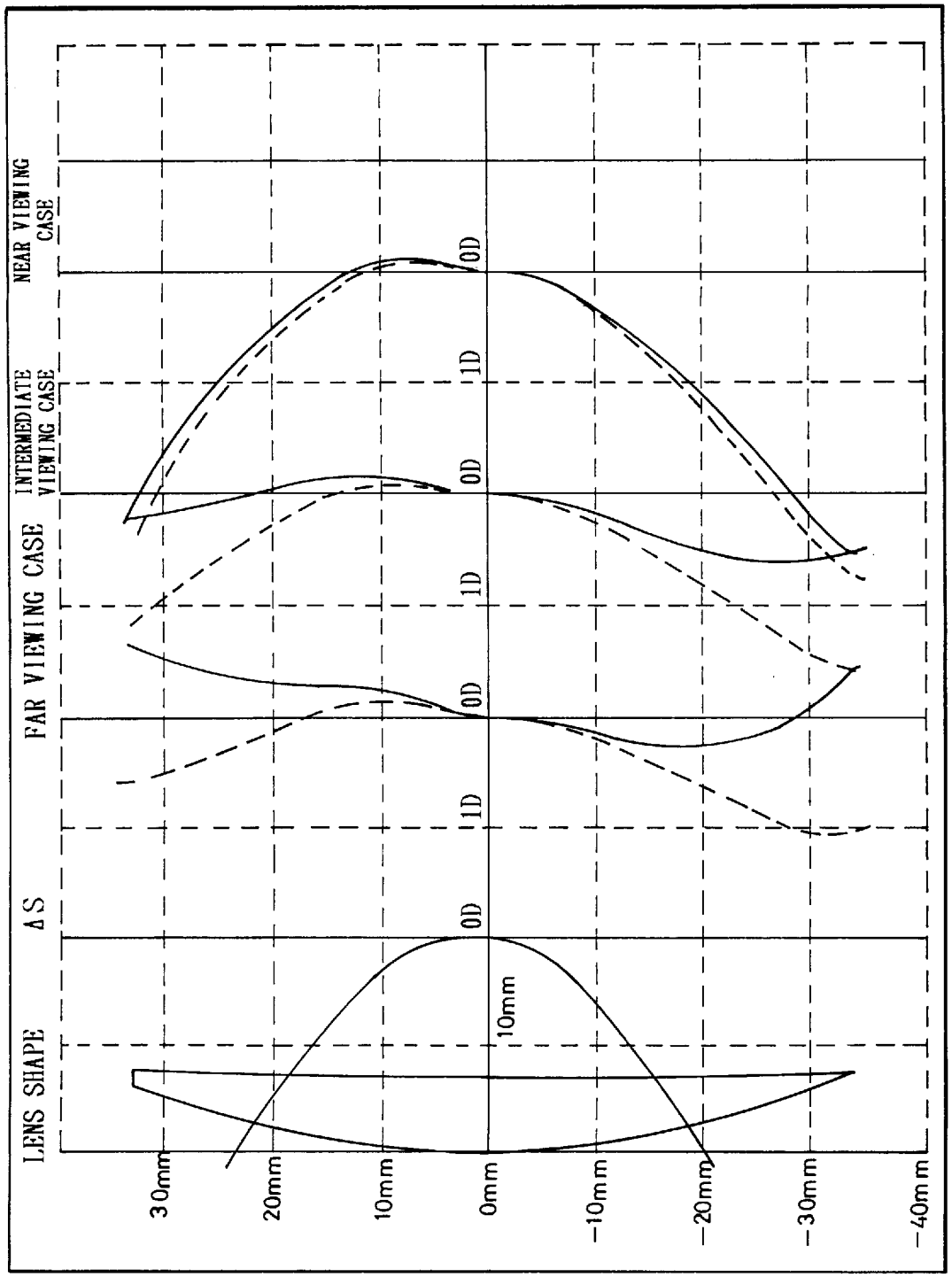
FIG. 9 is a graph for showing the relation among the shape of this positive-refractive-power aspherical spectacle lens (namely, the second embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 9, there is shown the relation among the (lens) shape of the positive-refractive-power aspherical spectacle lens of FIG. 8, which is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 10:
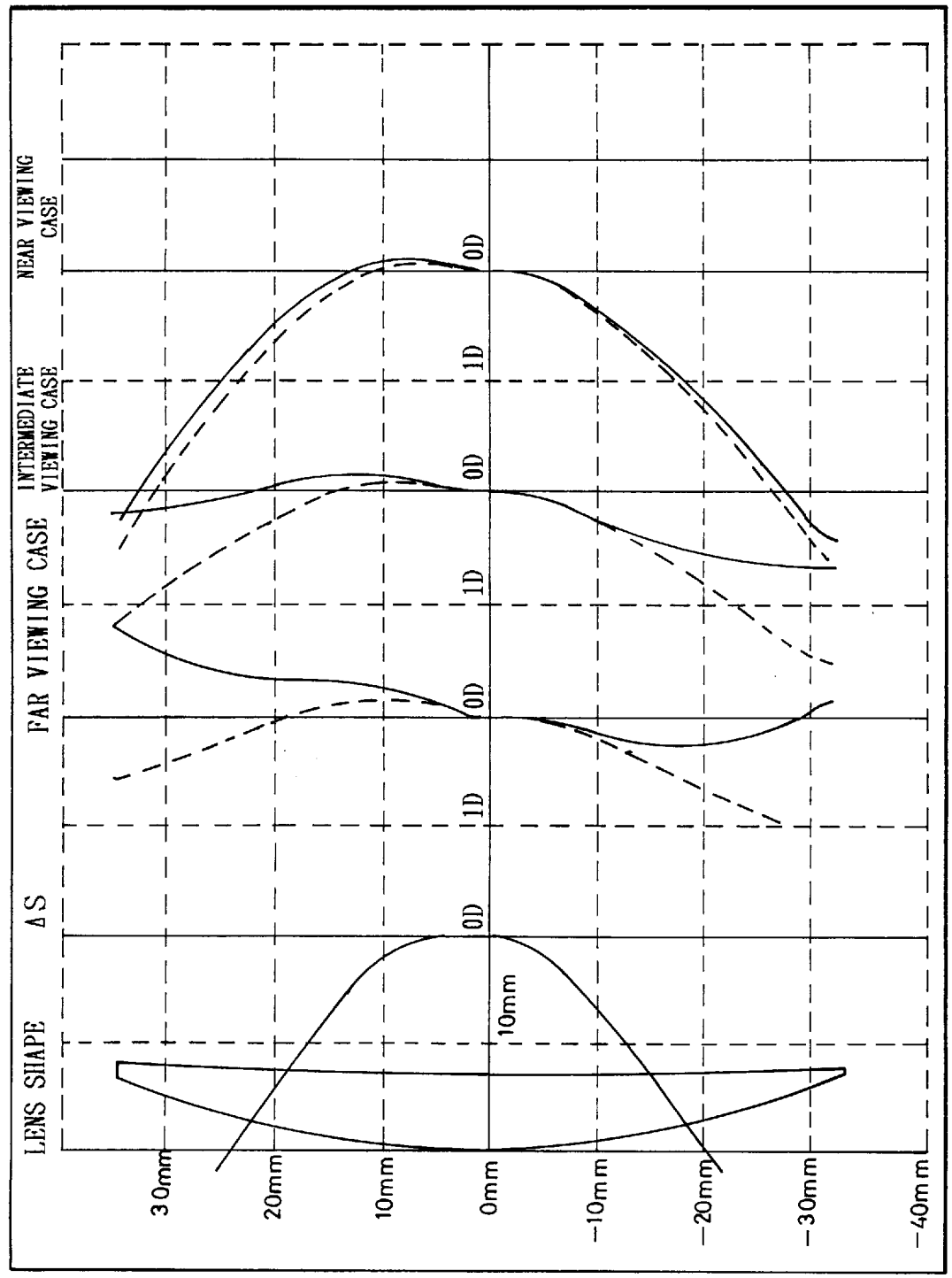
FIG. 10 is a graph for showing the relation among the shape of the positive-refractive-power aspherical spectacle lens (namely, the second embodiment of the present invention), in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Further, referring now to FIG. 10, there is shown the relation among the (lens) shape of the positive-refractive-power aspherical spectacle lens of FIG. 8, in which only first surface is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of far viewing, that of intermediate viewing and that of near viewing, of FIGS. 9 and 10, solid curves represent the oblique astigmatic error, and broken curves represent the mean oblique errors. Incidentally, in the graphs of ΔS and the oblique astigmatic error and the mean oblique error in the cases of far viewing, of intermediate viewing and of near viewing, abscissas are represented in units of diopters.

Moreover, as is seen or understood from the figures, in the case of the positive-refractive-power aspherical spectacle lenses of FIGS. 8, 9 and 10, variation in the oblique astigmatic error due to the decentration is small in the vicinity of the optical axis (namely, a region in which the distance from the optical axis ranges from 5 to 10 mm) in comparison with the conventional positive-refractive-power aspherical spectacle lenses of FIGS. 62, 63 and 64.

Furthermore, in the case of the positive-refractive-power aspherical spectacle lenses according to the second embodiment, as is seen from these figures, there is very little mean oblique error at places located in the vicinity of the optical axis even if the places are off the optical axis thereof, so that a deviation in the refractive power of the lens at the time of measuring the refractive power is small, similarly as in the case of the positive-refractive-power aspherical spectacle lenses according to the first embodiment of the present invention.

The following "TABLE 4" presents ΔS in the case of the positive-refractive-power aspherical spectacle lens of FIG. 8. Further, FIG. 11 illustrates ΔS caused in the proximity of the optical axis in the case of the positive-refractive-power aspherical spectacle lens of FIG. 8.

TABLE 4

| ρ (mm) | ΔS (in diopters) |
|---|---|
| 0.000 | 0.00000 |
| 1.026 | 0.00104 |
| 2.053 | 0.00023 |
| 3.083 | −0.00732 |
| 4.116 | −0.02527 |
| 4.807 | −0.04435 |
| 5.153 | −0.05624 |

Figure 11:
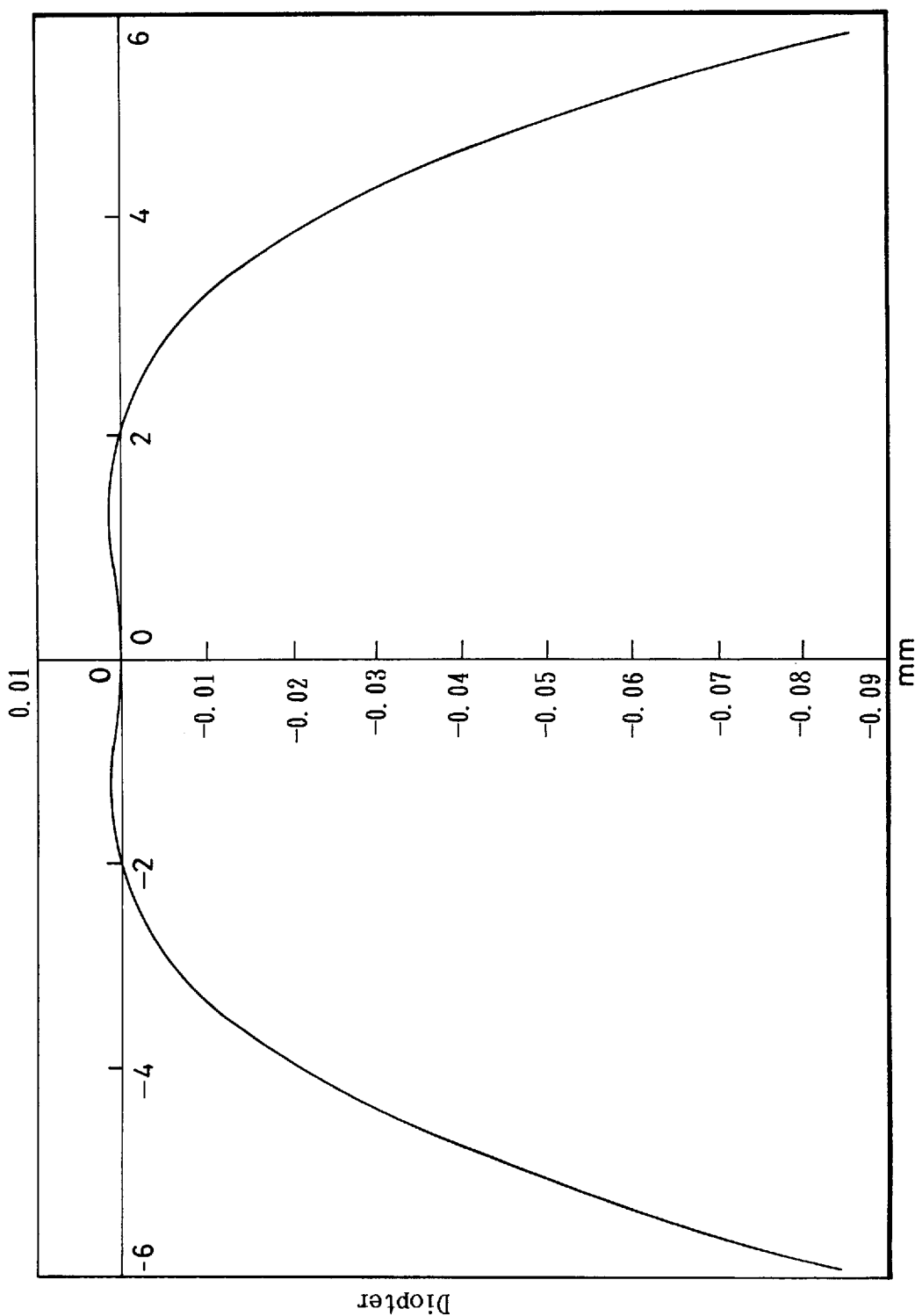
FIG. 11 is a graph for showing the difference ΔS caused in the positive-refractive-power aspherical spectacle lens (namely, the second embodiment of the present invention)

As is shown in TABLE 4 and FIG. 11, the inequality (3) is satisfied in a region of 10-mm diameter from the optical axis.

Further, as is seen from TABLE 4 and FIG. 11, ΔS takes a positive value at least once at the distance ρ in the range: 0<ρ≦5 (mm). Moreover, ΔS takes a negative value in a peripheral portion of the lens.

Figure 12:
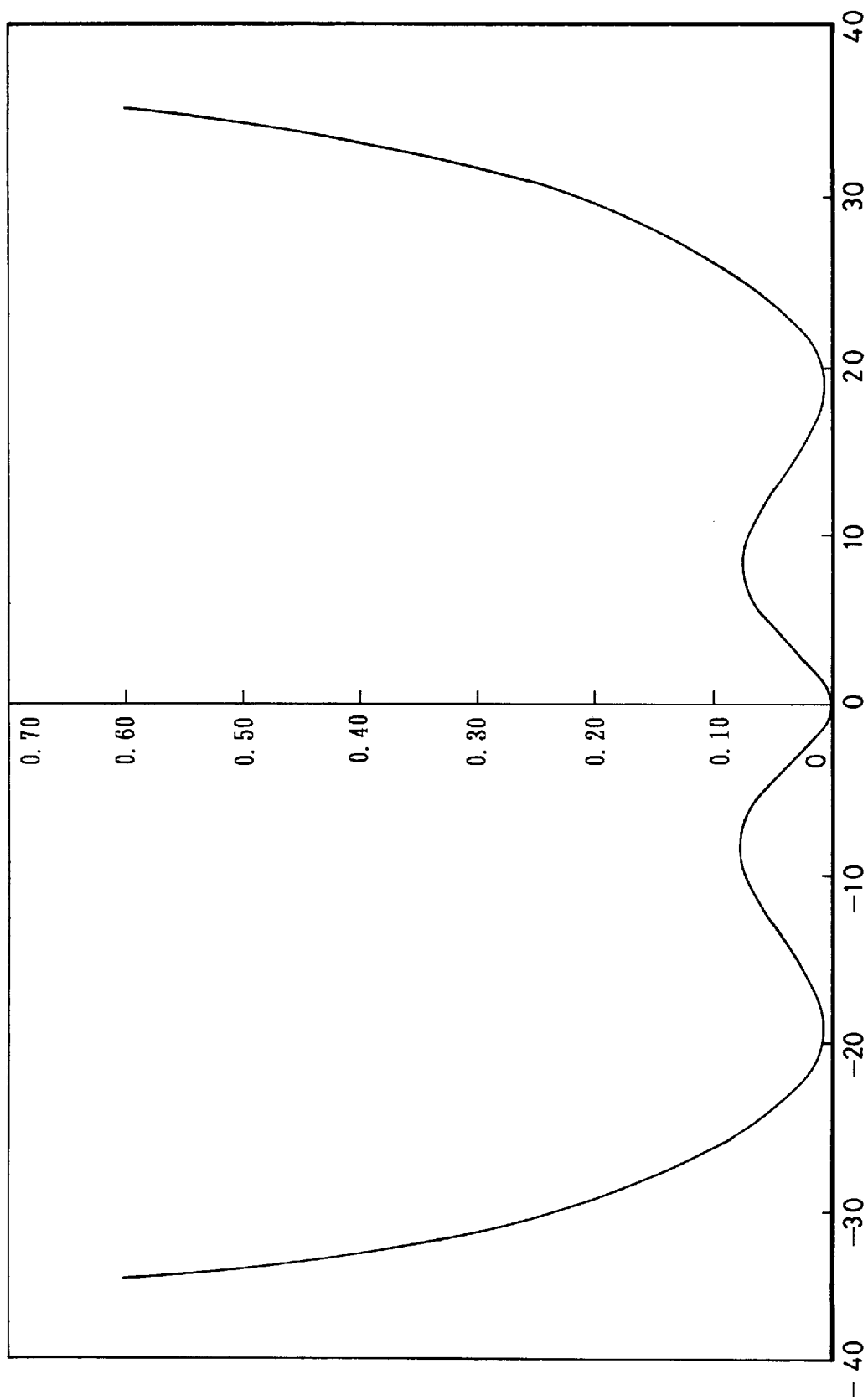
FIG. 12 is a graph for showing the oblique astigmatic error caused in the positive-refractive-power aspherical spectacle lens (namely, the second embodiment of the present invention)

FIG. 12 shows the oblique astigmatic error caused in the positive-refractive-power aspherical spectacle lens of FIG. 8. In FIG. 12, abscissas represent the distance from the optical axis thereof (in mm); and ordinates the oblique astigmatic error (in diopters).

As is seen from FIG. 12, in a region, which has a diameter of 40 mm, around the optical axis, in the far-viewing case, the oblique astigmatic error is within the range between ±0.15 (in diopters)

Figure 13:
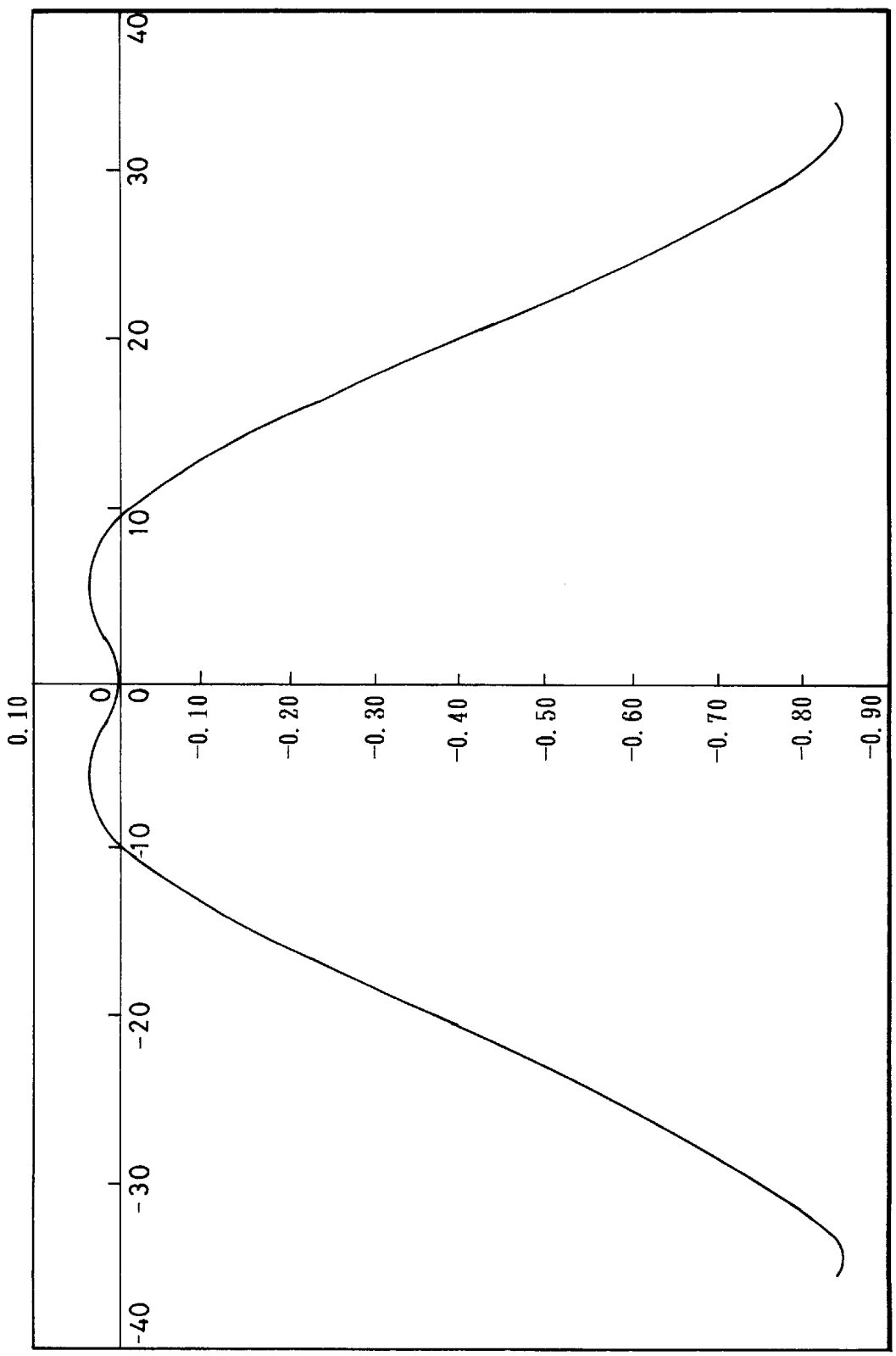
FIG. 13 is a graph for showing the mean oblique error caused in the positive-refractive-power aspherical spectacle lens (namely, the second embodiment of the present invention)

FIG. 13 is a graph for showing the mean oblique error caused in the positive-refractive-power aspherical spectacle lens of FIG. 8. In FIG. 13, abscissas represent the distance from the optical axis thereof (in mm); and ordinates the mean oblique error (in diopters).

As is seen from FIG. 13, in a region, which has a diameter of 30 mm, around the optical axis, in the far-viewing case, the mean oblique error is within the range between ±0.20 (in diopters).

As above described, the second embodiment has advantages or effects similar to those of the first embodiment.

Third Embodiment

Figure 14:
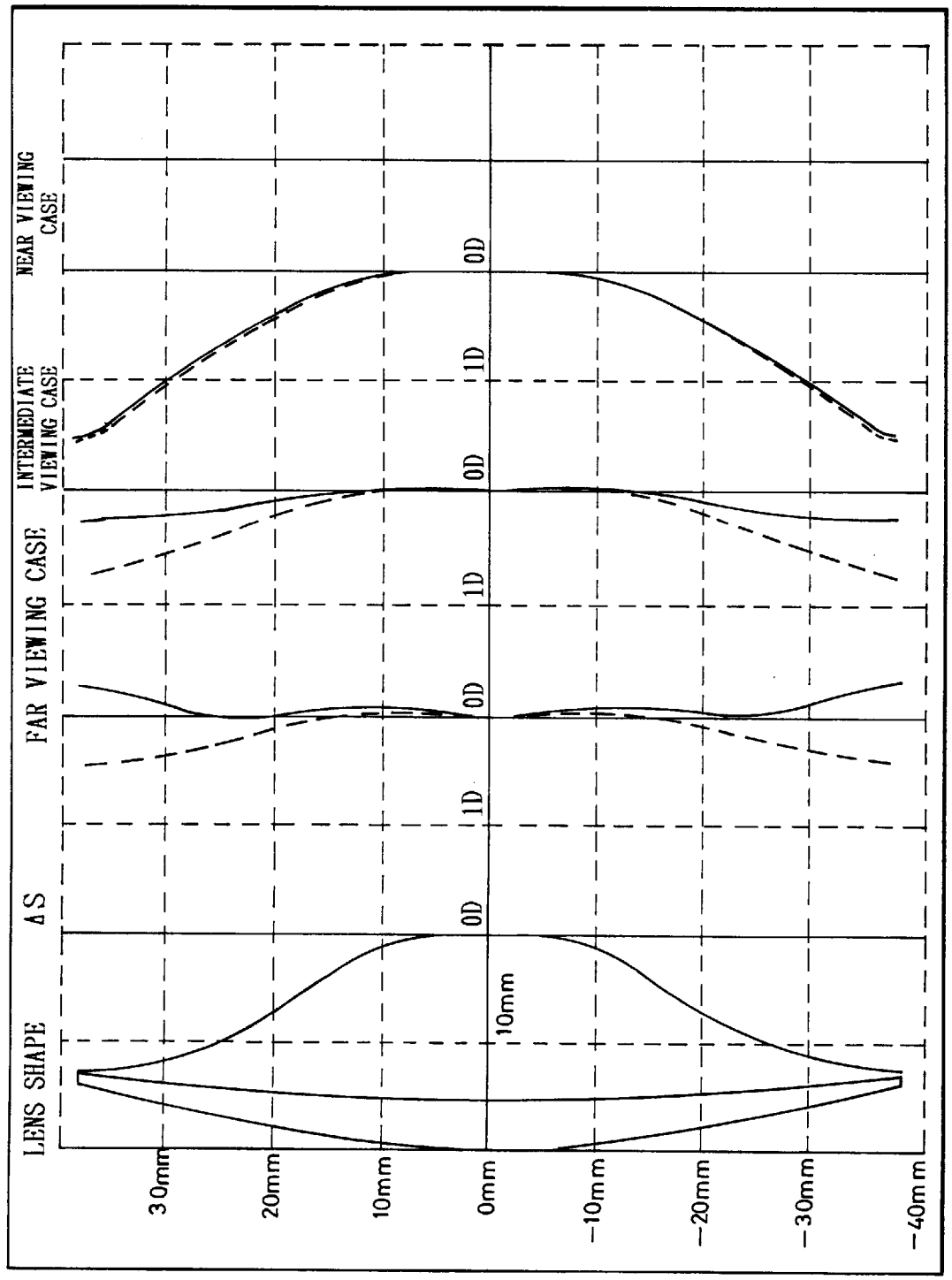
FIG. 14 is a graph for showing the relation among the shape of a positive-refractive-power aspherical spectacle lens (namely, a third embodiment of the present invention), in which no decentration is caused, the difference ΔS caused therein, the oblique astigmatic error caused therein in the far-viewing case, the oblique astigmatic error caused therein in the intermediate-viewing case and the oblique astigmatic error caused therein in the near-viewing case.

FIG. 14 illustrates the relation among the lens shape of still another positive-refractive-power aspherical spectacle lens (namely, the third embodiment of the present invention) in which no decentration is caused, the difference $\Delta S$, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. In the graphs of FIG. 14 respectively corresponding to the case of far viewing, that of intermediate viewing and that of near viewing, solid curves represent the oblique astigmatic errors, and broken curves represent the mean oblique errors. Incidentally, in the graphs of $\Delta S$ and the oblique astigmatic error and the mean oblique error in the cases of far viewing, of intermediate viewing and of near viewing, abscissas are represented in units of diopters.

The first surface of the positive-refractive-power aspherical spectacle lens of FIG. 14 is defined by the equation (2). Further, in the case of this positive-refractive-power aspherical spectacle lens, the design thereof in a starting stage is performed by taking decentration aberration, which is caused when this lens is "shifted" 5 mm from the optical axis thereof, into consideration as a target value of optimization, in addition to a usual target value of optimization. Moreover, the design of this lens is performed by further taking decentration aberration, which is caused when only the first surface of this lens is "shifted" 5 mm from the optical axis thereof, into consideration as a target value of optimization. Furthermore, the design of this lens is performed by setting the refractive power thereof at 3.0 D.

Further, the second refractive surface of the positive-refractive-power aspherical spectacle lens of FIG. 14 has a spherical shape.

Moreover, the refractive-power, diameter, refractive index and shape of the positive-refractive-power aspherical spectacle lens of FIG. 14, whose first surface (namely, the left-side surface as shown in FIG. 14) is an aspherical surface defined by the equation (2), are presented in the following "TABLE 5".

TABLE 5

| | |
|---|---|
| Refractive Power: | 3.0 D |
| Lens Diameter: | φ75 mm |
| Refractive Index ($n_e$): | 1.501 |
| Center Thickness: | 4.52 mm |
| Front-surface Curvature: | $8.86194 \times 10^{-3}$ |
| Back-surface Curvature: | $2.99401 \times 10^{-3}$ |
| Aspherical Coefficients: | |
| $A_2 = 0.00000$ | |
| $A_3 = 0.00000$ | |
| $A_4 = 2.50963 \times 10^{-7}$ | |
| $A_5 = -5.21973 \times 10^{-8}$ | |
| $A_6 = 1.69574 \times 10^{-9}$ | |
| $A_7 = -2.24544 \times 10^{-11}$ | |
| $A_8 = -1.07193 \times 10^{-13}$ | |

In the case of this embodiment of the present invention, the decentration corresponding to the ratio (K/H)=5/75= 0.067 (incidentally, K designates a vertical change in decentration (namely, an amount of the shift taken into account when designing the lens (mm); and H a maximum outside-diameter (namely, a lens diameter) (mm)) is taken into consideration.

Figure 15:
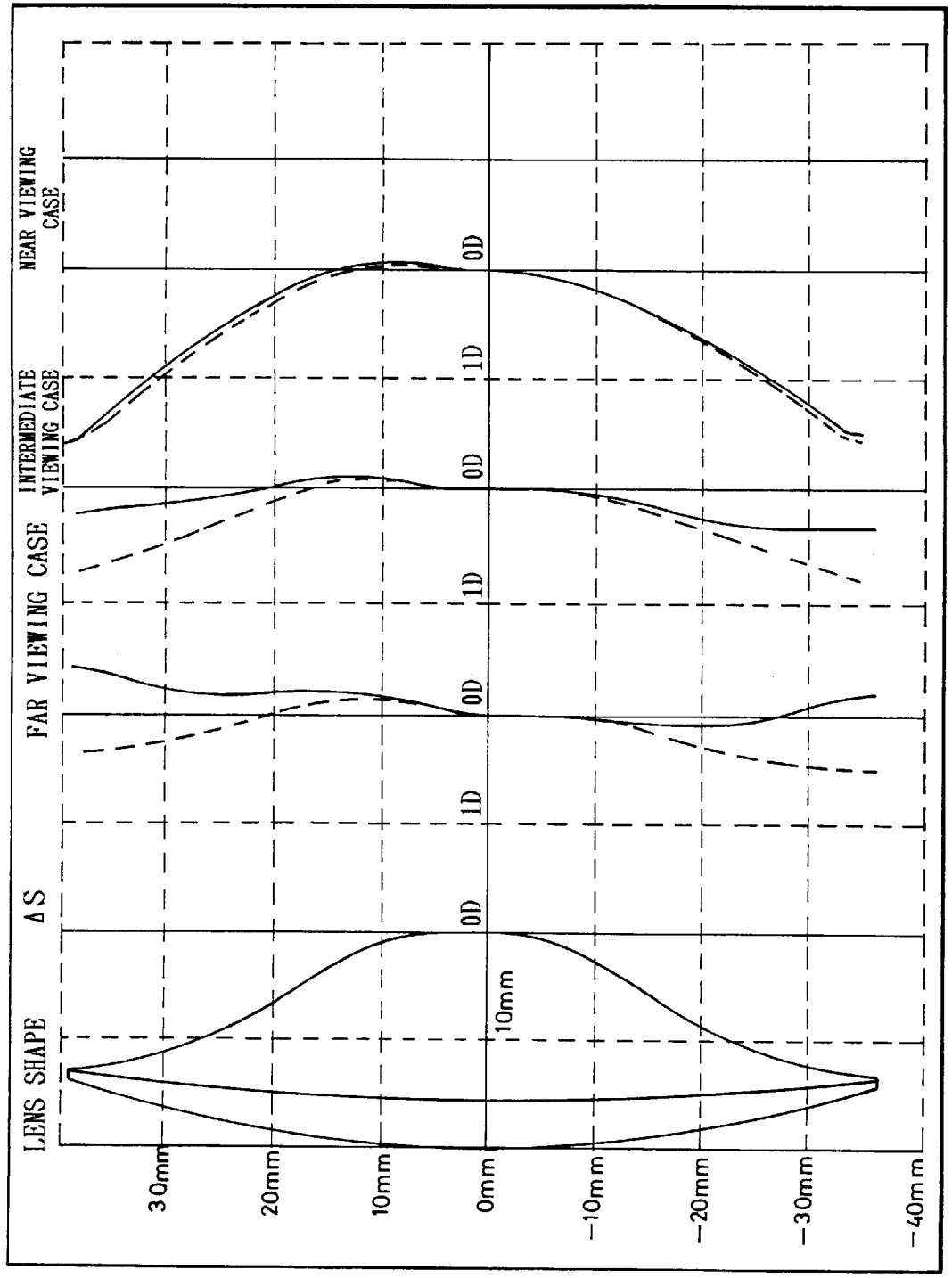
FIG. 15 is a graph for showing the relation among the shape of this positive-refractive-power aspherical spectacle lens (namely, the third embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 15, there is shown the relation among the (lens) shape of the positive-refractive-power aspherical spectacle lens of FIG. 14, which is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Further, referring now to FIG. 15, there is shown the relation among the (lens) shape of the positive-refractive-power aspherical spectacle lens of FIG. 14, in which only first surface is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 16:
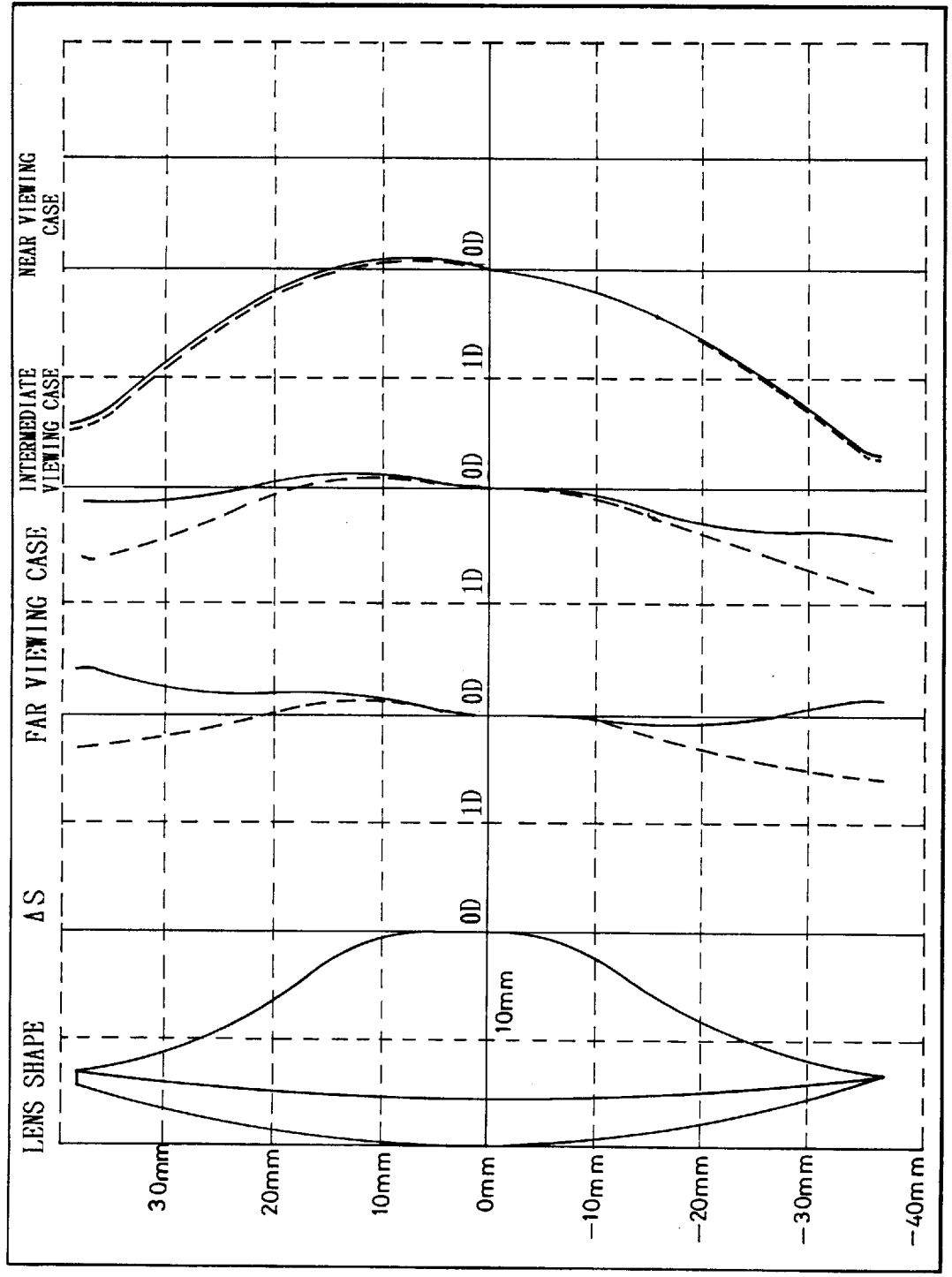
FIG. 16 is a graph for showing the relation among the shape of the positive-refractive-power aspherical spectacle lens (namely, the third embodiment of the present invention), in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

In the graphs, which respectively correspond to the case of far viewing, that of intermediate viewing and that of near viewing, of FIGS. 15 and 16, solid curves represent the oblique astigmatic errors, and broken curves represent the mean oblique errors. Incidentally, in the graphs of $\Delta S$ and the oblique astigmatic error and the mean oblique error in the cases of far viewing, of intermediate viewing and of near viewing, abscissas are represented in units of diopters.

Moreover, as is seen or understood from the figures, in the case of the positive-refractive-power aspherical spectacle lenses of FIGS. 14, 15 and 16, variation in the oblique astigmatic error due to the decentration is small in the vicinity of the optical axis (namely, a region in which the distance from the optical axis ranges from 5 to 10 mm) in comparison with the conventional positive-refractive-power aspherical spectacle lenses of FIGS. 62, 63 and 64.

Furthermore, in the case of the positive-refractive-power aspherical spectacle lenses according to the third embodiment, as is seen from these figures, there is very little mean oblique error at places located in the vicinity of the optical axis even if the places are off the optical axis thereof, so that a deviation in the refractive power of the lens at the time of measuring the refractive power is small, similarly as in the case of the positive-refractive-power aspherical spectacle lenses according to the first embodiment of the present invention.

Figure 17:
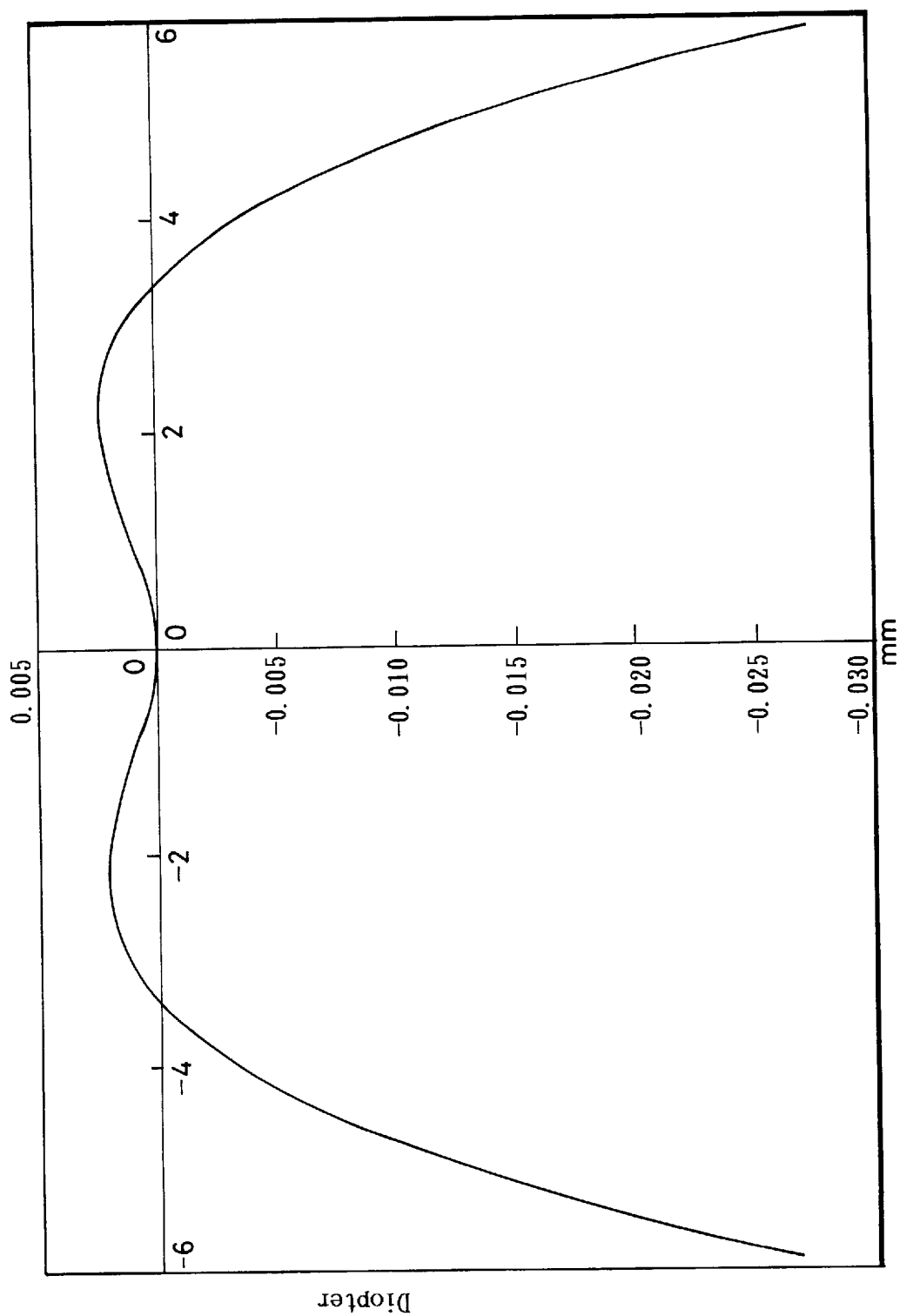
FIG. 17 is a graph for showing the difference ΔS caused in the positive-refractive-power aspherical spectacle lens (namely, the third embodiment of the present invention)

The following "TABLE 6" presents $\Delta S$ in the case of the positive-refractive-power aspherical spectacle lens of FIG. 14. Further, FIG. 17 illustrates $\Delta S$ caused in the proximity of the optical axis in the case of the positive-refractive-power aspherical spectacle lens of FIG. 14.

TABLE 6

| ρ (mm) | $\Delta S$ (in diopters) |
|---|---|
| 0.000 | 0.00000 |
| 1.028 | 0.00105 |
| 2.057 | 0.00227 |
| 3.090 | 0.00116 |

TABLE 6-continued

| ρ (mm) | ΔS (in diopters) |
|---|---|
| 4.128 | −0.00422 |
| 5.173 | −0.01541 |

As is shown in TABLE 6 and FIG. 17, the inequality (3) is satisfied in a region of 10-mm diameter from the optical axis.

Further, as is seen from TABLE 6 and FIG. 17, ΔS takes a positive value at least once at the distance ρ in the range: 0<ρ≦5 (mm). Moreover, ΔS takes a negative value in a peripheral portion of the lens.

Figure 18:
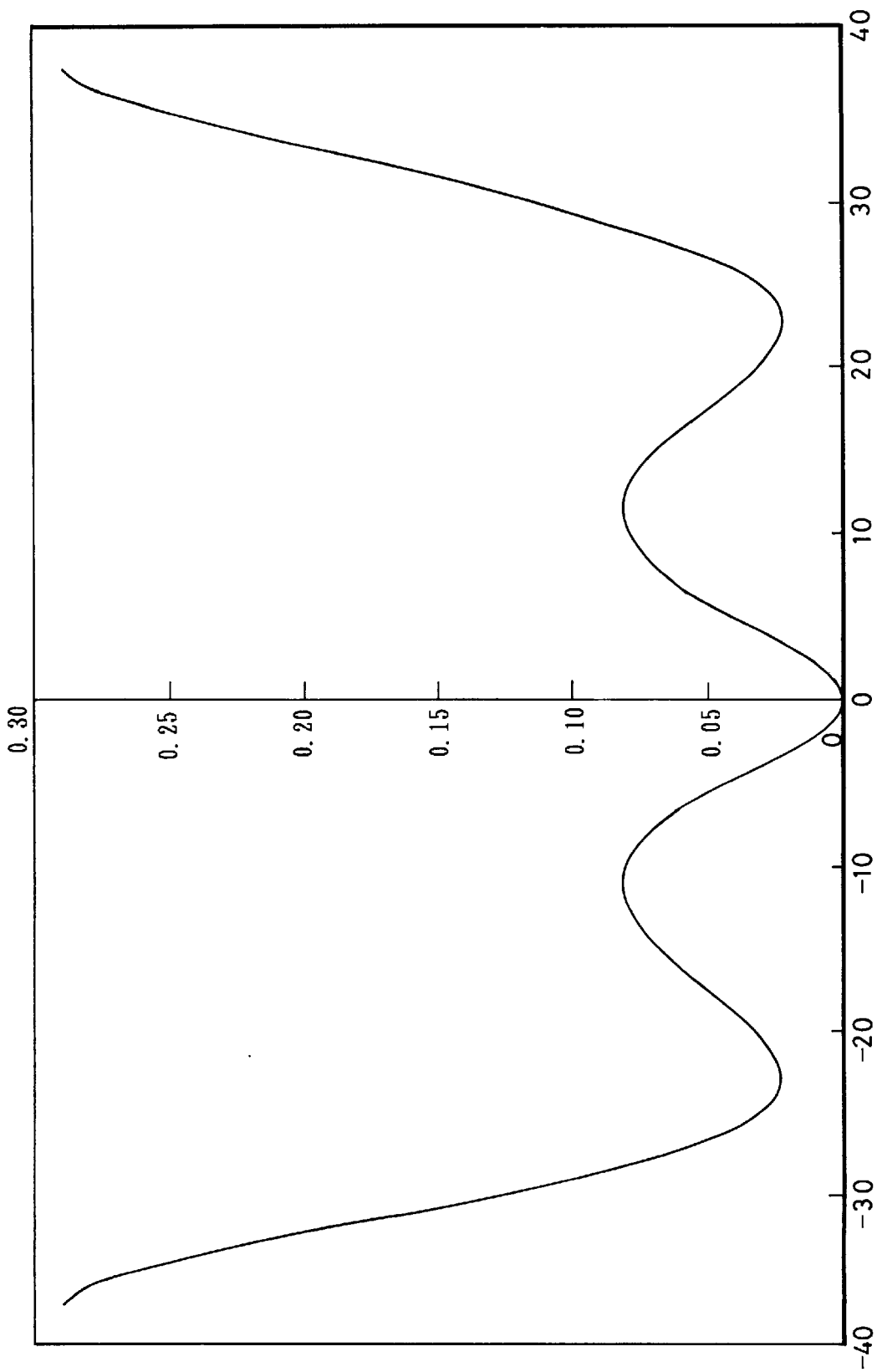
FIG. 18 is a graph for showing the oblique astigmatic error caused in the positive-refractive-power aspherical spectacle lens (namely, the third embodiment of the present invention)

FIG. 18 shows the oblique astigmatic error caused in the positive-refractive-power aspherical spectacle lens of FIG. 14. In FIG. 18, abscissas represent the distance from the optical axis thereof (in mm); and ordinates the oblique astigmatic error (in diopters).

As is seen from FIG. 18, in a region, which has a diameter of 40 mm, around the optical axis, in the far-viewing case, the oblique astigmatic error is within the range between ±0.15 (in diopters).

Figure 19:
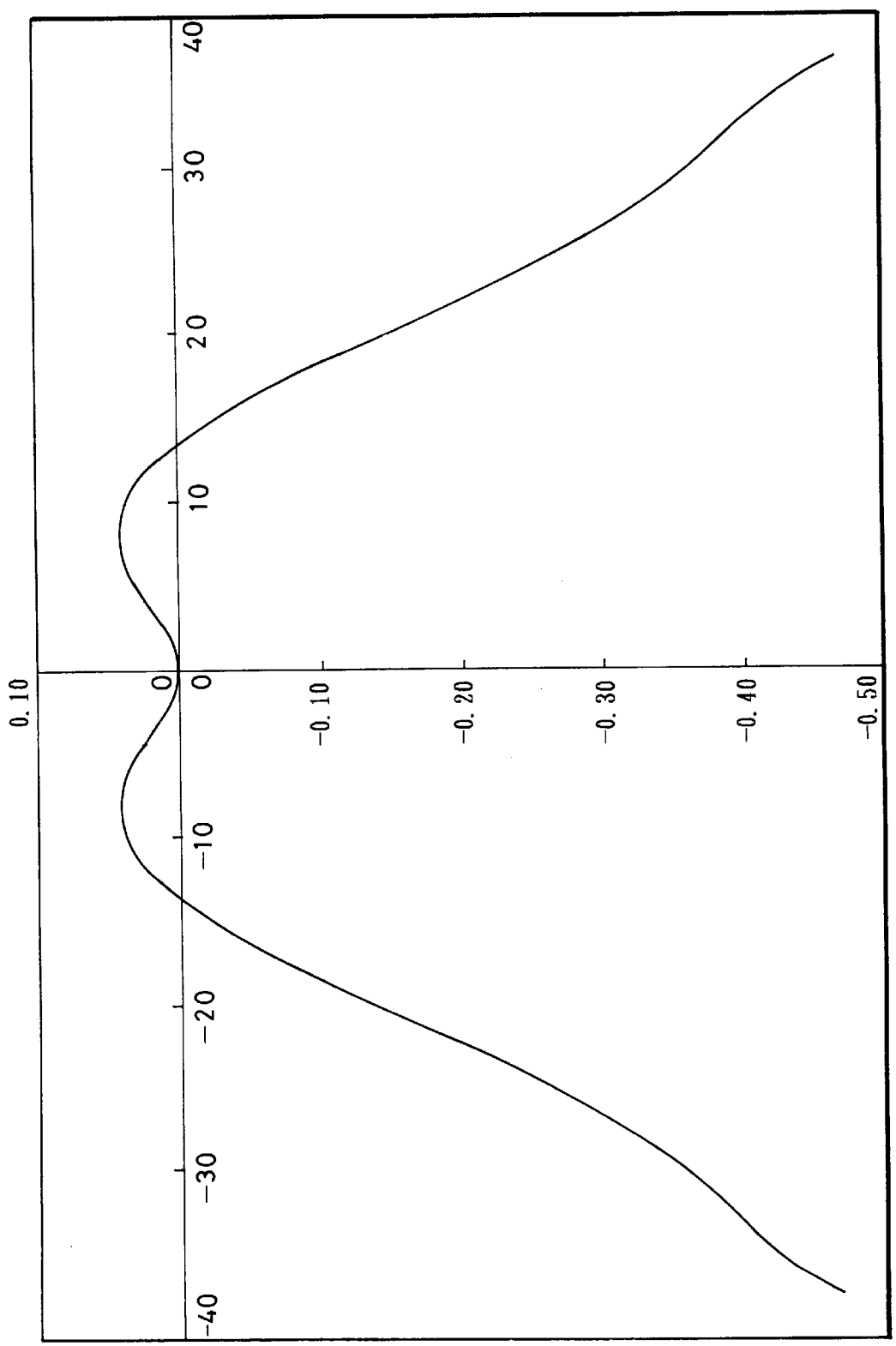
FIG. 19 is a graph for showing the mean oblique error caused in the positive-refractive-power aspherical spectacle lens (namely, the third embodiment of the present invention)

FIG. 19 is a graph for showing the mean oblique error caused in the positive-refractive-power aspherical spectacle lens of FIG. 14. In FIG. 19, abscissas represent the distance from the optical axis thereof (in mm); and ordinates the mean oblique error (in diopters).

As is seen from FIG. 19, in a region, which has a diameter of 30 mm, around the optical axis, in the far-viewing case, the mean oblique error is within the range between ±0.20 (in diopters).

As above described, the third embodiment has advantages or effects similar to those of the first and second embodiments.

Next, negative-refractive-power aspherical spectacle lenses embodying the present invention will be described hereunder.

Fourth Embodiment

Figure 20:
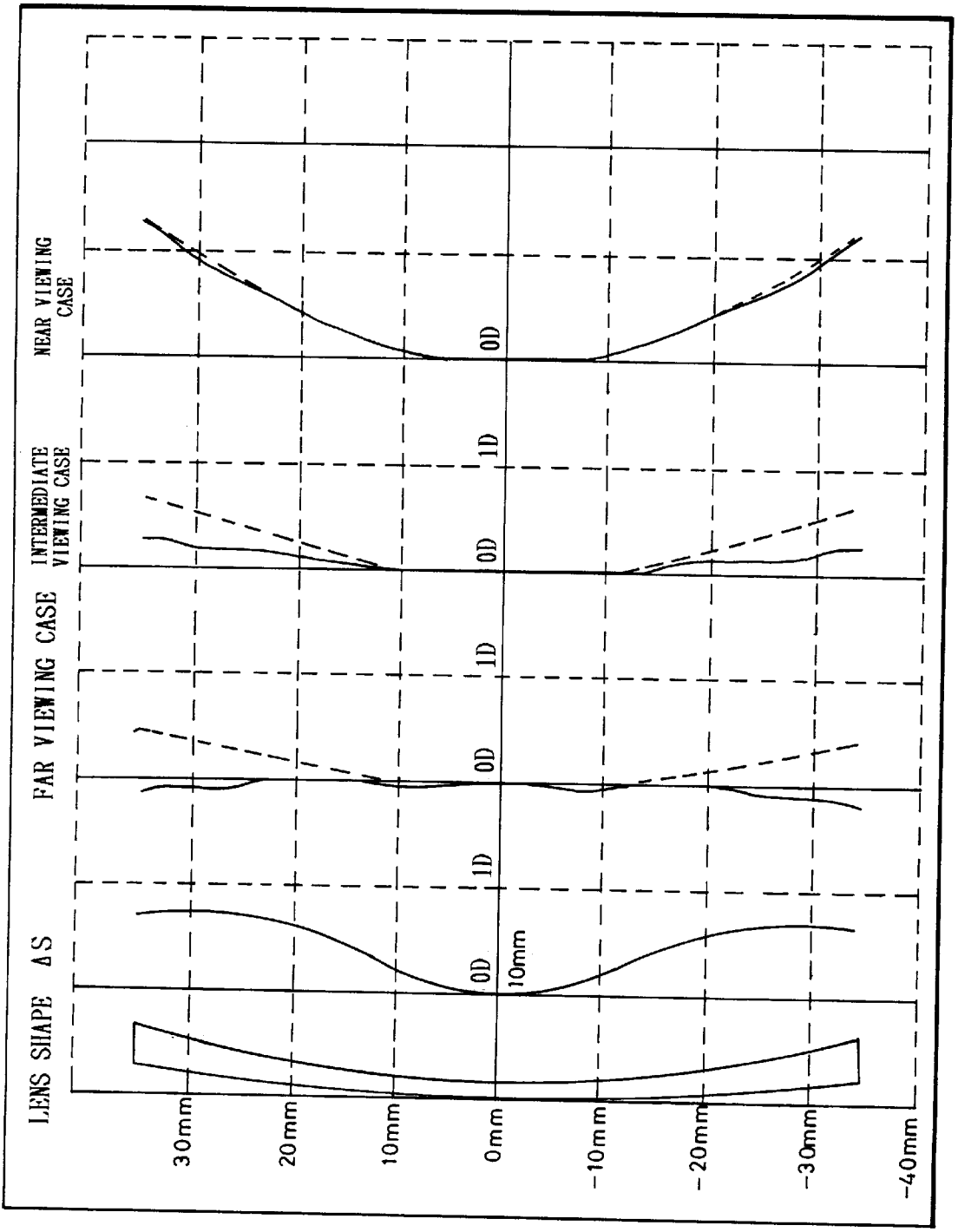
FIG. 20 is a graph for showing the relation among the shape of a negative-refractive-power aspherical spectacle lens (namely, a fourth embodiment of the present invention), in which no decentration is caused, the difference ΔS caused therein, the oblique astigmatic error caused therein in the far-viewing case, the oblique astigmatic error caused therein in the intermediate-viewing case and the oblique astigmatic error caused therein in the near-viewing case.

FIG. 20 illustrates the relation among the lens shape of a negative-refractive-power aspherical spectacle lens (namely, the fourth embodiment of the present invention) in which no decentration is caused, the difference ΔS, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. Here, note that ΔS is corresponding to the first surface. In the graphs of FIG. 20 respectively corresponding to the case of far viewing, that of intermediate viewing and that of near viewing, solid curves represent the oblique astigmatic errors, and broken curves represent the mean oblique errors. Incidentally, in the graphs of ΔS and the oblique astigmatic error and the mean oblique error in the cases of far viewing, of intermediate viewing and of near viewing, abscissas are represented in units of diopters.

The first surface of the negative-refractive-power aspherical spectacle lens of FIG. 20 is defined by the equation (2). Further, in the case of this negative-refractive-power aspherical spectacle lens, the design thereof in a starting stage is performed by taking decentration aberration, which is caused when this lens is "shifted" 4 mm from the optical axis thereof, into consideration as a target value of optimization, in addition to a usual target value of optimization. Moreover, the design of this lens is performed by further taking decentration aberration, which is caused when only the first surface of this lens is "shifted" 4 mm from the optical axis thereof, into consideration as a target value of optimization.

Further, the second refractive surface of the negative-refractive-power aspherical spectacle lens of FIG. 20 has a spherical shape.

Moreover, the refractive-power, diameter, refractive index and shape of the negative-refractive-power aspherical spectacle lens of FIG. 20, whose first surface (namely, the left-side surface as shown in FIG. 20) is an aspherical surface defined by the equation (2), are presented in the following "TABLE 7".

TABLE 7

| | |
|---|---|
| Refractive Power: | −3.0 D |
| Lens Diameter: | ϕ70 mm |
| Refractive Index ($n_e$): | 1.501 |
| Center Thickness: | 1.00 mm |
| Front-surface Curvature: | $2.99102 \times 10^{-3}$ |
| Back-surface Curvature: | $8.98204 \times 10^{-3}$ |
| Aspherical Coefficients: | |
| $A_2 = 0.00000$ | |
| $A_3 = 0.00000$ | |
| $A_4 = -3.87251 \times 10^{-7}$ | |
| $A_5 = 8.74372 \times 10^{-8}$ | |
| $A_6 = -3.97826 \times 10^{-9}$ | |
| $A_7 = 7.55435 \times 10^{-11}$ | |
| $A_8 = -5.38317 \times 10^{-12}$ | |

In the case of this embodiment of the present invention, the decentration corresponding to the ratio (K/H)=4/70= 0.057 (incidentally, K designates a vertical change in decentration (namely, an amount of the shift taken into account when designing the lens (mm); and H a maximum outside-diameter (namely, a lens diameter) (mm)) is taken into consideration.

Figure 21:
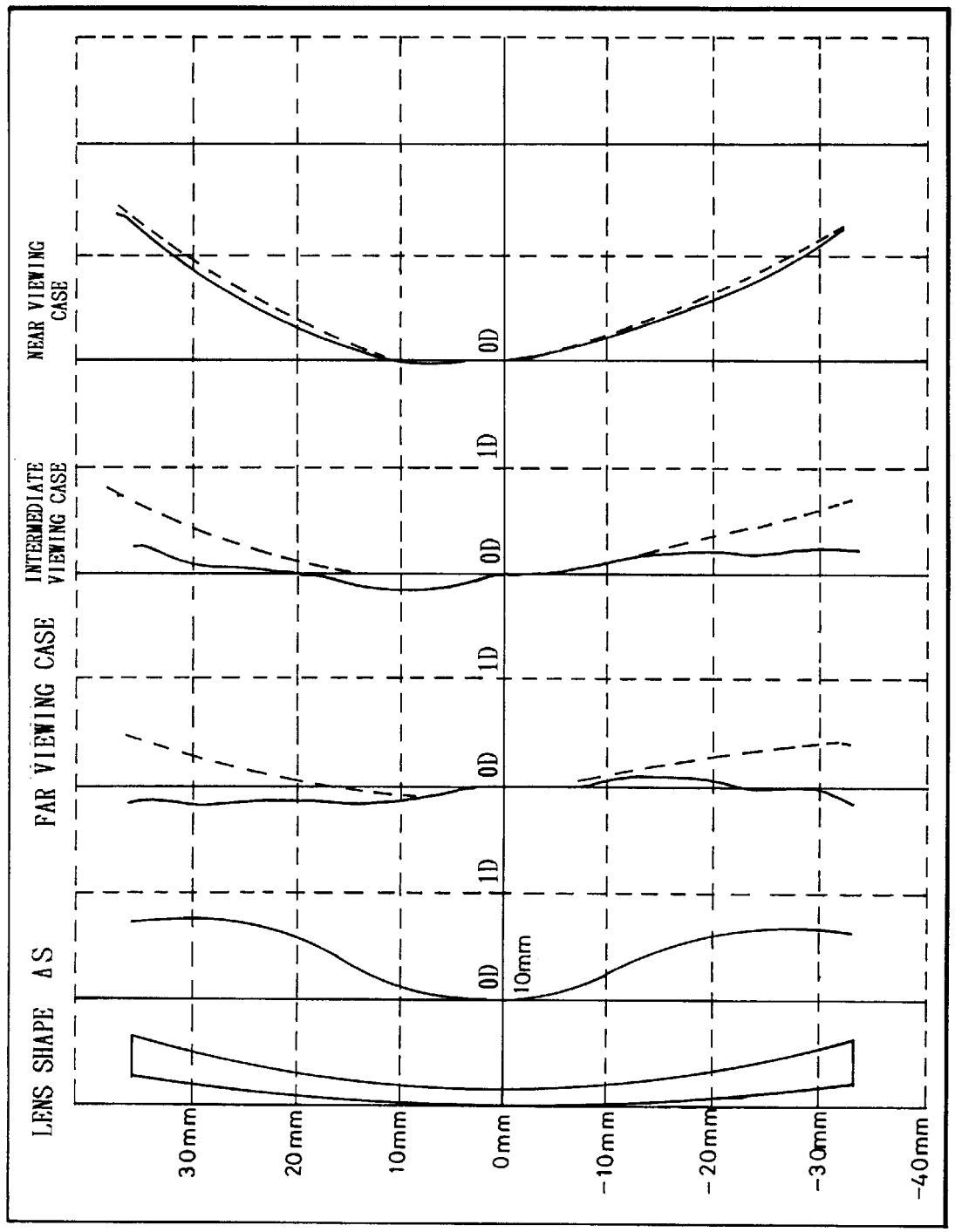
FIG. 21 is a graph for showing the relation among the shape of this negative-refractive-power aspherical spectacle lens (namely, the fourth embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 21, there is shown the relation among the (lens) shape of the negative-refractive-power aspherical spectacle lens of FIG. 20, which is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 22:
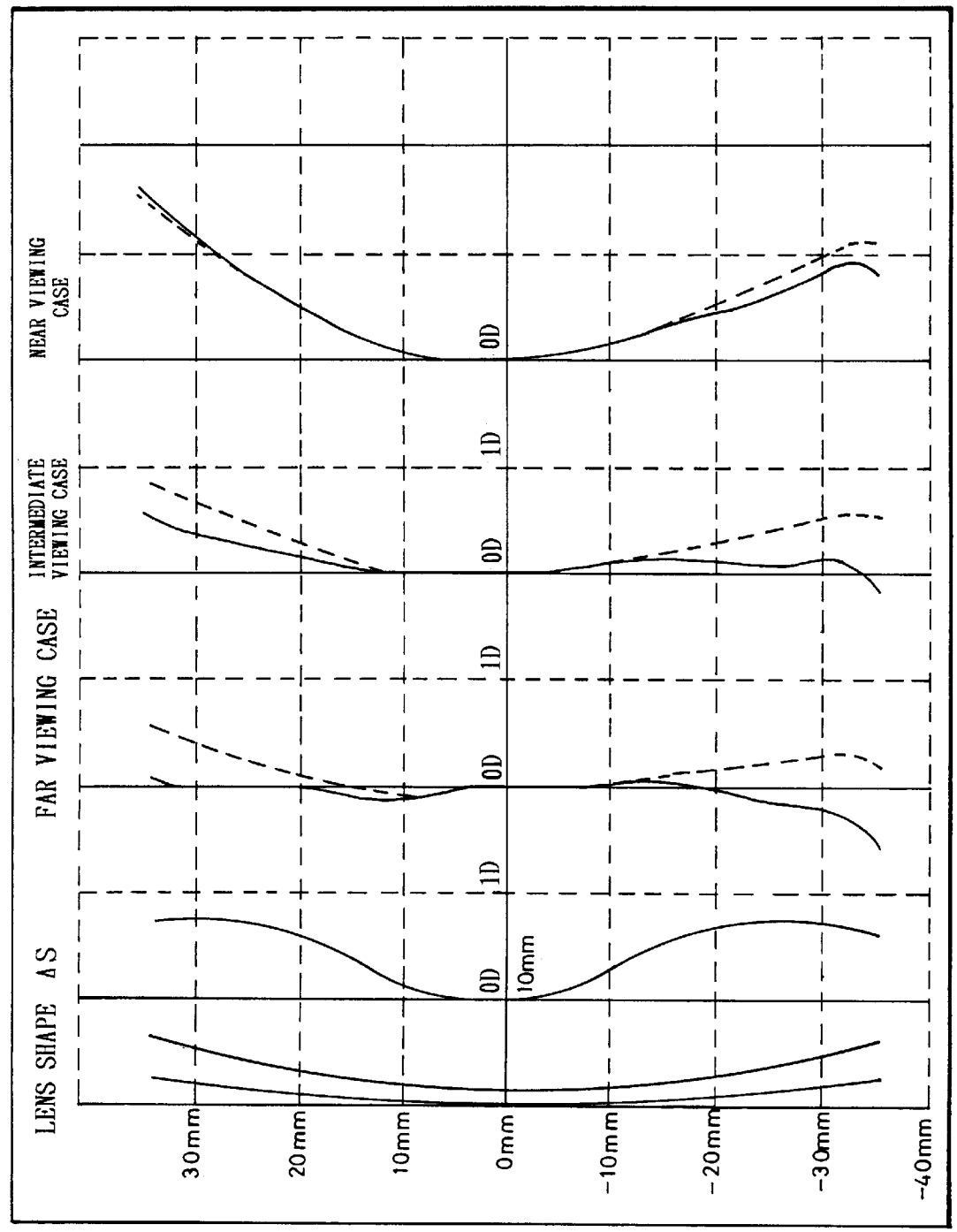
FIG. 22 is a graph for showing the relation among the shape of the negative-refractive-power aspherical spectacle lens (namely, the fourth embodiment of the present invention), in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Further, referring now to FIG. 22, there is shown the relation among the (lens) shape of the negative-refractive-power aspherical spectacle lens of FIG. 20, in which only first surface is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 68:
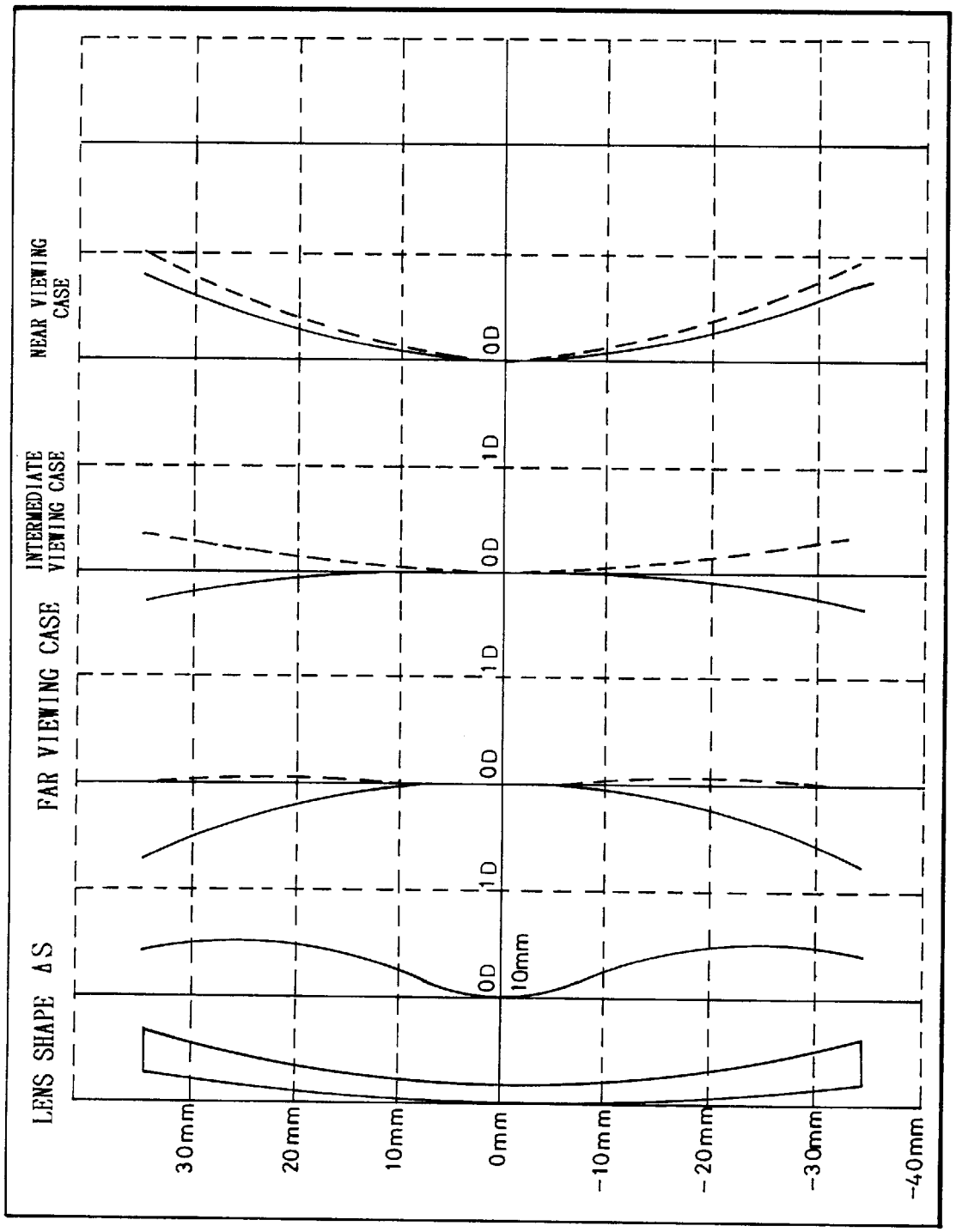
FIG. 68 is a graph for showing the relation among the shape of a conventional negative-refractive-power aspherical spectacle lens designed without taking decentration into consideration, in which no decentration is caused, the difference ΔS caused therein, the oblique astigmatic error caused therein in the far-viewing case, the oblique astigmatic error caused therein in the intermediate-viewing case and the oblique astigmatic error caused therein in the near-viewing case.
Figure 69:
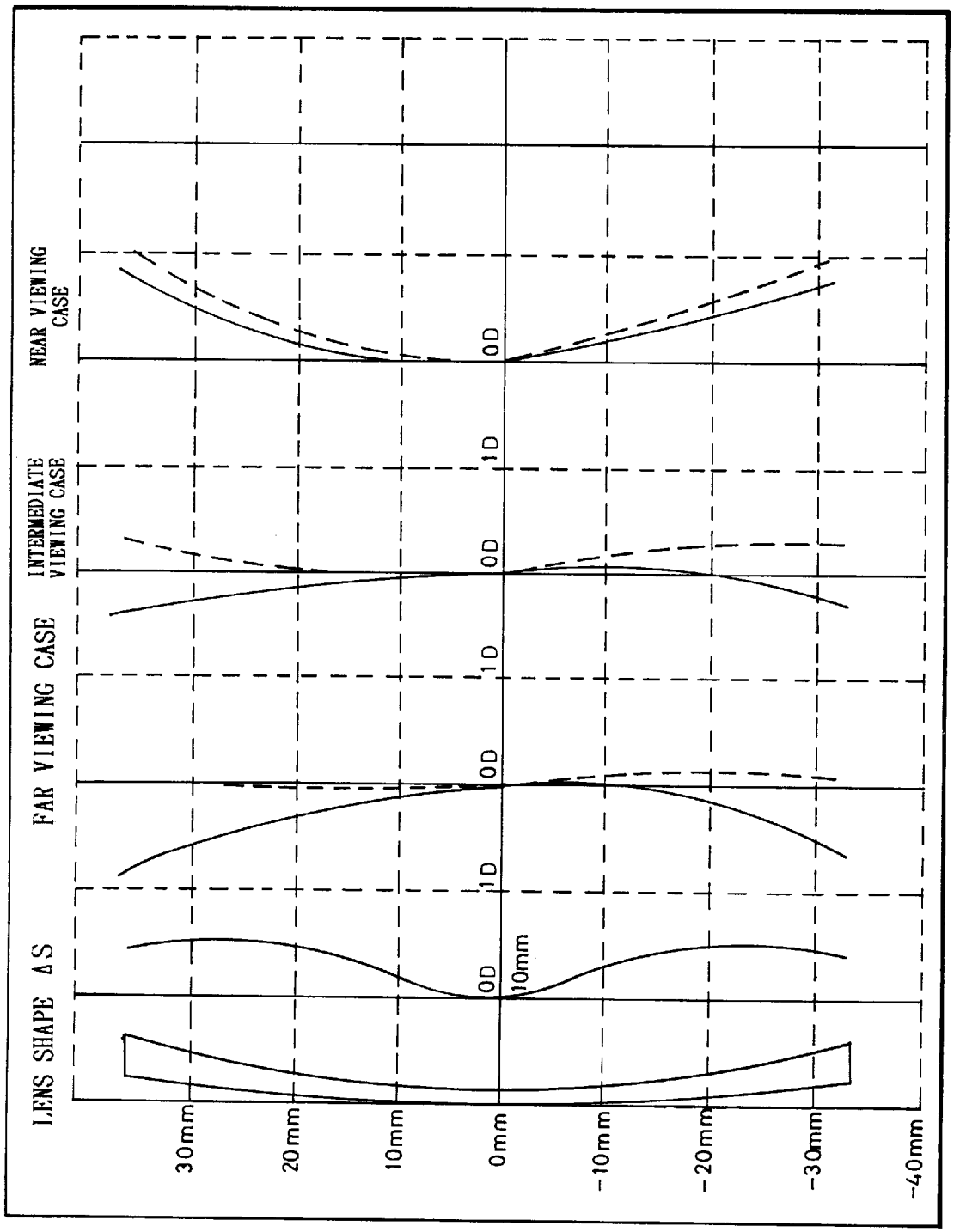
FIG. 69 is a graph for showing the relation among the shape of a conventional negative-refractive-power aspherical spectacle lens, which is designed without taking decentration into consideration and is shifted from the optical axis by 2 mm, the difference ΔS caused therein, the oblique astigmatic caused therein in the far-viewing case, the oblique astigmatic error caused therein in the intermediate-viewing case and the oblique astigmatic error caused therein in the near-viewing case.
Figure 70:
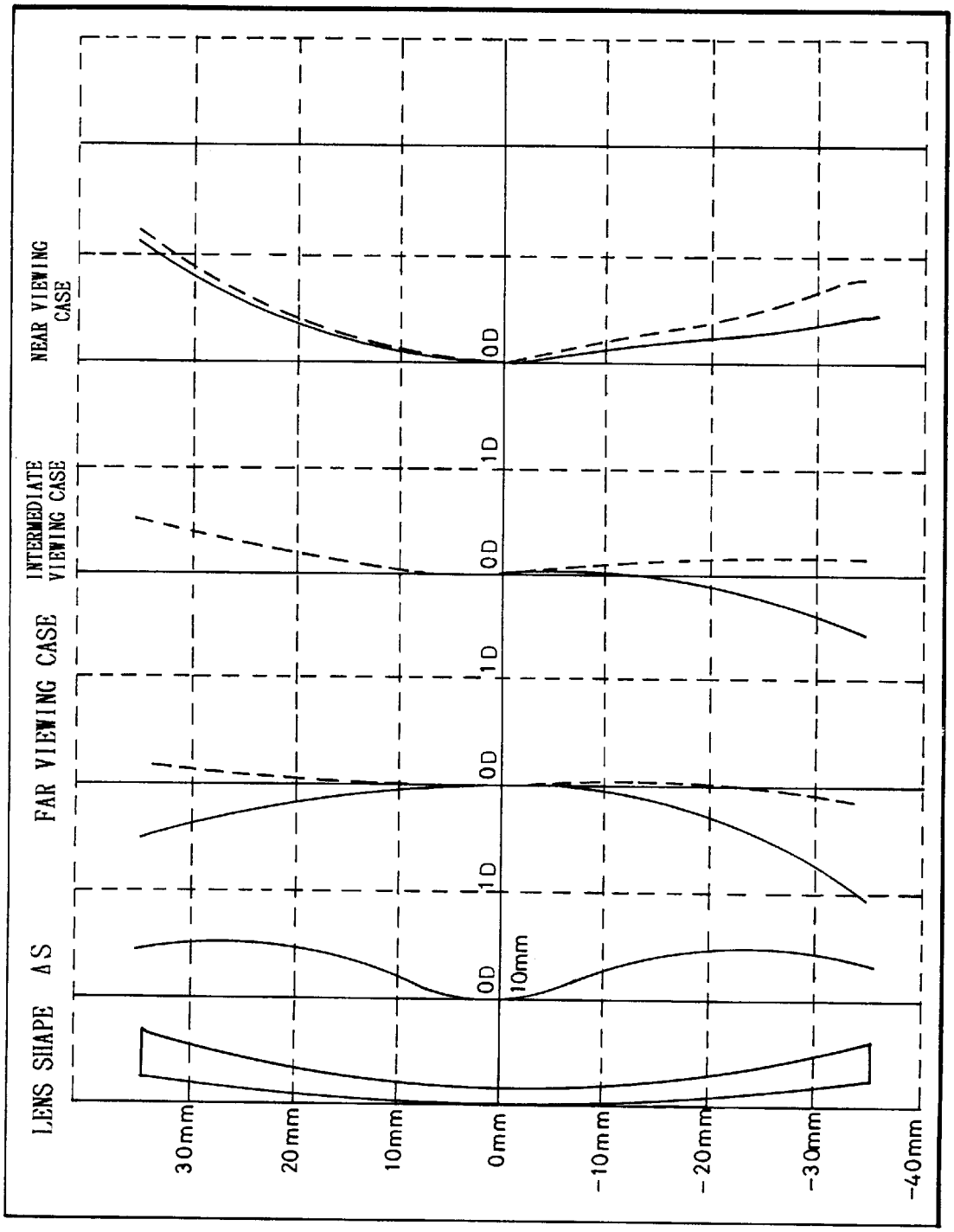
FIG. 70 is a graph for showing the relation among the shape of a conventional negative-refractive-power aspherical spectacle lens designed without taking decentration into consideration, in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Moreover, FIGS. 68, 69 and 70 respectively correspond to a case where no decentration is caused in a conventional negative-refractive-power aspherical spectacle lens designed without taking decentration into consideration, another case where the conventional negative-refractive-power aspherical spectacle lens is "shifted" 2 mm from the optical axis thereof, and still another case where only the first surface of the conventional negative-refractive-power aspherical spectacle lens is "shifted" 2 mm from the optical axis thereof. Furthermore, each of FIGS. 68, 69 and 70 illustrates the relation among the (lens) shape of the conventional negative-refractive-power aspherical spectacle lens in the corresponding case, a quantity ΔS, the oblique astigmatic error and the mean oblique error caused therein in the case of far or infinite viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 71:
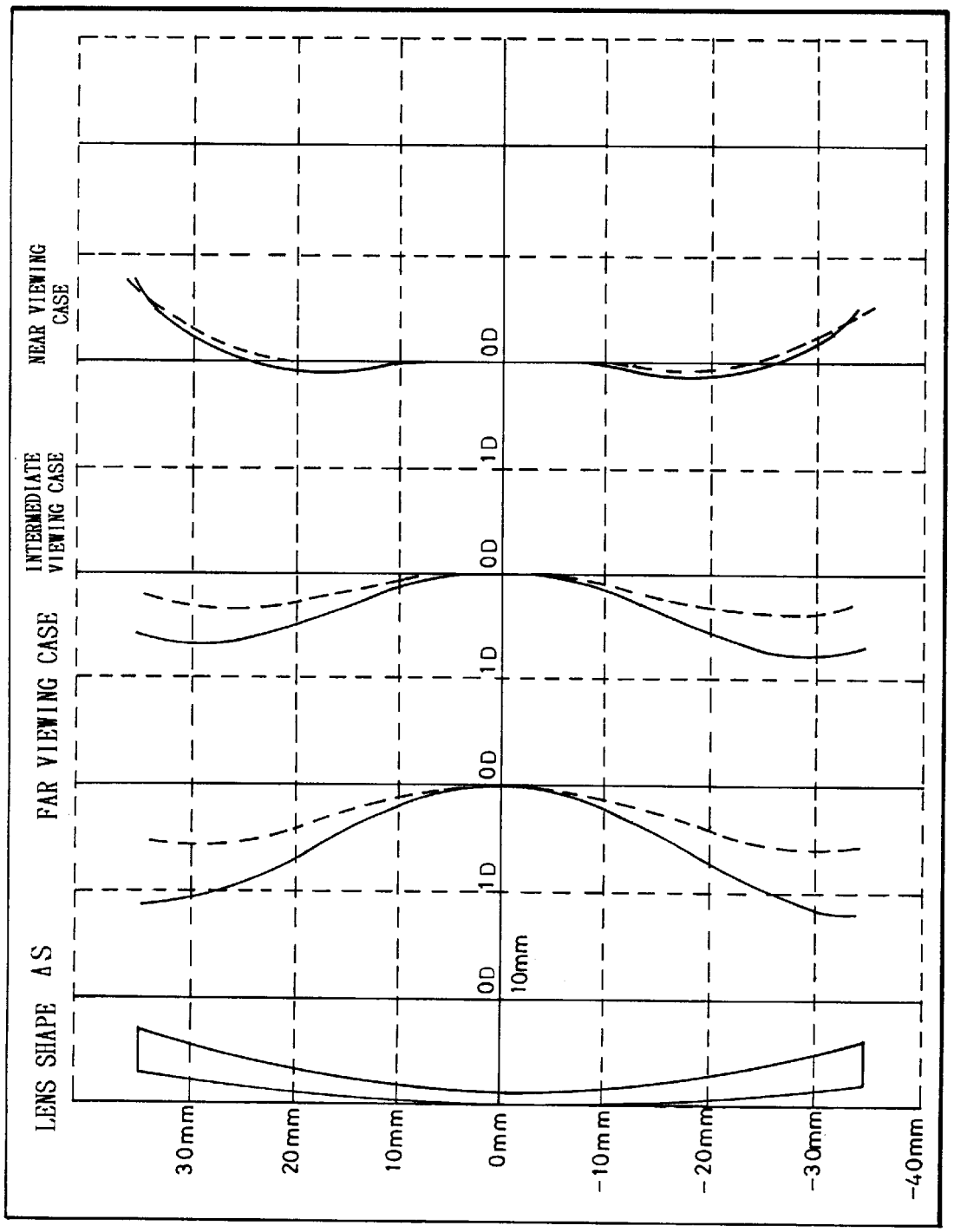
FIG. 71 is a graph for showing the relation among the shape of a conventional negative-refractive-power aspherical spectacle lens, in which no decentration is caused, the difference ΔS caused therein, the oblique astigmatic error caused therein in the far-viewing case, the oblique astigmatic error caused therein in the intermediate-viewing case and the oblique astigmatic error caused therein in the near-viewing case.
Figure 72:
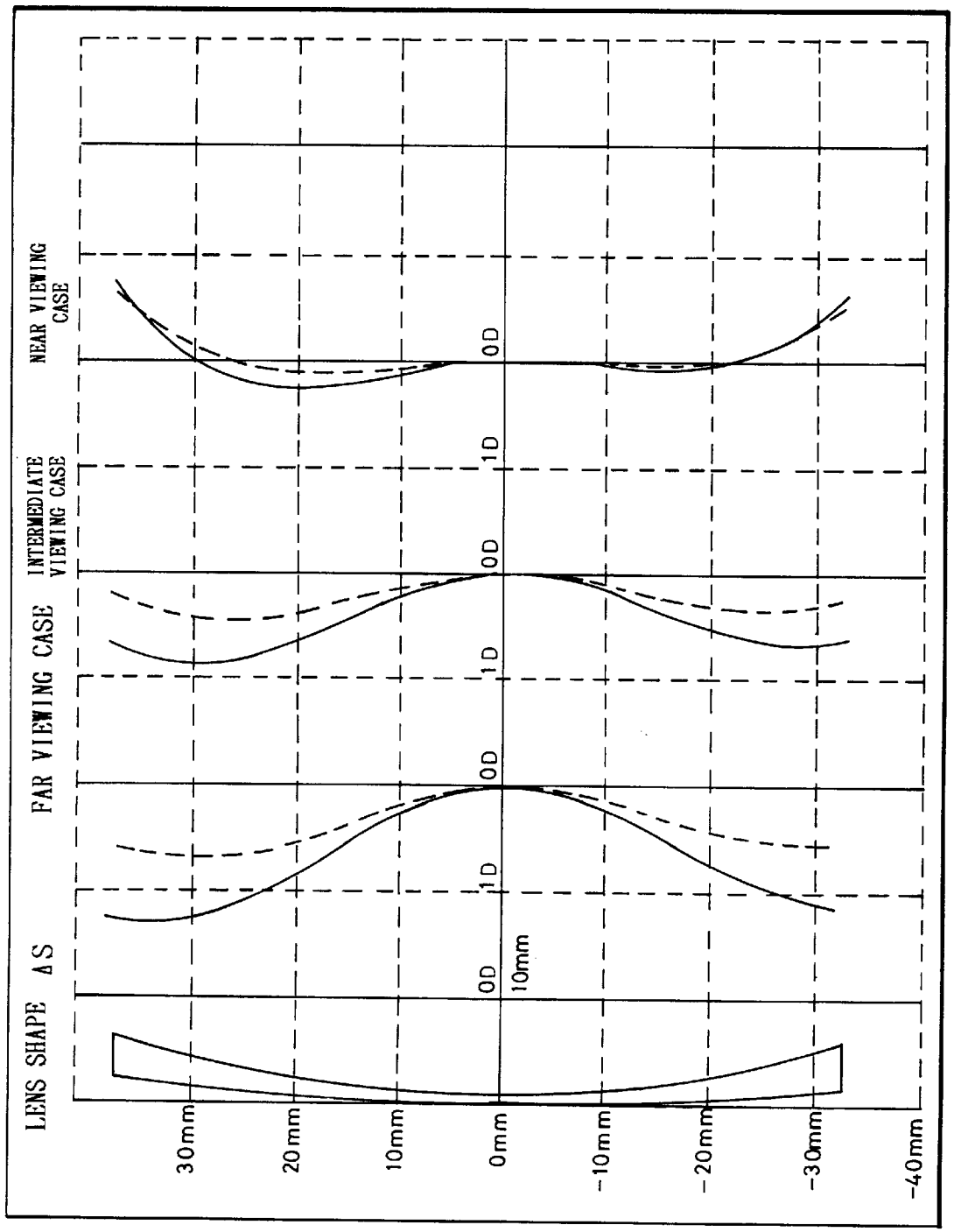
FIG. 72 is a graph for showing the relation among the shape of a conventional negative-refractive-power aspherical spectacle lens, which is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.
Figure 73:
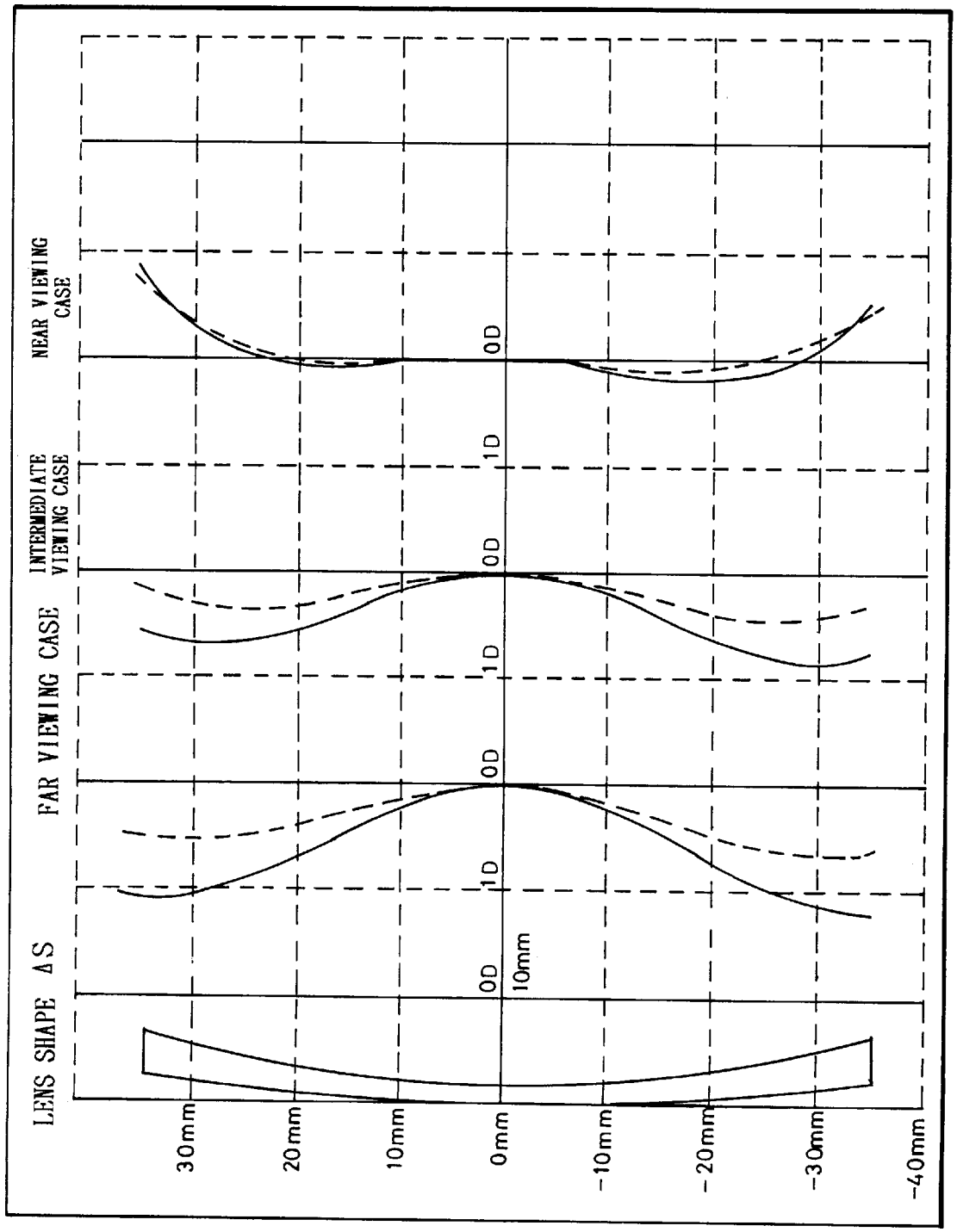
FIG. 73 is a graph for showing the relation among the shape of a conventional negative-refractive-power aspherical spectacle lens, in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Additionally, FIGS. 71, 72 and 73 respectively correspond to a case where no decentration is caused in a conventional negative-refractive-power aspherical spectacle lens, another case where the conventional negative-refractive-power aspherical spectacle lens is "shifted" 2 mm from the optical axis thereof, and still another case where only the first surface of the conventional negative-refractive-power aspherical spectacle lens is "shifted" 2 mm from the optical axis thereof. Further, each of FIGS. 71, 72 and 73 illustrates the relation among the (lens) shape of the conventional negative-refractive-power aspherical spectacle lens in the corresponding case, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of far viewing, that of intermediate viewing and that of near viewing, of FIGS. 21, 22, 68 to 73, solid curves represent the oblique astigmatic error, and broken curves represent the mean oblique errors. Incidentally, in the graphs of ΔS and the oblique astigmatic error and the mean oblique error in the cases of far viewing, of intermediate viewing and of near viewing, abscissas are represented in units of diopters.

As is seen or understood from these figures, in the case of the negative-refractive-power aspherical spectacle lenses of FIGS. 20, 21 and 22, variation in the oblique astigmatic error due to the decentration is small in the vicinity of the optical axis (namely, a region in which the distance from the optical axis ranges from 5 to 10 mm) in comparison with the conventional negative-refractive-power aspherical spectacle lenses of FIGS. 68, 69 and 70.

Further, in the case of the conventional negative-refractive-power aspherical spectacle lenses of FIGS. 68, 69 and 70, as is seen from these figures, mean oblique errors are caused owing to the influence of the aspherical surface at a place which is slightly off the optical axis thereof, so that a deviation in the refractive power of the lens occurs when measuring the refractive power thereof by using a lens meter. In the case of the negative-refractive-power aspherical spectacle lenses according to the fourth embodiment of FIGS. 20, 21 and 22, as is seen from these figures, there is very little mean oblique error at places located in the vicinity of the optical axis even if the places are off the optical axis thereof, so that a deviation in the refractive power of the lens at the time of measuring the refractive power is small.

The following "TABLE 8" presents ΔS in the case of the negative-refractive-power aspherical spectacle lens of FIG. 20. Further, FIG. 23 illustrates ΔS caused in the proximity of the optical axis in the case of the negative-refractive-power aspherical spectacle lens of FIG. 20.

TABLE 8

| ρ (mm) | ΔS (in diopters) |
|---|---|
| 0.000 | 0.00000 |
| 0.924 | −0.00134 |
| 2.160 | −0.00326 |
| 3.090 | −0.00139 |
| 4.030 | 0.00539 |
| 4.980 | 0.01830 |

Figure 23:
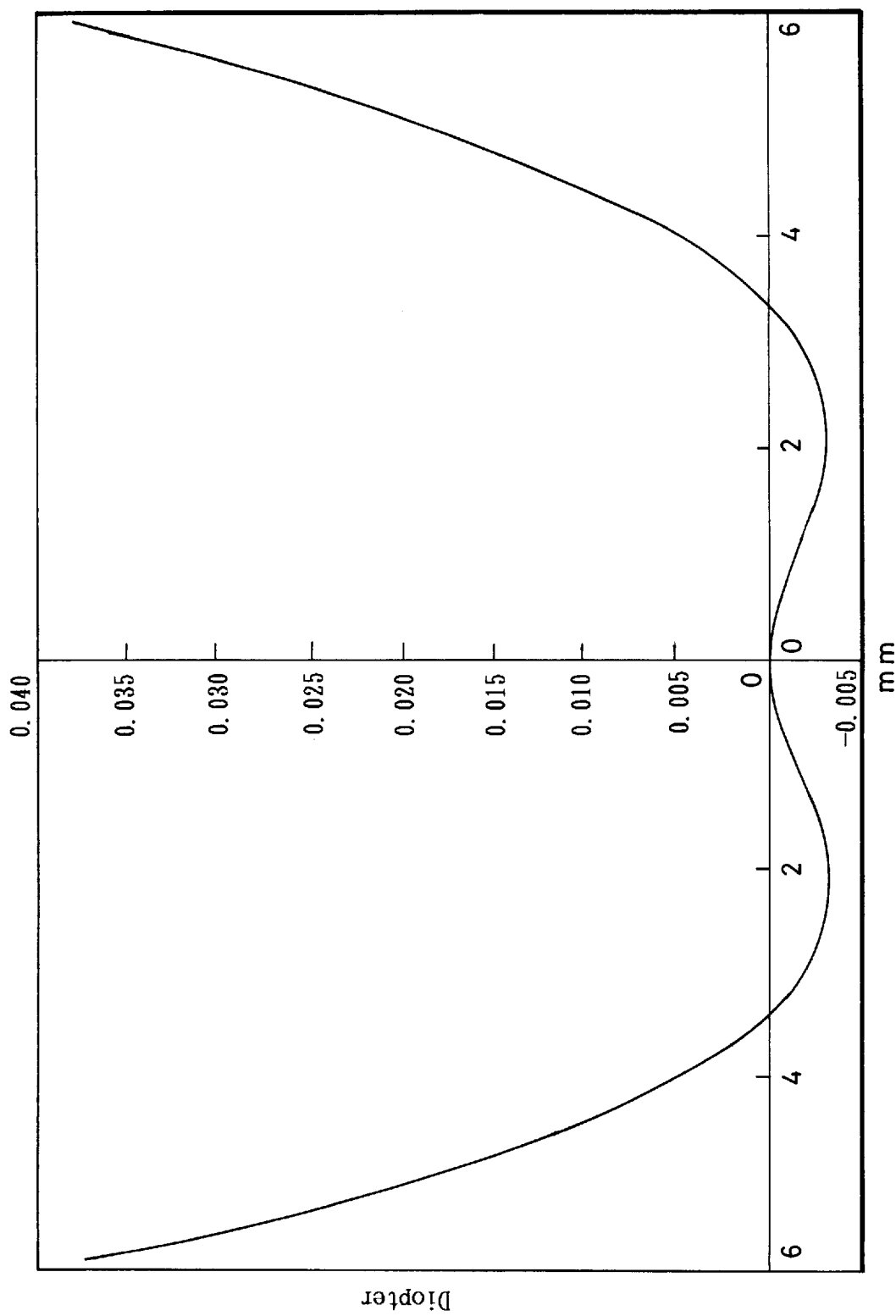
FIG. 23 is a graph for showing the difference ΔS caused in the negative-refractive-power aspherical spectacle lens (namely, the fourth embodiment of the present invention)

As is shown in TABLE 8 and FIG. 23, the inequality (3) is satisfied in a region of 10-mm diameter from the optical axis. Namely, in the region of 10-mm diameter from the optical axis, ΔS is very small sufficiently to the extent that ΔS is considered as being negligible.

If ΔS exceeds the upper and lower limits thereof indicated in the inequality (3), the performance of the lens is affected by the aspherical surface. Further, the decentration tolerance in the case of causing the decentration cannot be secured.

Further, as is seen from TABLE 8 and FIG. 23, ΔS takes a negative value at least once at the distance ρ in the range: $0<\rho \leq 5$ (mm). Moreover, Δs takes a positive value in a peripheral portion of the lens.

Figure 24:
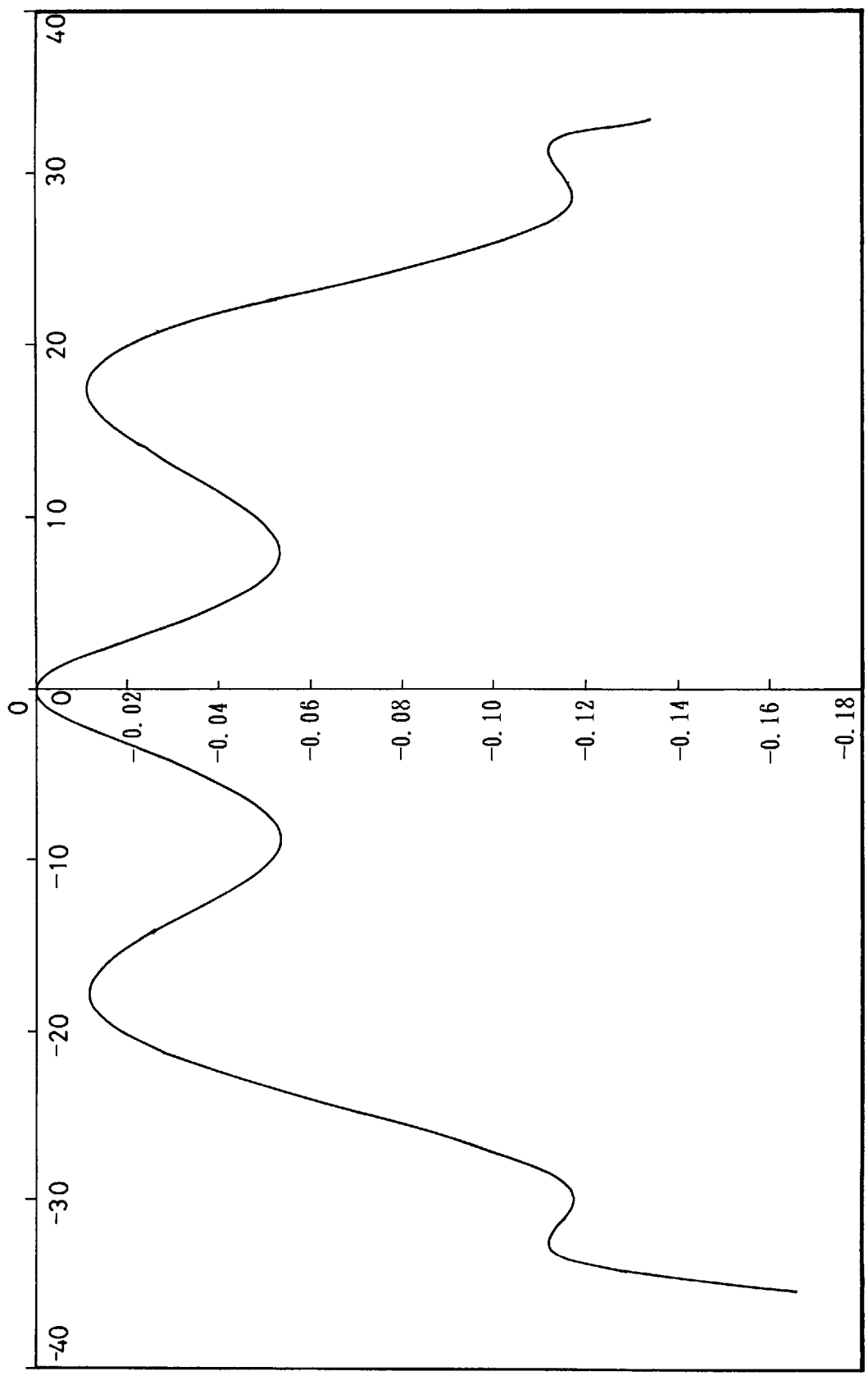
FIG. 24 is a graph for showing the oblique astigmatic error caused in the negative-refractive-power aspherical spectacle lens (namely, the fourth embodiment of the present invention)

FIG. 24 shows the oblique astigmatic error caused in the negative-refractive-power aspherical spectacle lens of FIG. 20. In FIG. 24, abscissas represent the distance from the optical axis thereof (in mm); and ordinates the oblique astigmatic error (in diopters).

As is seen from FIG. 24, in a region, which has a diameter of 40 mm, around the optical axis, in the far-viewing case, the oblique astigmatic error is within the range between ±0.15 (in diopters).

Figure 25:
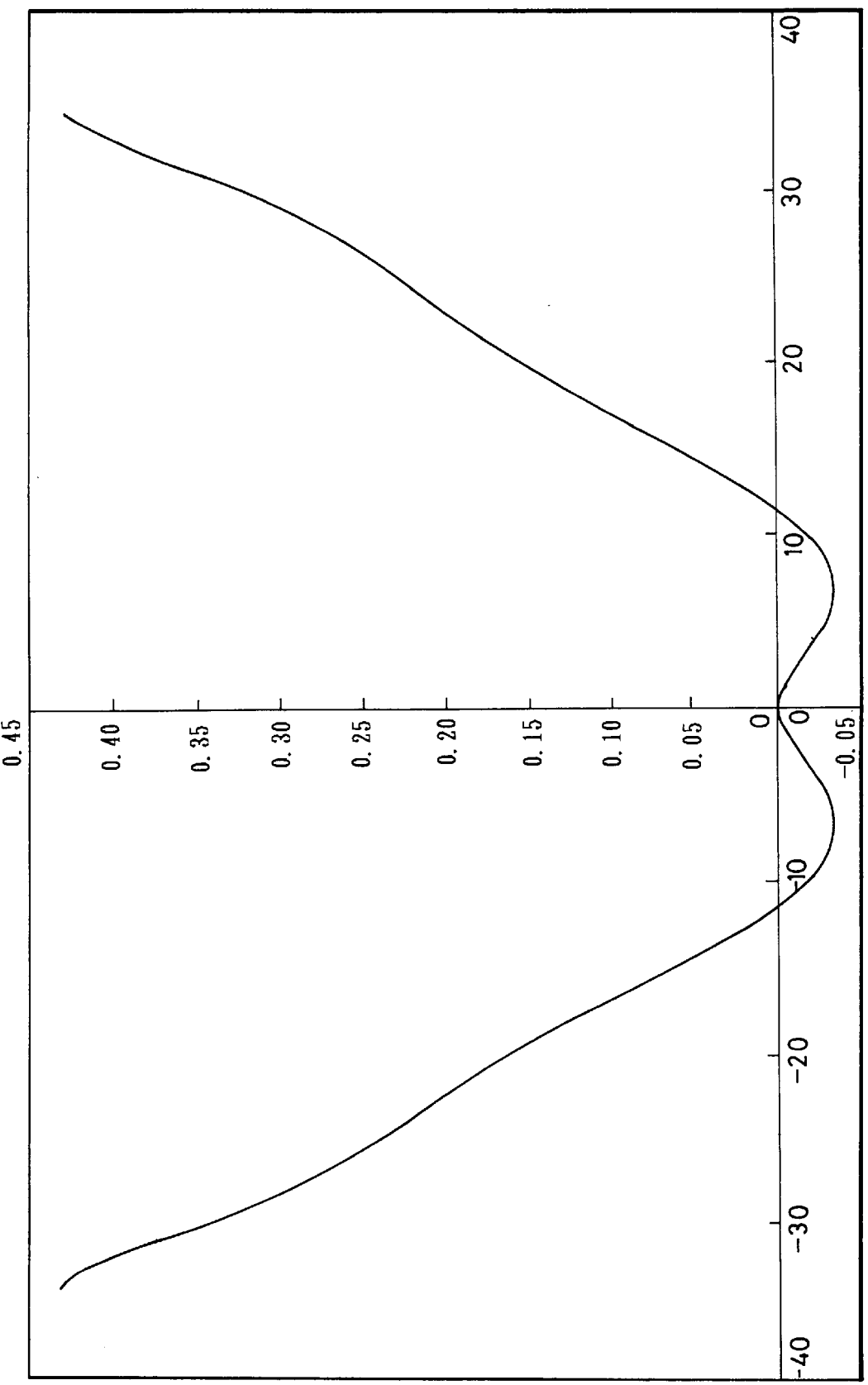
FIG. 25 is a graph for showing the mean oblique error caused in the negative-refractive-power aspherical spectacle lens (namely, the fourth embodiment of the present invention)

FIG. 25 is a graph for showing the mean oblique error caused in the negative-refractive-power aspherical spectacle lens of FIG. 20. In FIG. 25, abscissas represent the distance from the optical axis thereof (in mm); and ordinates the mean oblique error (in diopters).

As is seen from FIG. 25, in a region, which has a diameter of 30 mm, around the optical axis, in the far-viewing case, the mean oblique error is within the range between ±0.20 (in diopters).

As above described, in the case of the fourth embodiment, the first surface is determined as defined in the equation (2). Thereby, the edge thickness of the lens is small in comparison with that of the conventional spherical lens. Moreover, the design of the lens is performed by taking the decentration into consideration. Thus, the performance degradation due to the decentration is reduced.

Fifth Embodiment

Figure 26:
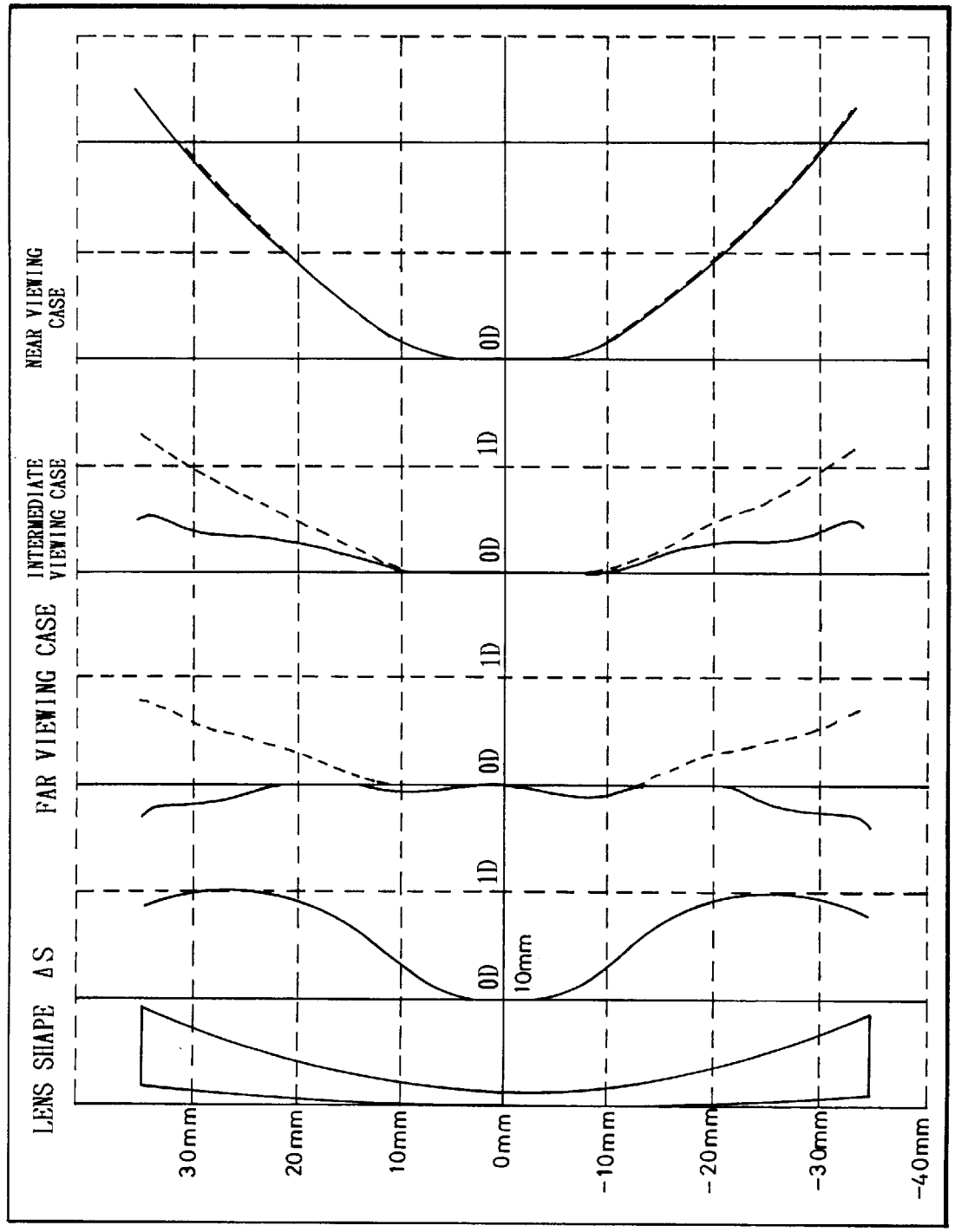
FIG. 26 is a graph for showing the relation among the shape of a negative-refractive-power aspherical spectacle lens (namely, a fifth embodiment of the present invention), in which no decentration is caused, the difference ΔS caused therein, the oblique astigmatic error caused therein in the case of viewing long-distance places, the oblique astigmatic error caused therein the case of viewing middle-distance places and the oblique astigmatic error caused therein the case of viewing short-distance places.

FIG. 26 illustrates the relation among the lens shape of another negative-refractive-power aspherical spectacle lens (namely, the fifth embodiment of the present invention) in which no decentration is caused, the difference ΔS, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. Here, note that ΔS is corresponding to the first surface. In the graphs of FIG. 26 respectively corresponding to the case of far viewing, that of intermediate viewing and that of near viewing, solid curves represent the oblique astigmatic errors, and broken curves represent the mean oblique errors. Incidentally, in the graphs of ΔS and the oblique astigmatic error and the mean oblique error in the cases of far viewing, of intermediate viewing and of near viewing, abscissas are represented in units of diopters.

The first surface of the negative-refractive-power aspherical spectacle lens of FIG. 26 is defined by the equation (2). Further, in the case of this negative-refractive-power aspherical spectacle lens, the design thereof in a starting stage is performed by taking decentration aberration, which is caused when this lens is "shifted" 4 mm from the optical axis thereof, into consideration as a target value of optimization, in addition to a usual target value of optimization. Moreover, the design of this lens is performed by further taking decentration aberration, which is caused when only the first surface of this lens is "shifted" 4 mm from the optical axis thereof, into consideration as a target value of optimization. Furthermore, the design of this lens is performed by setting the refractive power thereof at (−6.0) diopters (D).

Further, the second refractive surface of the negative-refractive-power aspherical spectacle lens of FIG. 20 has a spherical shape.

Moreover, the refractive power, diameter, refractive index and shape of the negative-refractive-power aspherical spectacle lens of FIG. 26, whose first surface (namely, the left-side surface as shown in FIG. 18) is an aspherical surface defined by the equation (2), are presented in the following "TABLE 9".

TABLE 9

| | |
|---|---|
| Refractive Power: | −6.0 D |
| Lens Diameter: | $\phi$70 mm |
| Refractive Index ($n_e$): | 1.501 |
| Center Thickness: | 1.00 mm |
| Front-surface Curvature: | $9.97672 \times 10^{-2}$ |
| Back-surface Curvature: | $1.29741 \times 10^{-4}$ |
| Aspherical Coefficients: | |
| $A_2 = 0.00000$ | |
| $A_3 = 0.00000$ | |
| $A_4 = -4.72996 \times 10^{-7}$ | |
| $A_5 = 1.33922 \times 10^{-7}$ | |
| $A_6 = -6.36412 \times 10^{-9}$ | |
| $A_7 = 1.22833 \times 10^{-10}$ | |
| $A_8 = -8.80950 \times 10^{-13}$ | |

In the case of this embodiment of the present invention, the decentration corresponding to the ratio (K/H)=4/70= 0.057 (incidentally, K designates a vertical change in decentration (namely, an amount of the shift taken into account when designing the lens (mm); and H a maximum outside-diameter (namely, a lens diameter) (mm)) is taken into consideration.

Figure 27:
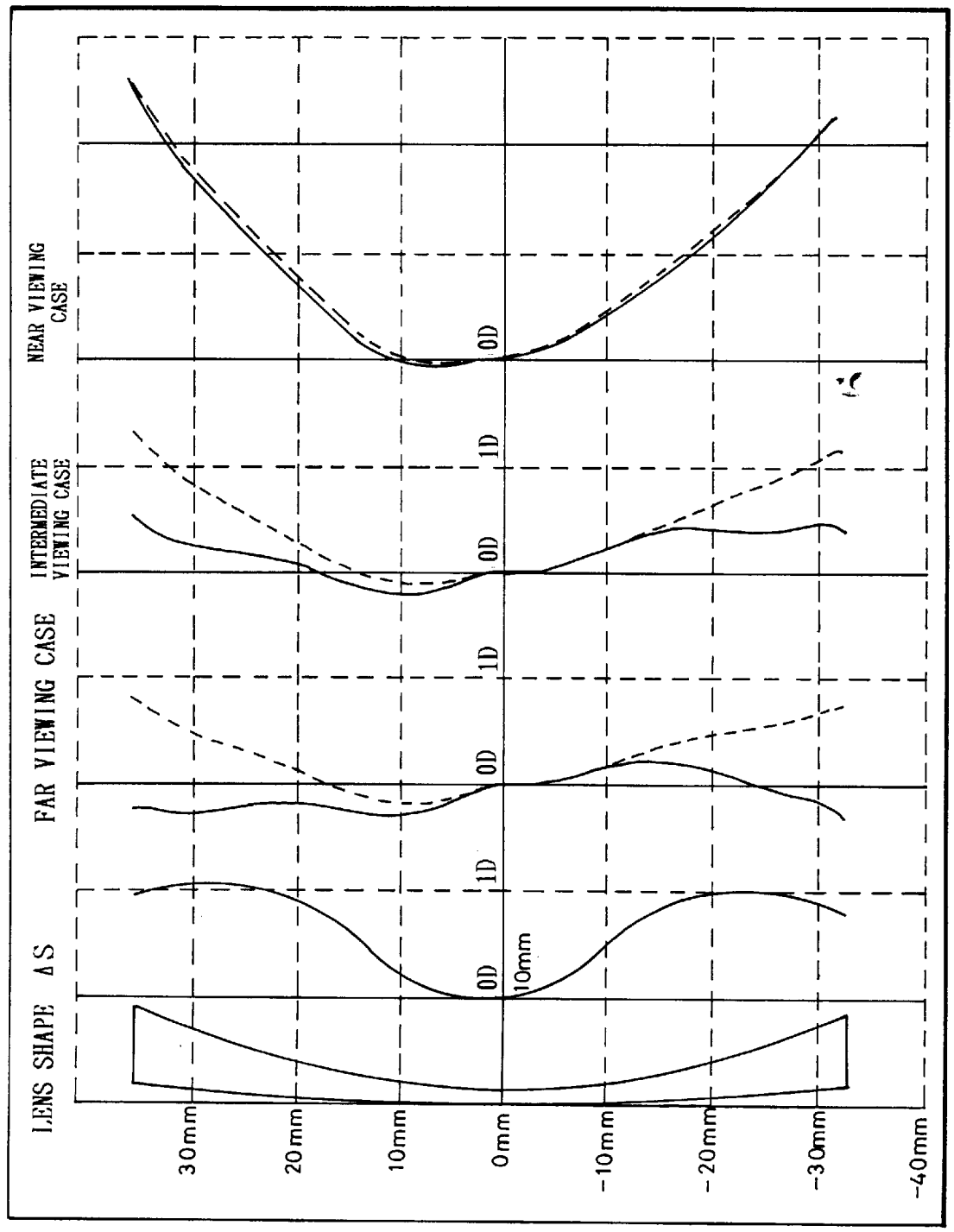
FIG. 27 is a graph for showing the relation among the shape of this negative-refractive-power aspherical spectacle lens (namely, the fifth embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 27, there is shown the relation among the lens shape of the negative-refractive-power aspherical spectacle lens of FIG. 26, which is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 28:
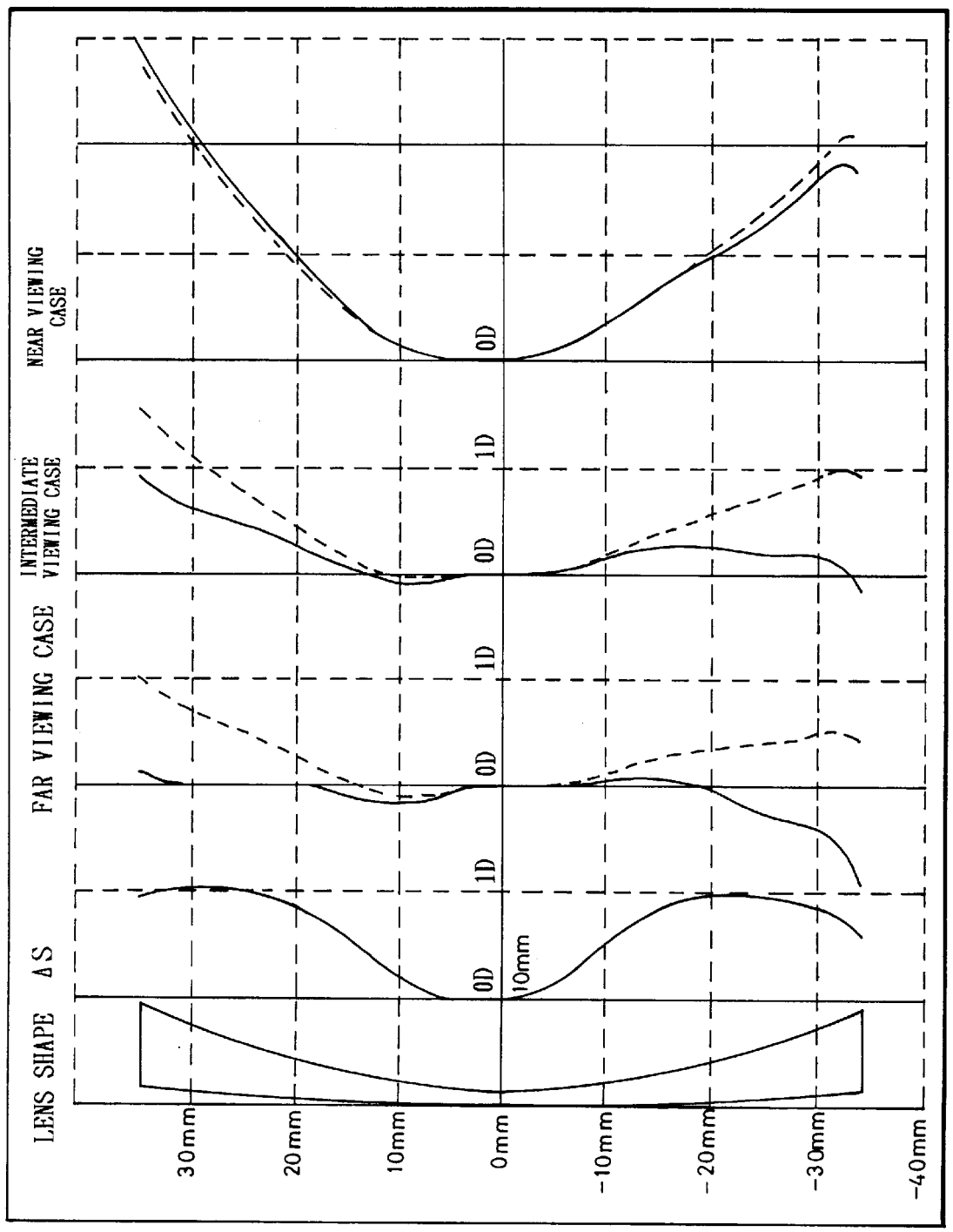
FIG. 28 is a graph for showing the relation among the shape of the negative-refractive-power aspherical spectacle lens (namely, the fifth embodiment of the present invention), in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Further, referring now to FIG. 28, there is shown the relation among the (lens) shape of the negative-refractive-power aspherical spectacle lens of FIG. 26, in which only first surface is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of far viewing, that of intermediate viewing and that of near viewing, of FIGS. 27 and 28, solid curves represent the oblique astigmatic errors, and broken curves represent the mean oblique errors. Incidentally, in the graphs of $\Delta S$ and the oblique astigmatic error and the mean oblique error in the cases of far viewing, of intermediate viewing and of near viewing, abscissas are represented in units of diopters.

Moreover, as is seen or understood from the figures, in the case of the negative-refractive-power aspherical spectacle lenses of FIGS. 26, 27 and 28, variation in the oblique astigmatic error due to the decentration is small in the vicinity of the optical axis (namely, a region in which the distance from the optical axis ranges from 5 to 10 mm), similarly as in the case of the fourth embodiment of the present invention, in comparison with the conventional negative-refractive-power aspherical spectacle lenses of FIGS. 68, 69 and 70.

Furthermore, in the case of the negative-refractive-power aspherical spectacle lenses according to the fifth embodiment, as is seen from these figures, there is very little mean oblique error at places located in the vicinity of the optical axis even if the places are off the optical axis thereof, so that a deviation in the refractive power of the lens at the time of measuring the refractive power is small, similarly as in the case of the negative-refractive-power aspherical spectacle lenses according to the fourth embodiment.

The following "TABLE 10" presents $\Delta S$ in the case of the negative-refractive-power aspherical spectacle lens of FIG. 26. Further, FIG. 29 illustrates $\Delta S$ caused in the proximity of the optical axis in the case of the negative-refractive-power aspherical spectacle lens of FIG. 26.

TABLE 10

| $\rho$ (mm) | $\Delta S$ (in diopters) |
|---|---|
| 0.000 | 0.00000 |
| 0.914 | −0.00142 |
| 1.830 | −0.00232 |
| 3.060 | 0.00409 |
| 3.990 | 0.01820 |
| 4.920 | 0.04210 |

Figure 29:
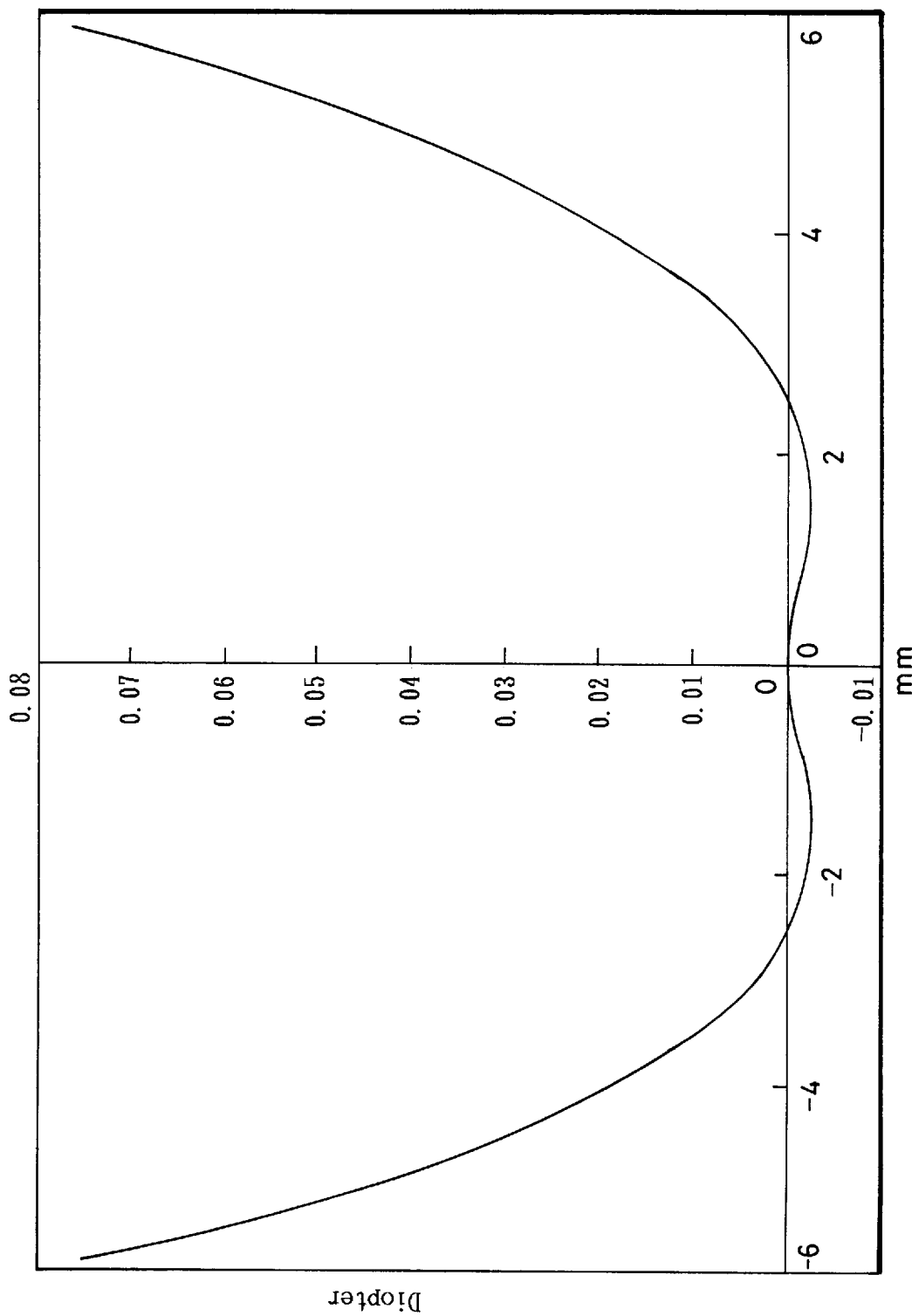
FIG. 29 is a graph for showing the difference ΔS caused in the negative-refractive-power aspherical spectacle lens (namely, the fifth embodiment of the present invention)

As is shown in TABLE 10 and FIG. 29, the inequality (3) is satisfied in a region of 10-mm diameter from the optical axis.

Further, as is seen from TABLE 10 and FIG. 29, $\Delta S$ takes a negative value at least once at the distance $\rho$ in the range: $0 < \rho \leq 5$ (mm). Moreover, $\Delta S$ takes a negative value in a peripheral portion of the lens.

Figure 30:
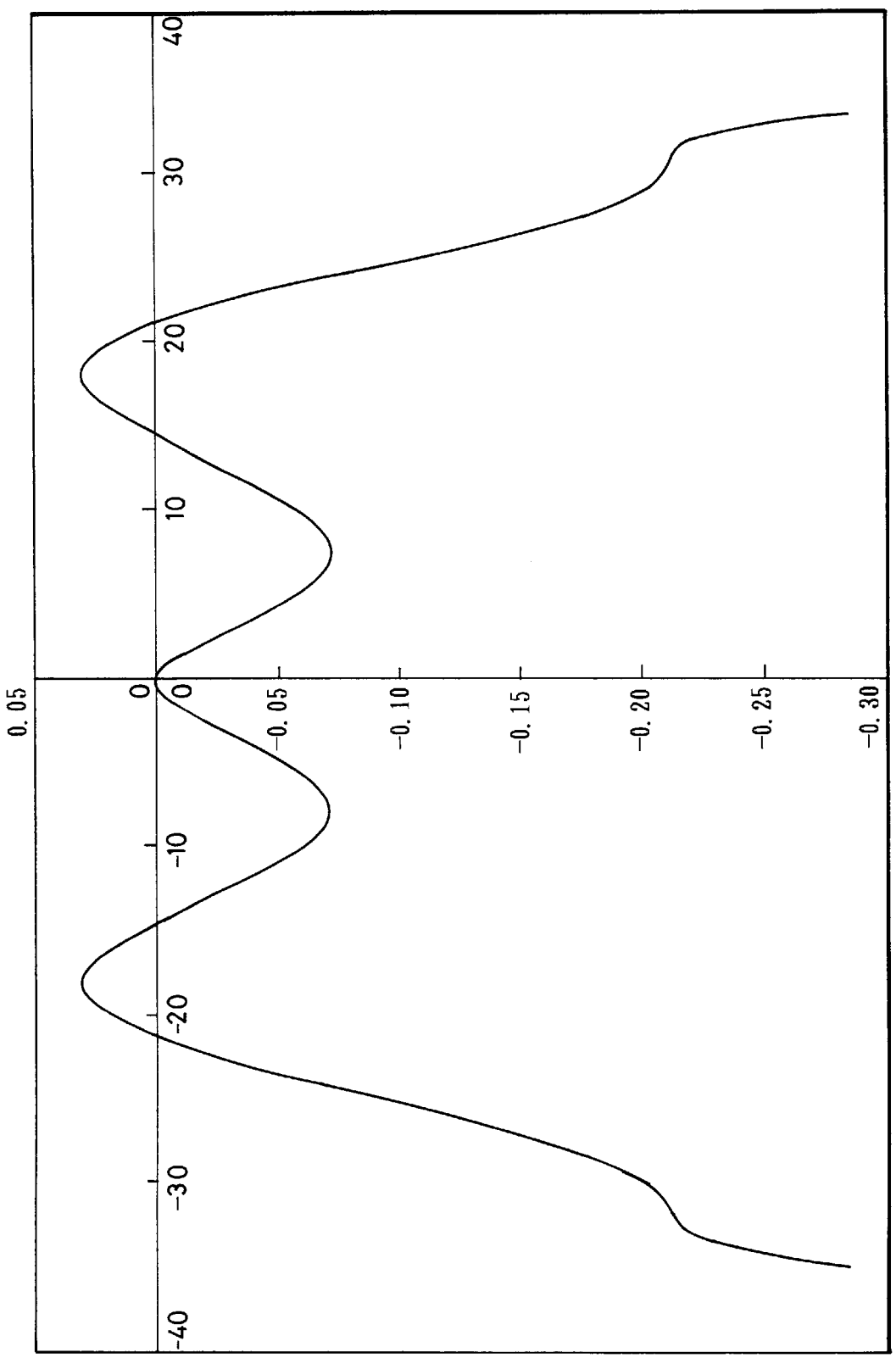
FIG. 30 is a graph for showing the oblique astigmatic error caused in the negative-refractive-power aspherical spectacle lens (namely, the fifth embodiment of the present invention)

FIG. 30 shows the oblique astigmatic error caused in the negative-refractive-power aspherical spectacle lens of FIG. 26. In FIG. 30, abscissas represent the distance from the optical axis thereof (in mm); and ordinates the oblique astigmatic error (in diopters).

As is seen from FIG. 30, in a region, which has a diameter of 40 mm, around the optical axis, in the far-viewing case, the oblique astigmatic error is within the range between ±0.15 (in diopters).

Figure 31:
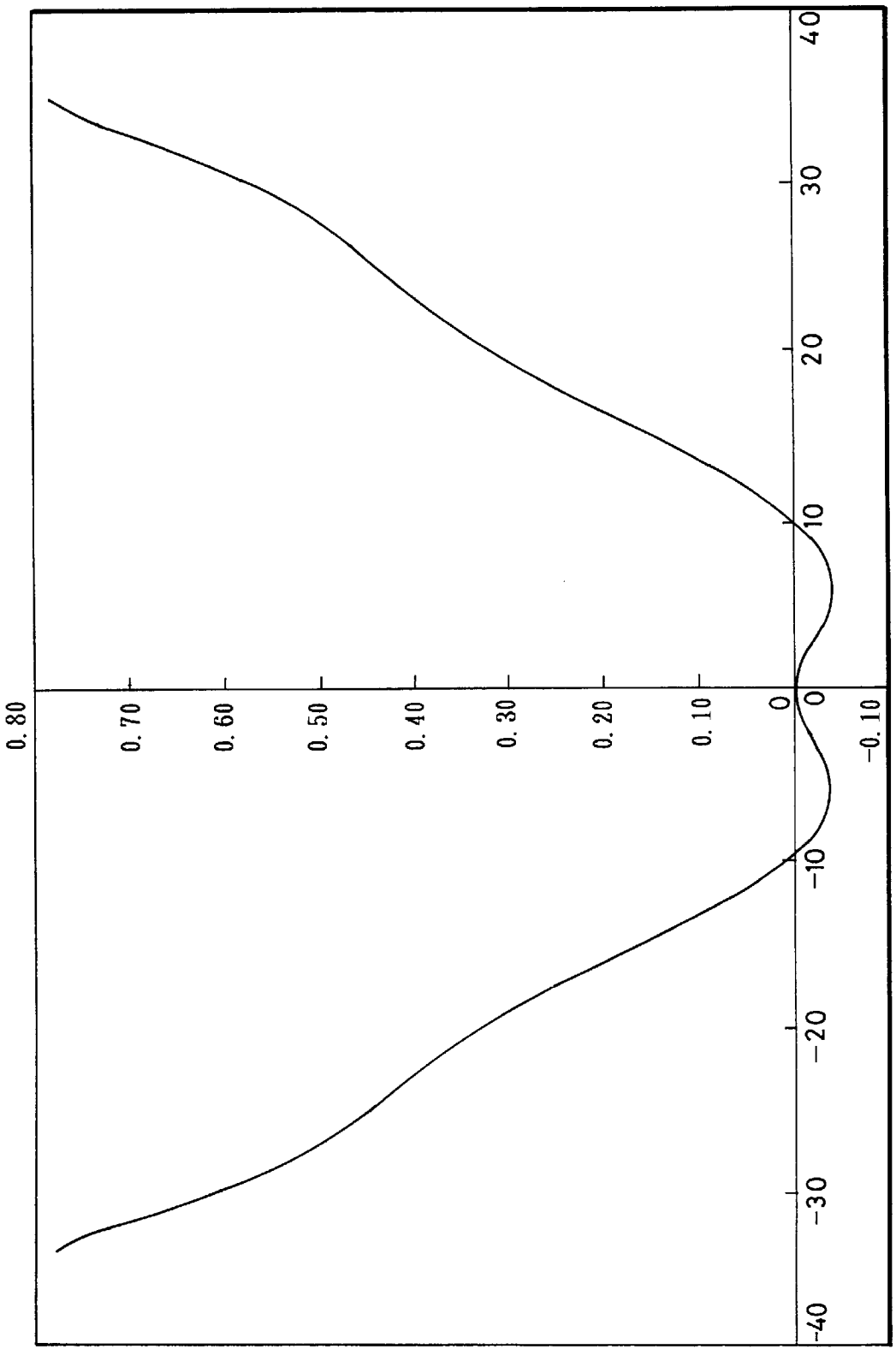
FIG. 31 is a graph for showing the mean oblique error caused in the negative-refractive-power aspherical spectacle lens (namely, the fifth embodiment of the present invention)

FIG. 31 is a graph for showing the mean oblique error caused in the negative-refractive-power aspherical spectacle lens of FIG. 26. In FIG. 31, abscissas represent the distance from the optical axis thereof (in mm); and ordinates the mean oblique error (in diopters).

As is seen from FIG. 31, in a region, which has a diameter of 30 mm, around the optical axis, in the far-viewing case, the mean oblique error is within the range between ±0.20 (in diopters).

As above described, the fifth embodiment has advantages or effects similar to those of the fourth embodiment.

Sixth Embodiment

Figure 32:
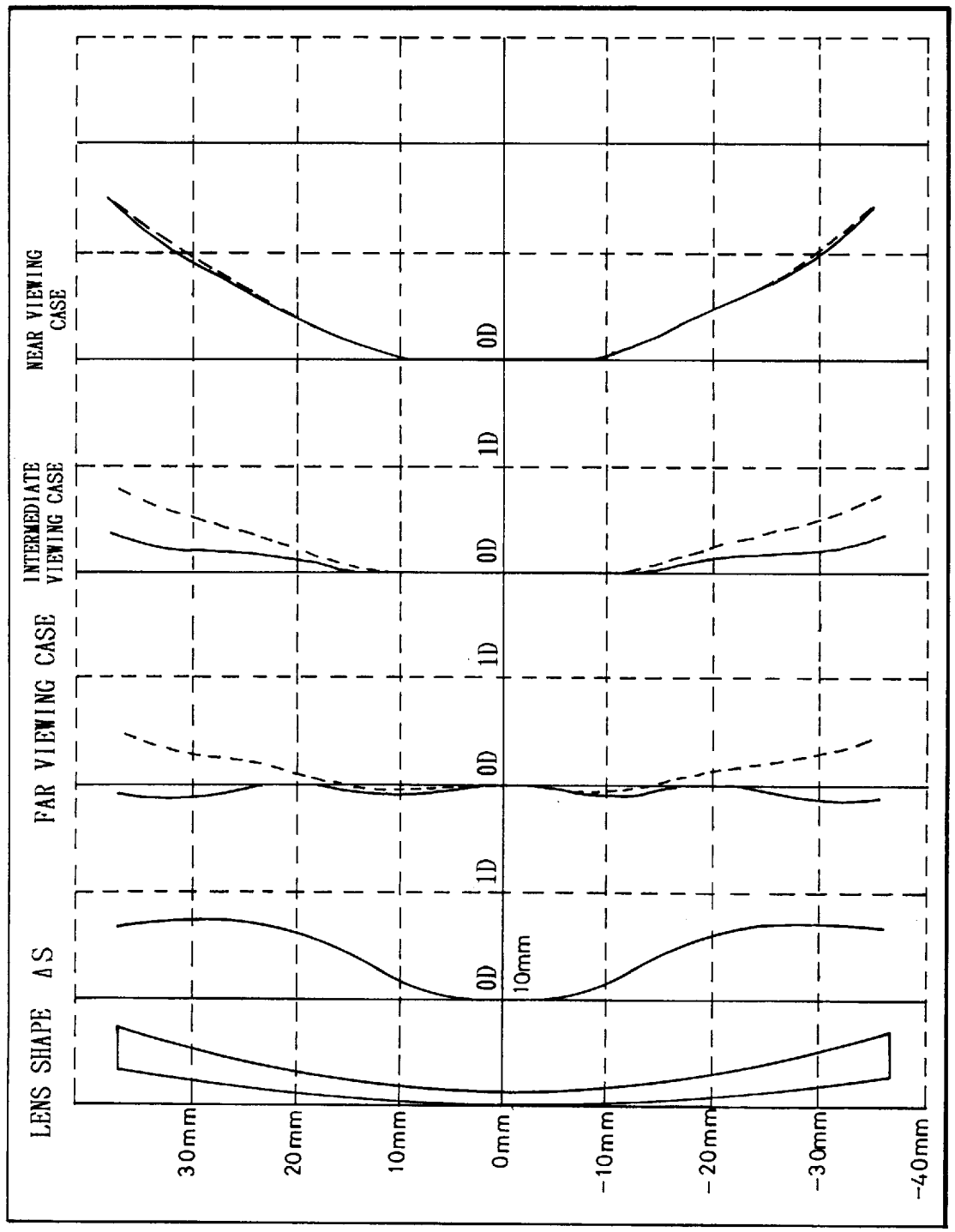
FIG. 32 is a graph for showing the relation among the shape of a negative-refractive-power aspherical spectacle lens (namely, a sixth embodiment of the present invention), in which no decentration is caused, the difference ΔS caused therein, the oblique astigmatic error caused therein in the far-viewing case, the mean astigmatic error caused therein in the intermediate-viewing case and the oblique astigmatic error caused therein in the near-viewing case.

FIG. 32 illustrates the relation among the lens shape of still another negative-refractive-power aspherical spectacle lens (namely, the sixth embodiment of the present invention) in which no decentration is caused, the difference $\Delta S$, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. Here, note that $\Delta S$ is corresponding to the first surface. In the graphs of FIG. 32 respectively corresponding to the case of far viewing, that of intermediate viewing and that of near viewing, solid curves represent the oblique astigmatic errors, and broken curves represent the mean oblique errors. Incidentally, in the graphs of $\Delta S$ and the oblique astigmatic error and the mean oblique error in the cases of far viewing, of intermediate viewing and of near viewing, abscissas are represented in units of diopters.

The first surface of the negative-refractive-power aspherical spectacle lens of FIG. 32 is defined by the equation (2). Further, in the case of this negative-refractive-power aspherical spectacle lens, the design thereof in a starting stage is performed by taking decentration aberration, which is caused when this lens is "shifted" 5 mm from the optical axis thereof, into consideration as a target value of optimization, in addition to a usual target value of optimization. Moreover, the design of this lens is performed by further taking decentration aberration, which is caused when only the first surface of this lens is "shifted" 5 mm from the optical axis thereof, into consideration as a target value of optimization. Furthermore, the design of this lens is performed by setting the refractive power thereof at (−3.0) D.

Further, the second refractive surface of the negative-refractive-power aspherical spectacle lens of FIG. 32 has a spherical shape.

Moreover, the refractive-power, diameter, refractive index and shape of the negative-refractive-power aspherical spectacle lens of FIG. 32, whose first surface (namely, the left-side surface as shown in FIG. 32) is an aspherical surface defined by the equation (2), are presented in the following "TABLE 11".

TABLE 11

| | |
|---|---|
| Refractive Power: | −3.0 D |
| Lens Diameter: | φ75 mm |
| Refractive Index ($n_e$): | 1.501 |
| Center Thickness: | 1.00 mm |
| Front-surface Curvature: | $2.299102 \times 10^{-3}$ |
| Back-surface Curvature: | $8.98204 \times 10^{-3}$ |
| Aspherical Coefficients: | |
| $A_2 = 0.00000$ | |
| $A_3 = 0.00000$ | |
| $A_4 = -4.11964 \times 10^{-7}$ | |
| $A_5 = 7.61527 \times 10^{-8}$ | |
| $A_6 = -3.09755 \times 10^{-9}$ | |
| $A_7 = 5.25566 \times 10^{-11}$ | |
| $A_8 = -3.33471 \times 10^{-13}$ | |

In the case of this embodiment of the present invention, the decentration corresponding to the ratio (K/H)=5/75=0.067 (incidentally, K designates a vertical change in decentration (namely, an amount of the shift taken into account when designing the lens (mm); and H a maximum outside-diameter (namely, a lens diameter) (mm)) is taken into consideration.

Figure 33:
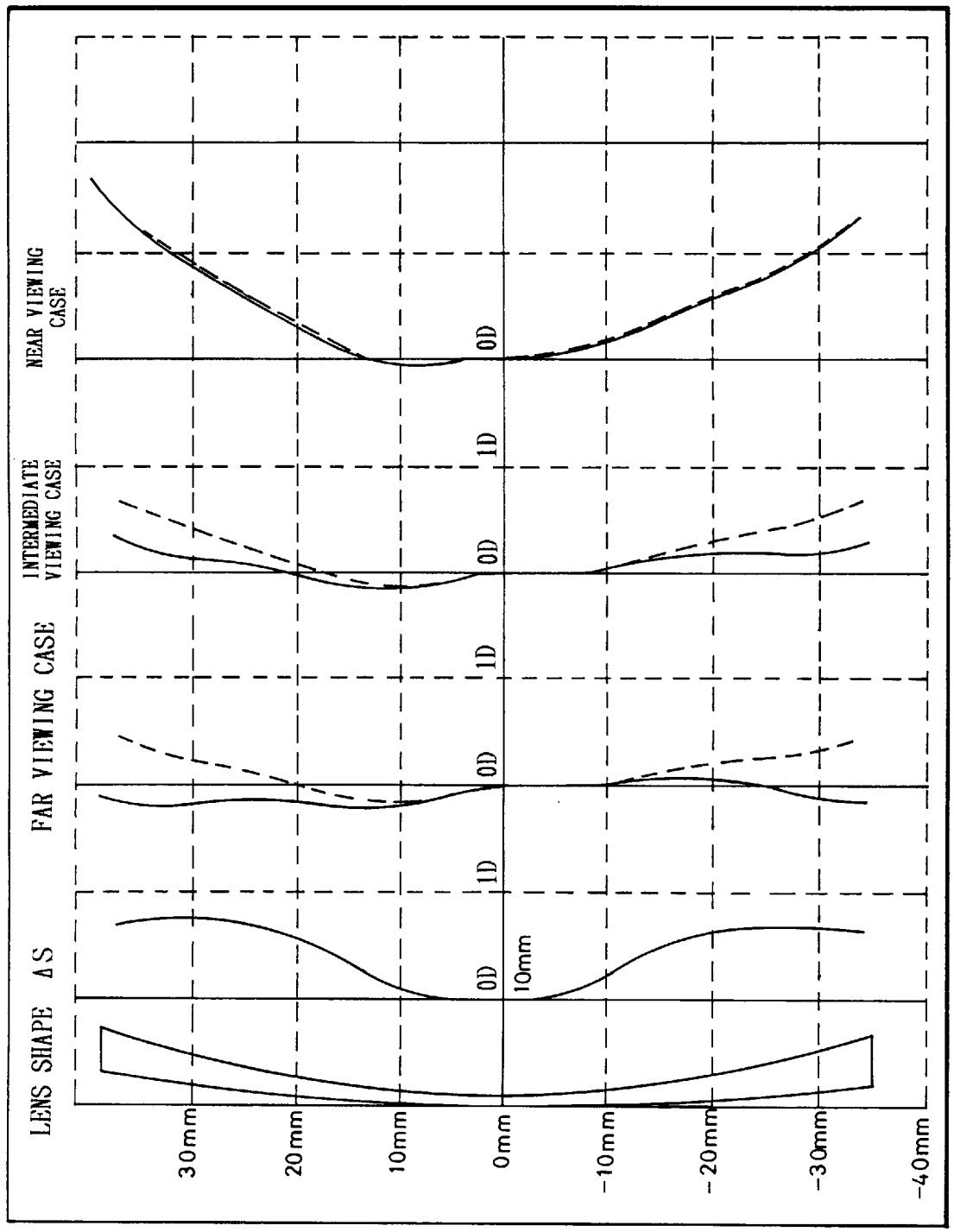
FIG. 33 is a graph for showing the relation among the shape of this negative-refractive-power aspherical spectacle lens (namely, the sixth embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 33, there is shown the relation among the lens shape of the negative-refractive-power aspherical spectacle lens of FIG. 32, which is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Further, referring now to FIG. 34, there is shown the relation among the lens shape of the negative-refractive-power aspherical spectacle lens of FIG. 32, in which only first surface is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of far viewing, that of intermediate viewing and that of near viewing, of FIGS. 33 and 34, solid curves represent the oblique astigmatic errors, and broken curves represent the mean oblique errors. Incidentally, in the graphs of $\Delta S$ and the oblique astigmatic error and the mean oblique error in the case of far viewing, that of intermediate viewing and that of near viewing, abscissas are represented in units of diopters.

Moreover, as is seen or understood from the figures, in the case of the negative-refractive-power aspherical spectacle lenses of FIGS. 32, 33 and 34, variation in the oblique astigmatic error due to the decentration is small in the vicinity of the optical axis (namely, a region in which the distance from the optical axis ranges from 5 to 10 mm), similarly as in the case of the first and second embodiments of the present invention, in comparison with the conventional negative-refractive-power aspherical spectacle lenses of FIGS. 68, 69 and 70.

Furthermore, in the case of the negative-refractive-power aspherical spectacle lenses according to the sixth embodiment, as is seen from these figures, there is very little mean oblique error at places located in the vicinity of the optical axis even if the places are off the optical axis thereof, so that a deviation in the refractive power of the lens at the time of measuring the refractive power is small, similarly as in the case of the negative-refractive-power aspherical spectacle lenses according to the fourth and fifth embodiments.

The following "TABLE 12" presents $\Delta S$ in the case of the negative-refractive-power aspherical spectacle lens of FIG. 32. Further, FIG. 35 illustrates $\Delta S$ caused in the proximity of the optical axis in the case of the negative-refractive-power aspherical spectacle lens of FIG. 32.

TABLE 12

| $\rho$ (mm) | $\Delta S$ (in diopters) |
|---|---|
| 0.000 | 0.00000 |
| 0.962 | −0.00165 |
| 1.930 | −0.00434 |
| 2.890 | −0.00529 |
| 3.870 | −0.00237 |
| 4.850 | 0.00593 |

Figure 35:
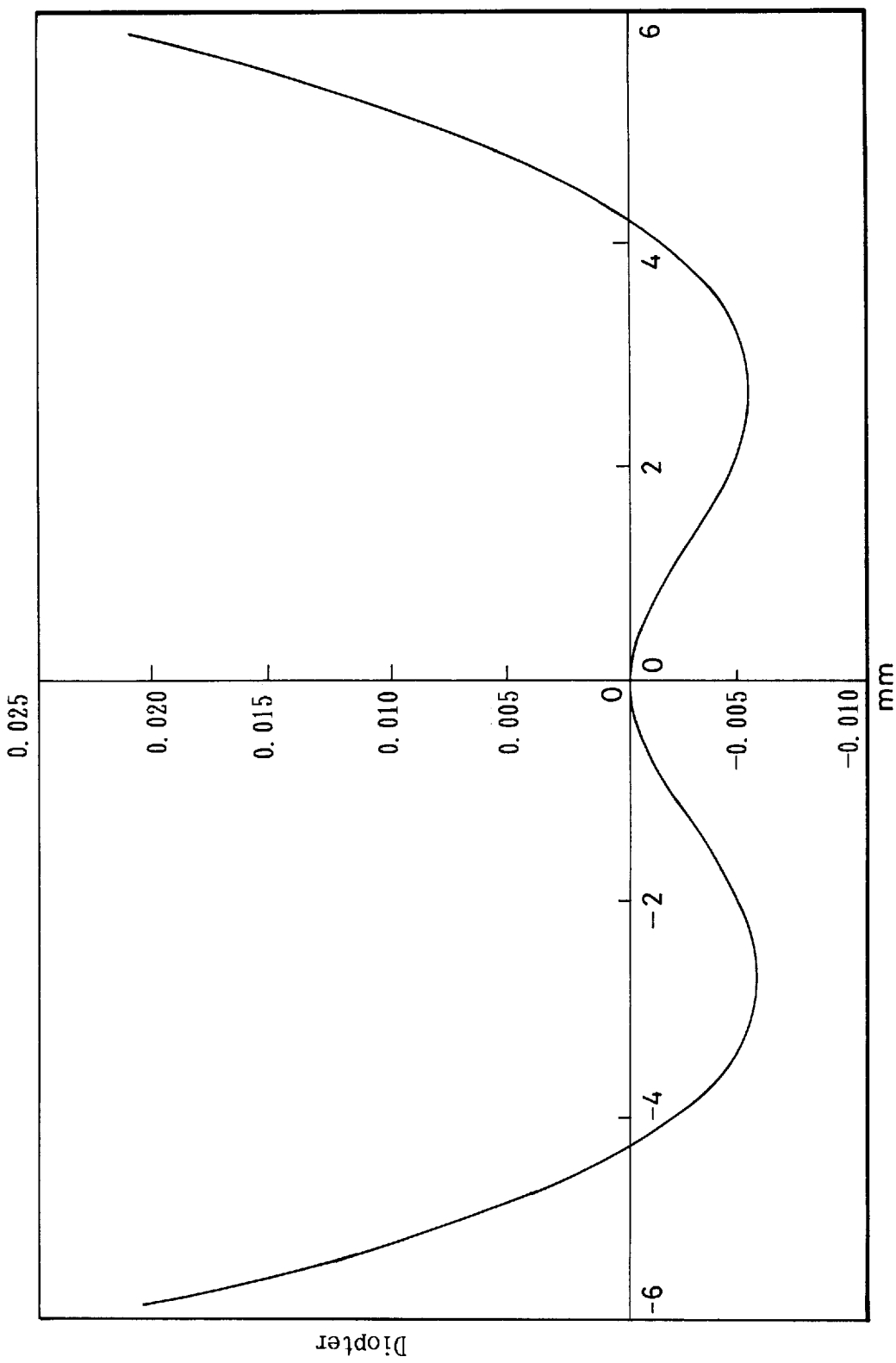
FIG. 35 is a graph for showing the difference ΔS caused in the negative-refractive-power aspherical spectacle lens (namely, the sixth embodiment of the present invention)

As is shown in TABLE 12 and FIG. 35, the inequality (3) is satisfied in a region of 10-mm diameter from the optical axis.

Further, as is seen from TABLE 12 and FIG. 35, ΔS takes a negative value at least once at the distance ρ in the range: 0<ρ≦5 (mm). Moreover, ΔS takes a positive value in a peripheral portion of the lens.

Figure 36:
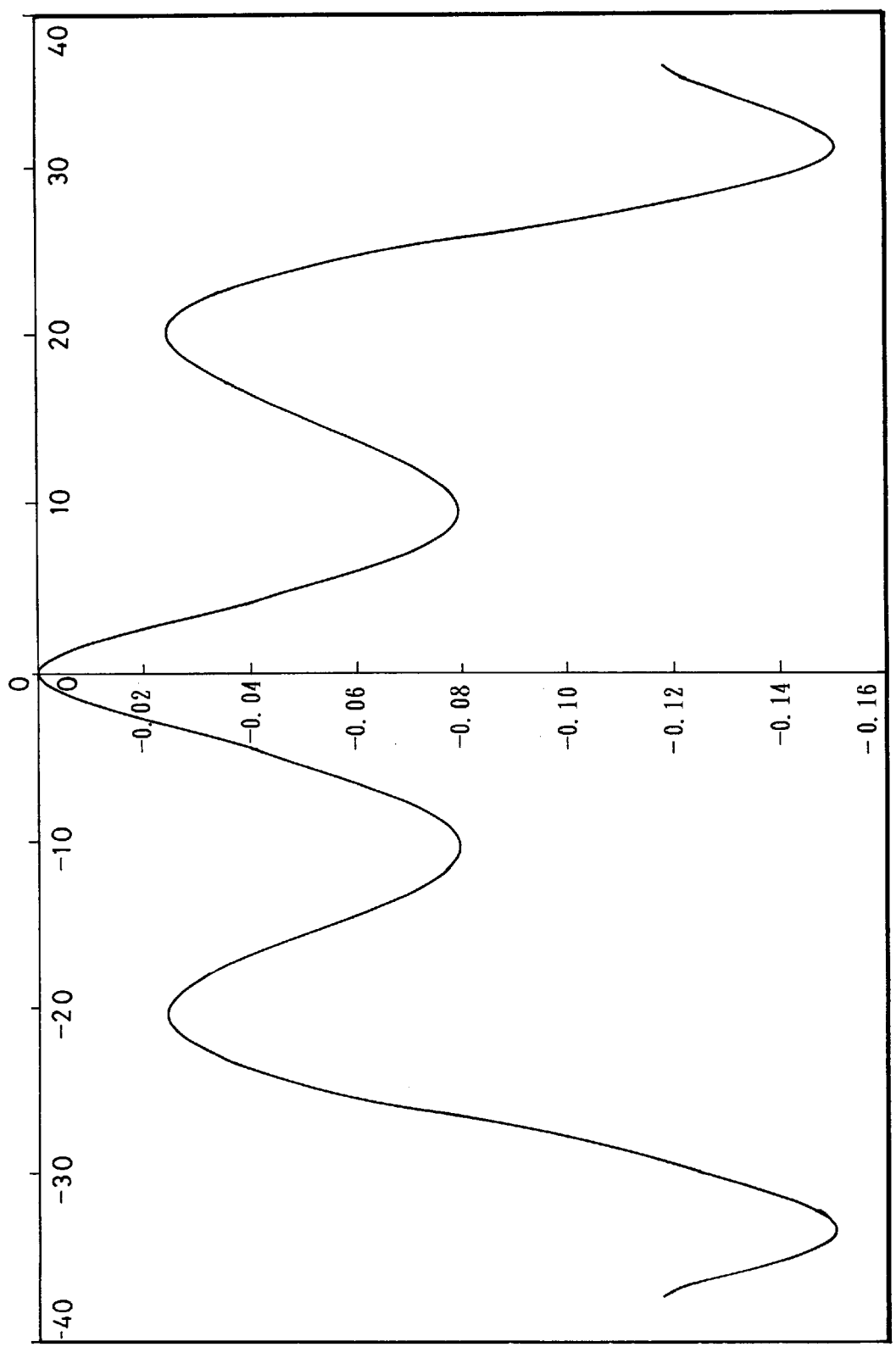
FIG. 36 is a graph for showing the oblique astigmatic error caused in the negative-refractive-power aspherical spectacle lens (namely, the sixth embodiment of the present invention)

FIG. 36 shows the oblique astigmatic error caused in the negative-refractive-power aspherical spectacle lens of FIG. 32. In FIG. 36, abscissas represent the distance from the optical axis thereof (in mm); and ordinates the oblique astigmatic error (in diopters).

As is seen from FIG. 36, in a region, which has a diameter of 40 mm, around the optical axis, in the far-viewing case, the oblique astigmatic error is within the range between ±0.15 (in diopters).

Figure 37:
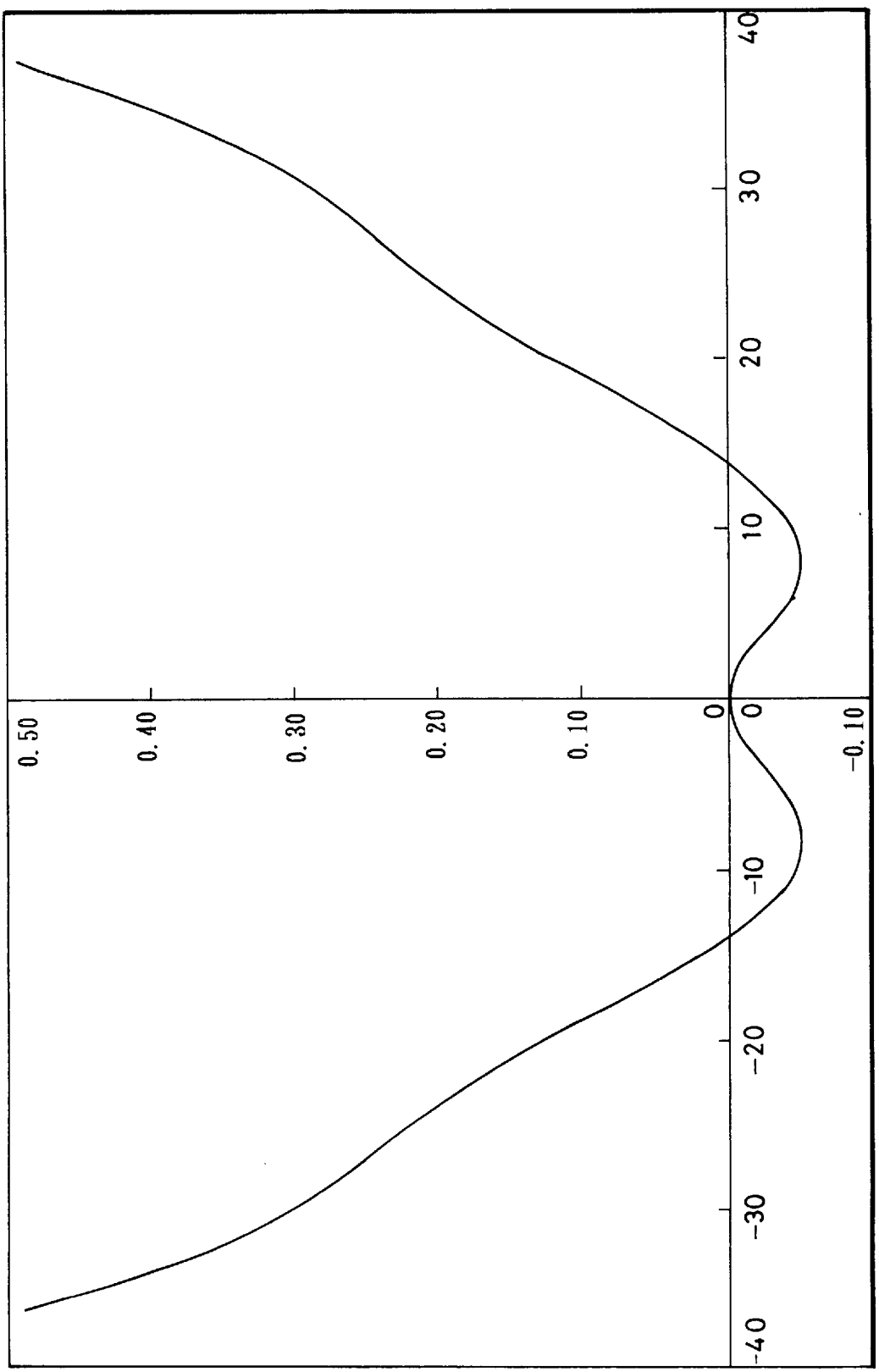
FIG. 37 is a graph for showing the mean oblique error caused in the negative-refractive-power aspherical spectacle lens (namely, the sixth embodiment of the present invention)

FIG. 37 is a graph for showing the mean oblique error caused in the negative-refractive-power aspherical spectacle lens of FIG. 32. In FIG. 37, abscissas represent the distance from the optical axis thereof (in mm); and ordinates the mean oblique error (in diopters)

As is seen from FIG. 37, in a region, which has a diameter of 30 mm, around the optical axis, in the far-viewing case, the mean oblique error is within the range between ±0.20 (in diopters).

As above described, the sixth embodiment has advantages or effects similar to those of the fourth and fifth embodiments.

Seventh Embodiment

Figure 38:
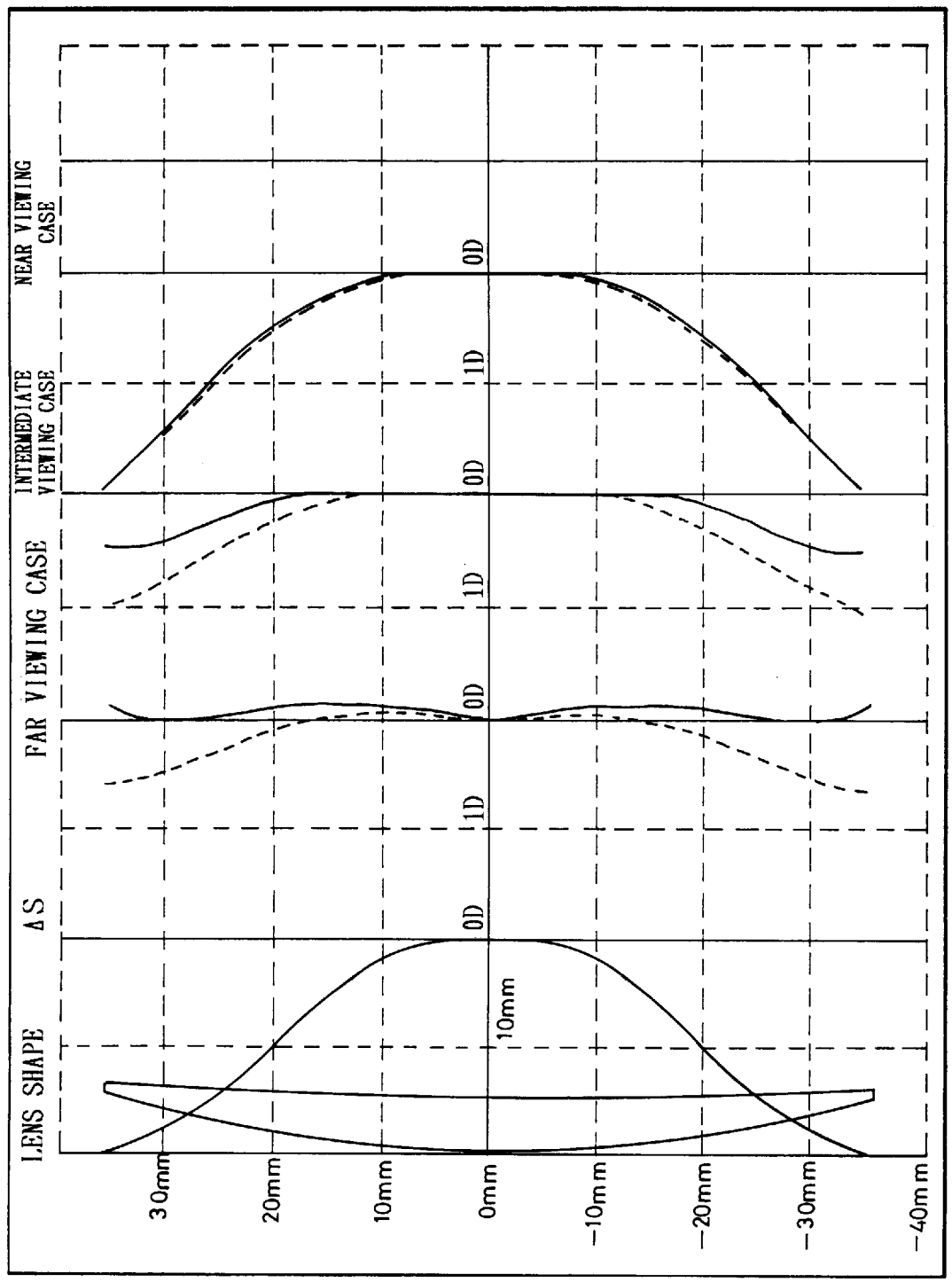
FIG. 38 is a graph for showing the relation among the shape of a positive-refractive-power aspherical spectacle lens (namely, a seventh embodiment of the present invention), in which no decentration is caused, the difference ΔS caused therein, the oblique astigmatic error caused therein in the far-viewing case, the mean astigmatic error caused therein in the intermediate-viewing case and the oblique astigmatic error caused therein in the near-viewing case.

FIG. 38 illustrates the relation among the (lens) shape of a positive-refractive-power aspherical spectacle lens (namely, the seventh embodiment of the present invention) in which no decentration is caused, the difference ΔS, the oblique astigmatic error and the mean oblique error caused therein in the case of viewing long-distance (or infinite-distance) places (hereunder sometimes referred to simply as the case of far (or infinite vision viewing), the oblique astigmatic error and the mean oblique error caused therein in the case of viewing middle-distance places (namely, in the case of intermediate (or 1-m) viewing)) and the oblique astigmatic error and the mean oblique error caused therein in the case of viewing short-distance places (namely, in the case of near (or 0.3-m vision) viewing) Here, the difference ΔS is corresponding to the first surface. In the graphs of FIG. 38 respectively corresponding to the case of viewing long-distance places, that of viewing middle-distance places and that of viewing short-distance places, solid curves represent oblique astigmatic errors, and broken (or dashed) curves represent mean oblique errors. Incidentally, in the graphs of ΔS and the oblique astigmatic errors and the mean oblique errors in the cases of viewing long-distance places, of viewing middle-distance places and of viewing short-distance places, abscissas are represented in units of diopters. The first surface of the positive-refractive-power aspherical spectacle lens of FIG. 38 is defined by the following equation (4):

$$X(\rho) = C\rho^2/(1 + \sqrt{1 - C^2\rho^2 k}) + A_{4.0}\rho^{4.0} + A_{4.7}\rho^{4.7} + A_{5.4}\rho^{5.4} + A_{6.1}\rho^{6.1} \quad (4)$$

where X designates a length of a perpendicular dropped or drawn from a point, which is positioned on the aspherical surface and is located at a distance ρ from the optical axis thereof, to a meridional plane, which contacts the aspherical surface at a vertex thereof; C the curvature of a reference spherical surface at the vertex of the aspherical surface; ρ a distance from the optical axis; k a cone (or conic) constant; $A_{4.0}$ an aspherical coefficient of $\rho^{4.0}$; $A_{4.7}$ an aspherical coefficient of $\rho^{4.7}$; $A_{5.4}$ an aspherical coefficient of $\rho^{5.4}$; and $A_{6.1}$ an aspherical coefficient of $\rho^{6.1}$.

A first term of the right side of the equation (4) represents a conicoid (namely, a quadratic surface) of revolution; and second to fifth terms thereof represent a displacement or deviation from the quadratic surface thereof.

The first refractive surface of the positive-refractive-power aspherical spectacle lens of FIG. 38 is defined by the equation (4). Moreover, in the case of this positive-refractive-power aspherical spectacle lens, the design thereof in a starting stage is performed by taking decentration aberration, which is caused when this lens is "shifted" 4 mm from the optical axis thereof, into consideration as a target value of optimization, in addition to a usual target value of optimization. Furthermore, the design of this lens is performed by further taking decentration aberration, which is caused when only the first surface of this lens is "shifted" 4 mm from the optical axis thereof, into consideration as a target value of optimization. Additionally, the design of this lens is carried out by setting the refractive power thereof at (−3.0) D.

Further, the second refractive surface of the positive-refractive-power aspherical spectacle lens of FIG. 38 has a spherical shape.

Further, the refractive-power, diameter, refractive index and shape of the positive-refractive-power aspherical spectacle lens of FIG. 38, whose first surface (namely, the left-side surface as shown in FIG. 38) is an aspherical surface defined by the equation (4), are presented in the following "TABLE 13".

TABLE 13

| | |
|---|---|
| Refractive Power: | 4.0 D |
| Lens Diameter: | φ70 mm |
| Refractive Index ($n_e$): | 1.501 |
| Center Thickness: | 5.11 mm |
| Front-surface Curvature: | $9.81295 \times 10^{-3}$ |
| Back-surface Curvature: | $1.99601 \times 10^{-3}$ |
| Aspherical Coefficients: | |
| $A_{4.0} = 3.95540 \times 10^{-7}$ | |
| $A_{4.7} = -1.80540 \times 10^{-7}$ | |
| $A_{5.4} = 1.20660 \times 10^{-8}$ | |
| $A_{6.1} = -2.36590 \times 10^{-10}$ | |

Although an optimum solution is obtained in the case of the first to sixth embodiments of the present invention by using the aspherical coefficients of even and odd degrees as parameters, the aspherical coefficients of real-valued degrees are used as parameters in the case of this embodiment of the present invention and thus, only the aspherical coefficients of further lower degrees can be used as parameters. By using the aspherical coefficients of real-valued degrees as parameters similarly as in the case of this embodiment of the present invention, it becomes further easy to balance the target oblique astigmatic errors and the target mean oblique error against the oblique astigmatic error and the mean oblique error which occur upon causing the decentration.

In the case of this embodiment of the present invention, the decentration corresponding to the ratio (K/H)=4/70= 0.057 (incidentally, K designates a vertical change in decentration (namely, an amount of the shift taken into account when designing the lens (mm); and H a maximum outside-diameter (namely, a lens diameter) (mm)) is taken into consideration.

Figure 39:
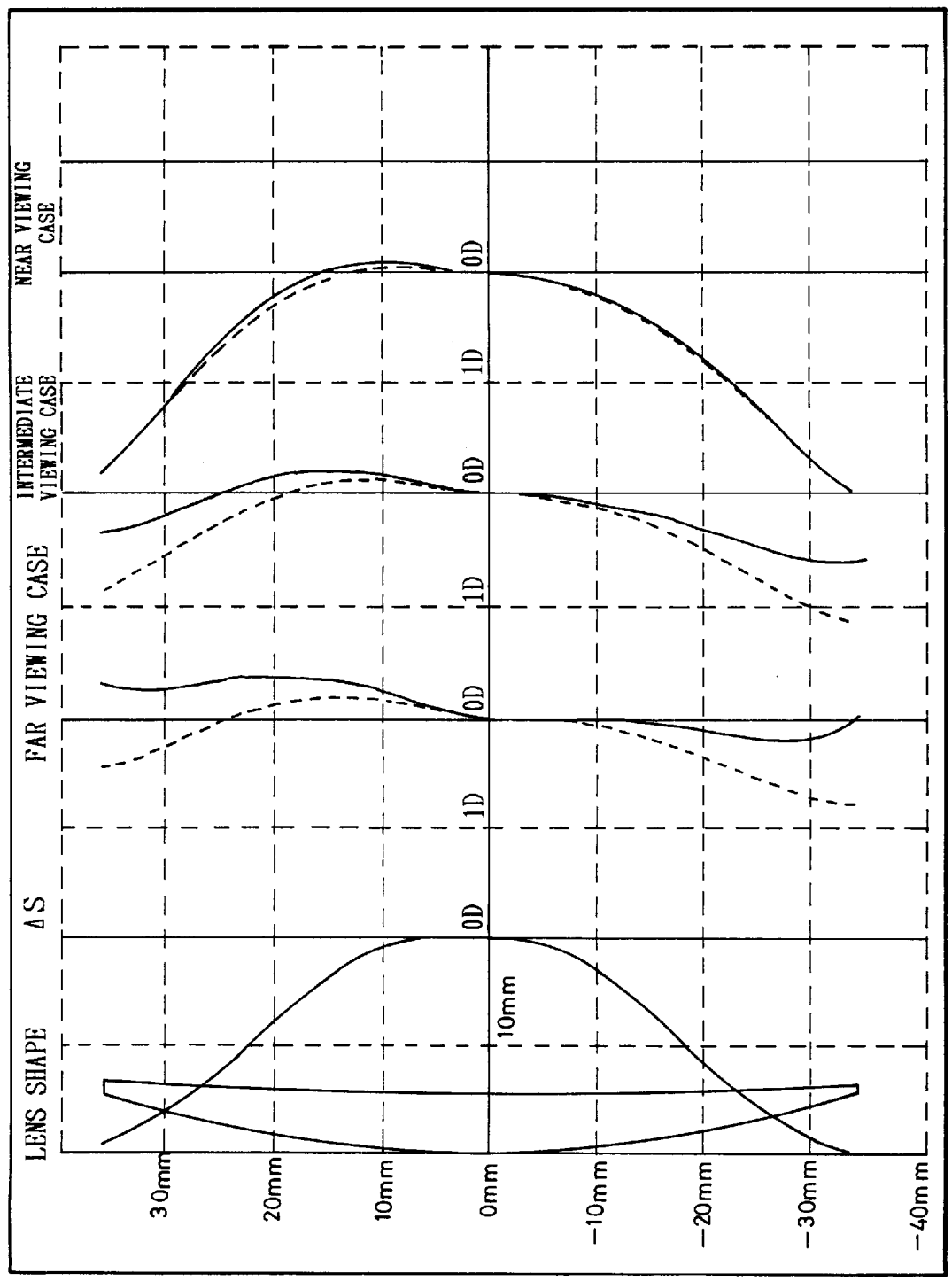
FIG. 39 is a graph for showing the relation among the shape of this positive-refractive-power aspherical spectacle lens (namely, the seventh embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 39, there is shown the relation among the (lens) shape of the positive-refractive-power aspherical spectacle lens of FIG. 38, which is "shifted" 2 mm from the optical axis thereof, the difference ΔS, the oblique astigmatic error and the mean oblique error caused therein in the case of far or infinite viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 40:
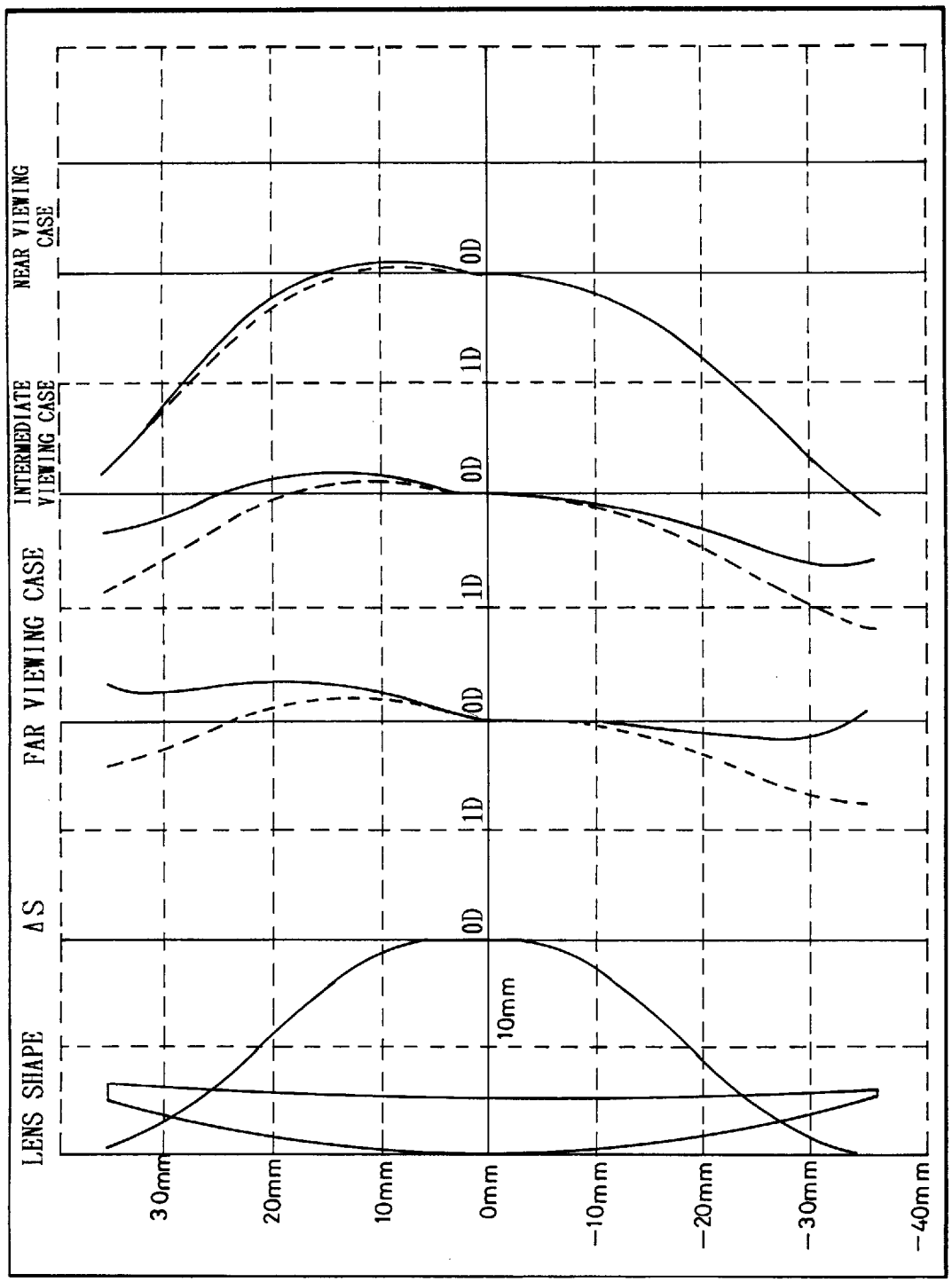
FIG. 40 is a graph for showing the relation among the shape of the positive-refractive-power aspherical spectacle lens (namely, the seventh embodiment of the present invention), in which only one of the refractive surfaces, namely, the first surface is shifted from the optical axis by 2 mm, the difference ΔS caused therein, oblique astigmatic error caused therein in the far-viewing case, the oblique astigmatic error caused therein in the intermediate-viewing case and the oblique astigmatic error caused therein in the near-viewing case.

Further, referring now to FIG. 40, there is shown the relation among the (lens) shape of the positive-refractive-power aspherical spectacle lens of FIG. 38, in which only first surface is "shifted" 2 mm from the optical axis thereof, the difference ΔS, the oblique astigmatic error and the mean oblique error caused therein in the case of far or infinite viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of viewing long-distance places, that of viewing middle-distance places and that of viewing short-distance places, of FIGS. 39 and 40, solid curves represent oblique astigmatic errors, and broken curves represent the mean oblique errors. Incidentally, in the graphs of ΔS and the oblique astigmatic error and the mean oblique errors in the cases of viewing long-distance places, of viewing middle-distance places and of viewing short-distance places, abscissas are represented in units of diopters.

As is seen or understood from these figures, in the case of the positive-refractive-power aspherical spectacle lenses of FIGS. 38, 39 and 40, variation in the oblique astigmatic error due to the decentration is small in the vicinity of the optical axis (namely, a region in which the distance from the optical axis ranges from 5 to 10 mm) in comparison with the conventional positive-refractive-power aspherical spectacle lenses of FIGS. 62, 63 and 64.

Further, in the case of the positive-refractive-power aspherical spectacle lenses according to the seventh embodiment, as is seen from these figures, there is very little mean oblique error at places located in the vicinity of the optical axis even if the places are off the optical axis thereof, so that a deviation in the refractive power of the lens at the time of measuring the refractive power is small.

The following "TABLE 14" presents ΔS in the case of the positive-refractive-power aspherical spectacle lens of FIG. 38. Further, FIG. 41 illustrates ΔS caused in the proximity of the optical axis in the case of the positive-refractive-power aspherical spectacle lens of FIG. 38.

TABLE 14

| ρ (mm) | ΔS (in diopters) |
|---|---|
| 0.000 | 0.00000 |
| 0.995 | 0.00094 |
| 1.991 | 0.00076 |
| 2.990 | −0.00339 |
| 3.994 | −0.01332 |
| 5.003 | −0.03031 |

Figure 41:
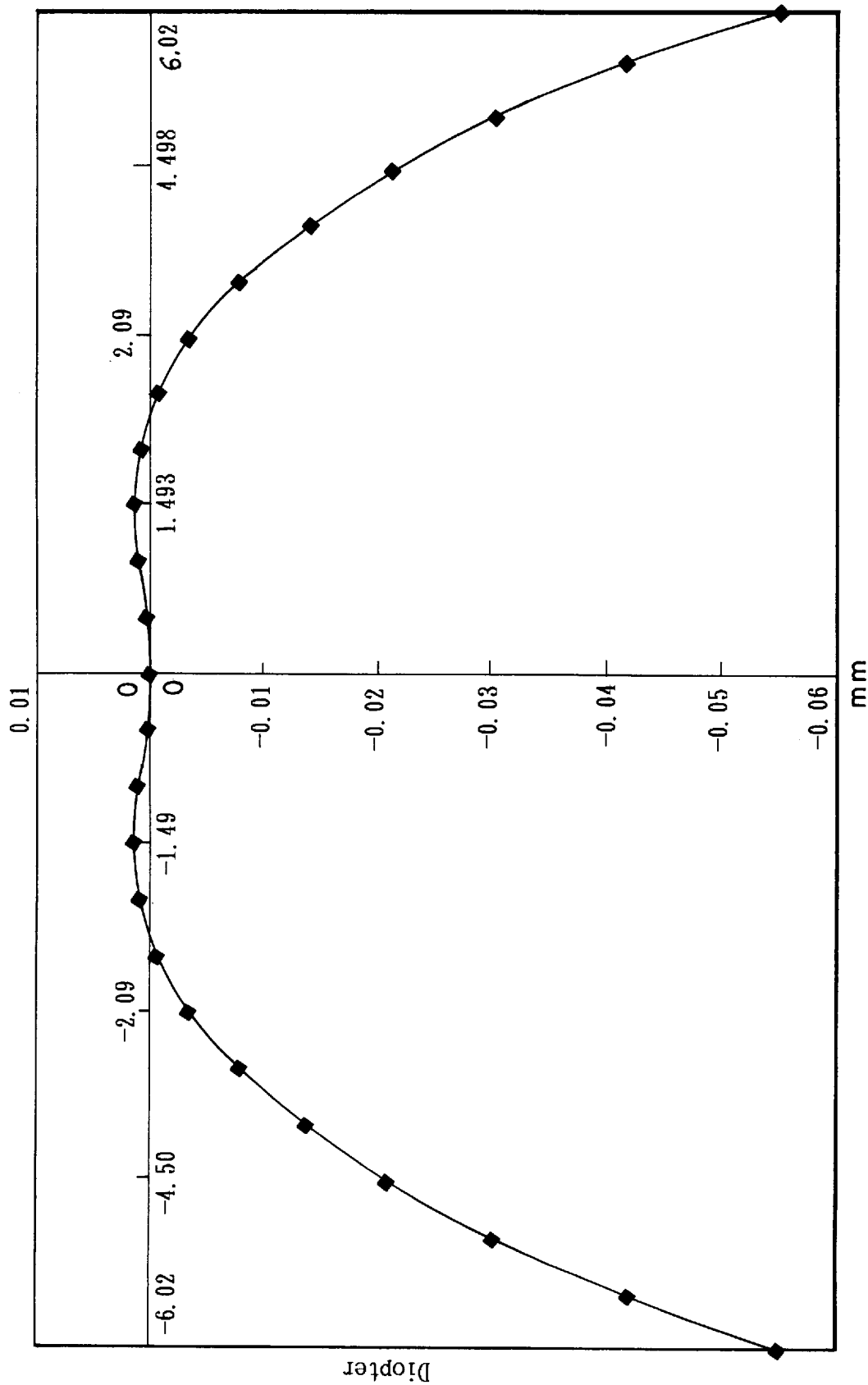
FIG. 41 is a graph for showing the difference ΔS caused in the positive-refractive-power aspherical spectacle lens (namely, the seventh embodiment of the present invention)

As is shown in TABLE 14 and FIG. 41, the inequality (3) is satisfied.

Further, as is seen from TABLE 14 and FIG. 41, ΔS takes a positive value at least once at the distance ρ in the range: 0<ρ≦5 (mm). Moreover, ΔS takes a negative value in a peripheral portion of the lens.

Figure 42:
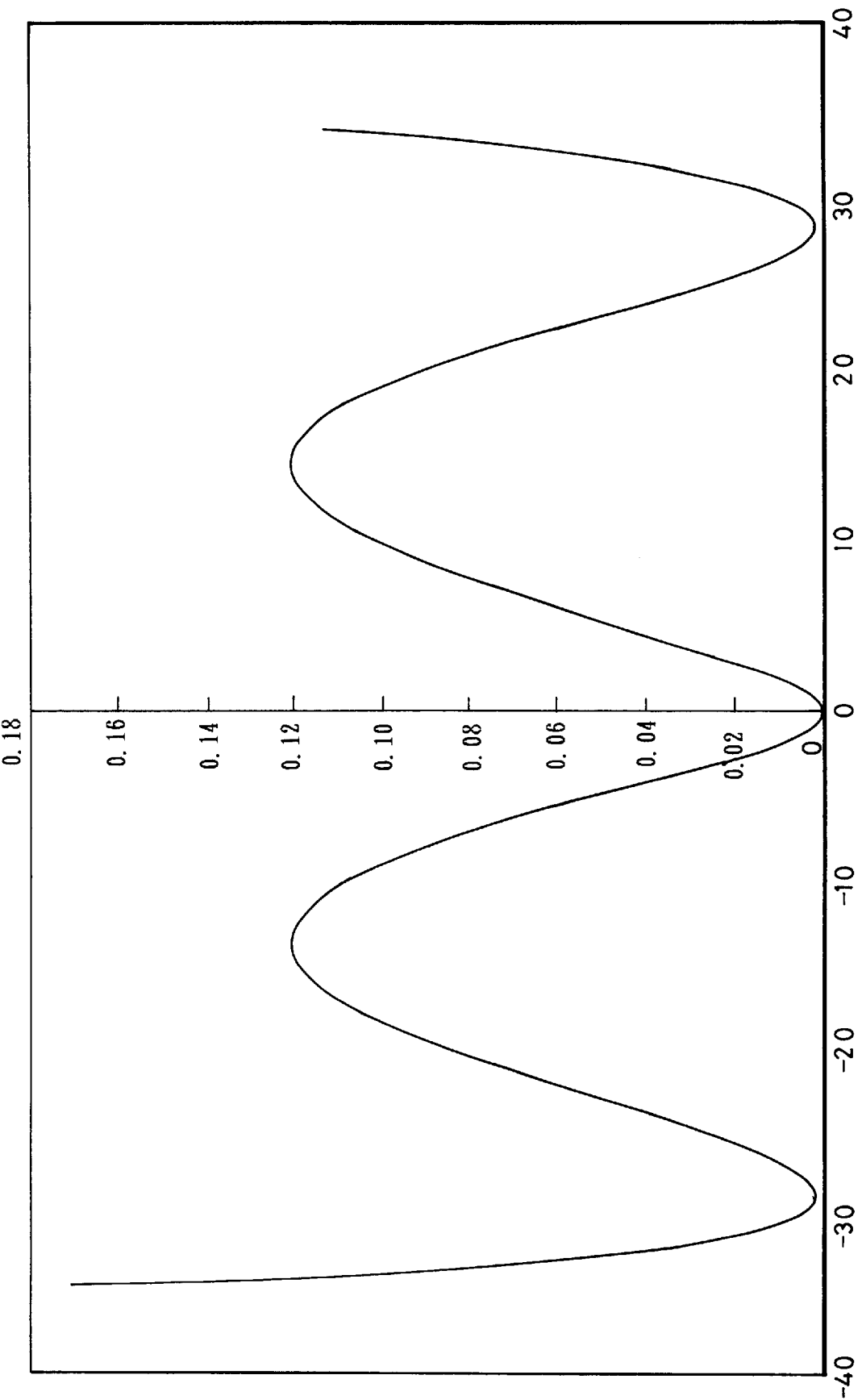
FIG. 42 is a graph for showing the oblique astigmatic error caused in the positive-refractive-power aspherical spectacle lens (namely, the seventh embodiment of the present invention)

FIG. 42 shows the oblique astigmatic error caused in the positive-refractive-power aspherical spectacle lens of FIG. 38. In FIG. 42, abscissas represent the distance from the optical axis thereof (in mm); and ordinates the oblique astigmatic error (in diopters).

As is seen from FIG. 42, in a region, which has a diameter of 40 mm, around the optical axis, in the far-viewing case, the oblique astigmatic error is within the range between ±0.15 (in diopters).

Figure 43:
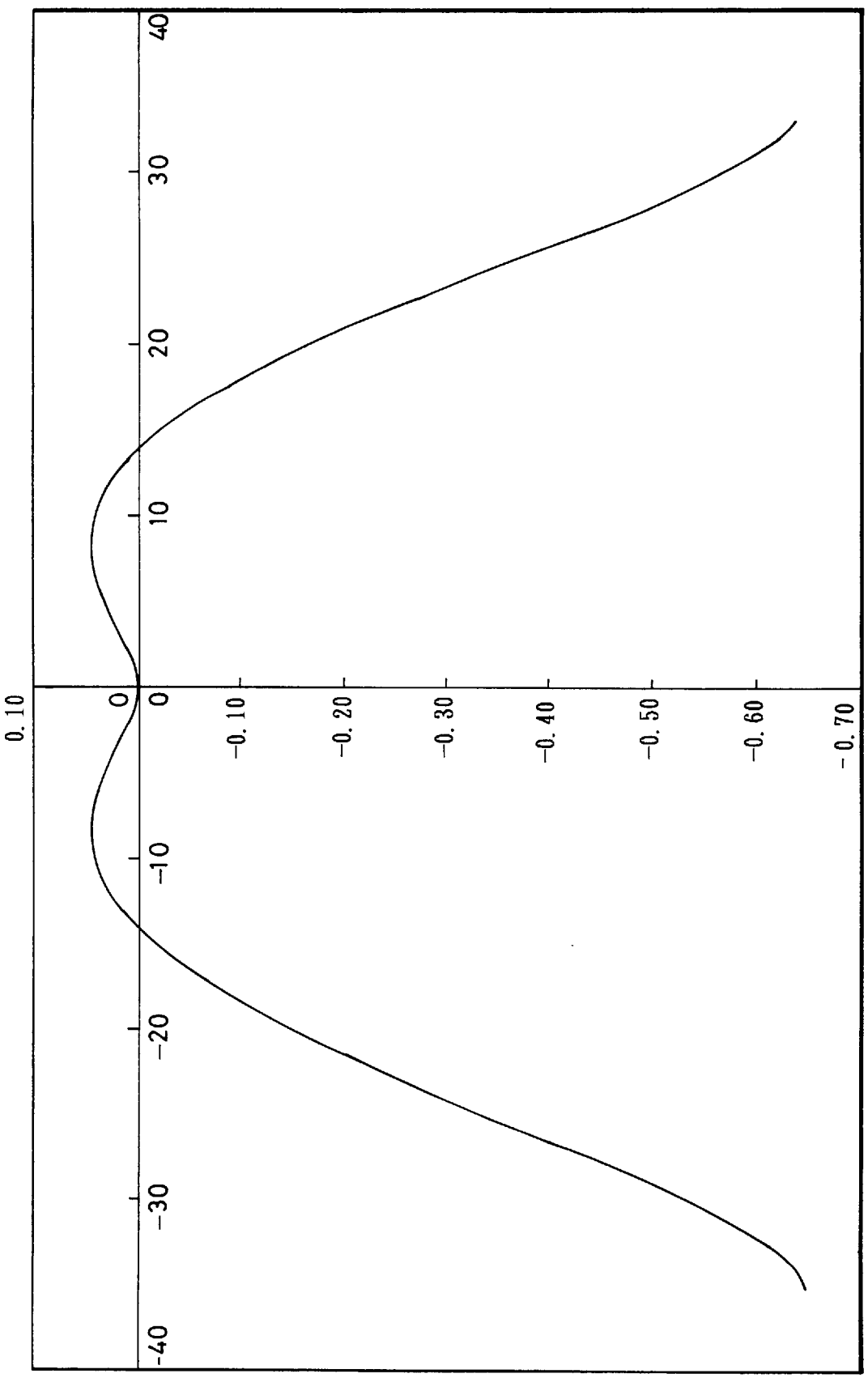
FIG. 43 is a graph for showing the mean oblique error caused in the positive-refractive-power aspherical spectacle lens (namely, the seventh embodiment of the present invention)

FIG. 43 is a graph for showing the mean oblique error caused in the positive-refractive-power aspherical spectacle lens of FIG. 38. In FIG. 43, abscissas represent the distance from the optical axis thereof (in mm); and ordinates the mean oblique error (in diopters).

As is seen from FIG. 43, in a region, which has a diameter of 30 mm, around the optical axis, in the far-viewing case, the mean oblique error is within the range between ±0.20 (in diopters).

As above described, in accordance with the seventh embodiment of the present invention, the first surface is determined as defined in the equation (4). Thereby, the (center) thickness of the lens is small in comparison with that of the conventional spherical lens. Moreover, the design of the lens is performed by taking the decentration into consideration. Thus, the performance degradation due to the decentration is reduced.

Eighth Embodiment

Figure 44:
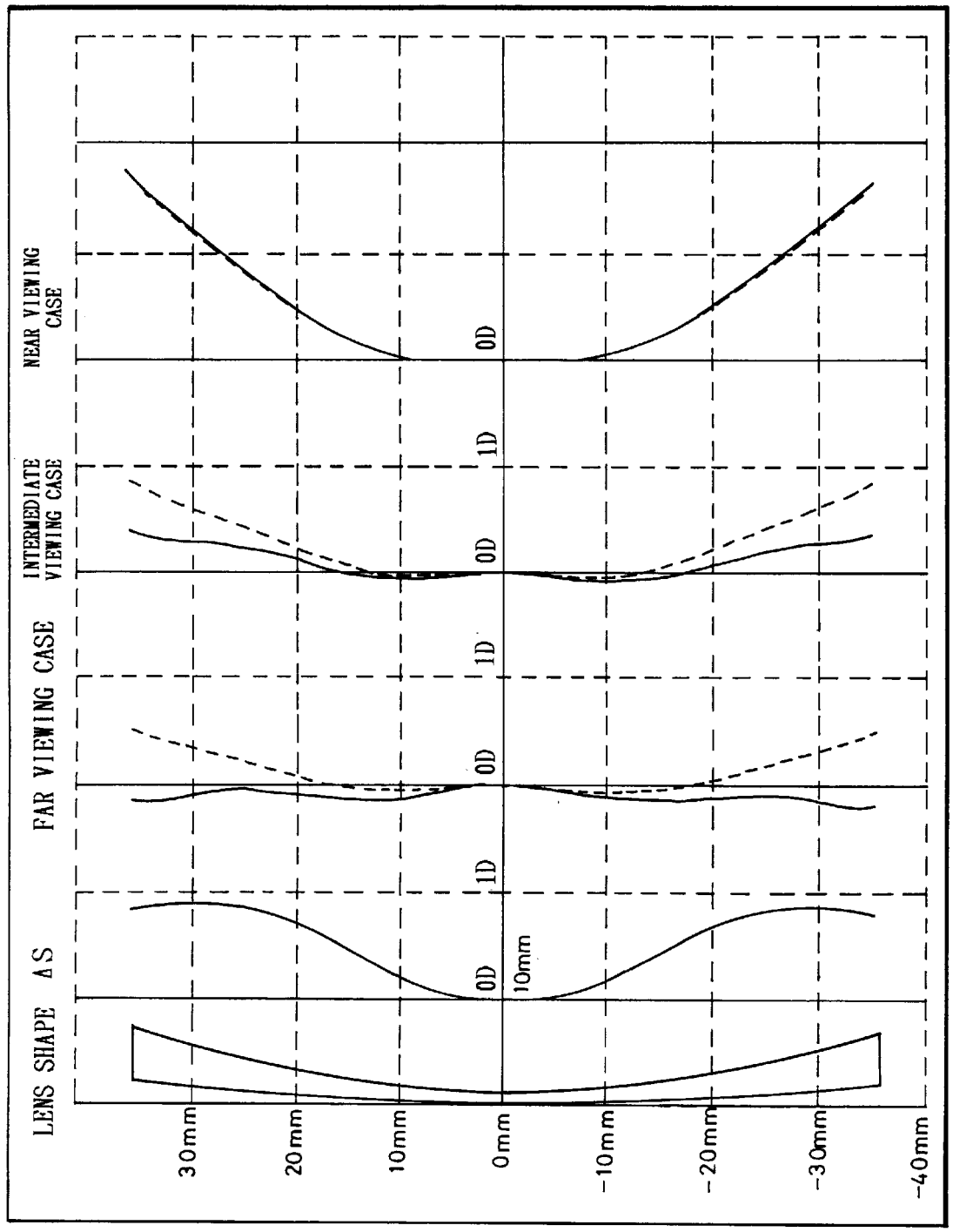
FIG. 44 is a graph for showing the relation among the shape of a negative-refractive-power aspherical spectacle lens (namely, an eighth embodiment of the present invention), in which no decentration is caused, the difference ΔS caused therein, the oblique astigmatic error caused therein in the case of viewing long-distance places, the oblique astigmatic error caused therein the case of viewing middle-distance places and the oblique astigmatic error caused therein the case of viewing short-distance places.

FIG. 44 illustrates the relation among the lens shape of a negative-refractive-power aspherical spectacle lens (namely, the eighth embodiment of the present invention) in which no decentration is caused, the difference ΔS, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. Here, note that ΔS is corresponding to the first surface. In the graphs of FIG. 44 respectively corresponding to the case of far viewing, that of intermediate viewing and that of near viewing, solid curves represent the oblique astigmatic errors, and broken curves represent the mean oblique errors. Incidentally, in the graphs of ΔS and the oblique astigmatic error and the mean oblique error in the cases of far viewing, of intermediate viewing and of near viewing, abscissas are represented in units of diopters.

The first surface of the negative-refractive-power aspherical spectacle lens of FIG. 44 is defined by the equation (4). Further, in the case of this negative-refractive-power aspherical spectacle lens, the design thereof in a starting stage is performed by taking decentration aberration, which is caused when this lens is "shifted" 4 mm from the optical axis thereof, into consideration as a target value of optimization, in addition to a usual target value of optimization. Moreover, the design of this lens is performed by further taking decentration aberration, which is caused when only he first surface of this lens is "shifted" 4 mm from the optical axis thereof, into consideration as a target value of optimization. Additionally, the design of this lens is carried out by setting the refractive power thereof at (−4.0) D.

Further, the second refractive surface of the negative-refractive-power aspherical spectacle lens of FIG. 44 has a spherical shape.

Moreover, the refractive-power, diameter, refractive index and shape of the negative-refractive-power aspherical spectacle lens of FIG. 44, whose first surface (namely, the left-side surface as shown in FIG. 44) is an aspherical surface defined by the equation (4), are presented in the following "TABLE 15".

TABLE 15

| | |
|---|---|
| Refractive Power: | −4.0 D |
| Lens Diameter: | φ70 mm |
| Refractive Index ($n_e$): | 1.501 |
| Center Thickness: | 1.00 mm |
| Front-surface Curvature: | $1.99468 \times 10^{-3}$ |
| Back-surface Curvature: | $9.98004 \times 10^{-3}$ |
| Aspherical Coefficients: | |
| $A_{4.0} = -4.83780 \times 10^{-7}$ | |
| $A_{4.7} = 2.26090 \times 10^{-7}$ | |
| $A_{5.4} = -1.99000 \times 10^{-8}$ | |
| $A_{6.1} = 5.22810 \times 10^{-10}$ | |

In the case of this embodiment of the present invention, the decentration corresponding to the ratio (K/H)=4/70= 0.057 (incidentally, K designates a vertical change in decentration (namely, an amount of the shift taken into account when designing the lens (mm); and H a maximum outside-diameter (namely, a lens diameter) (mm)) is taken into consideration.

Figure 45:
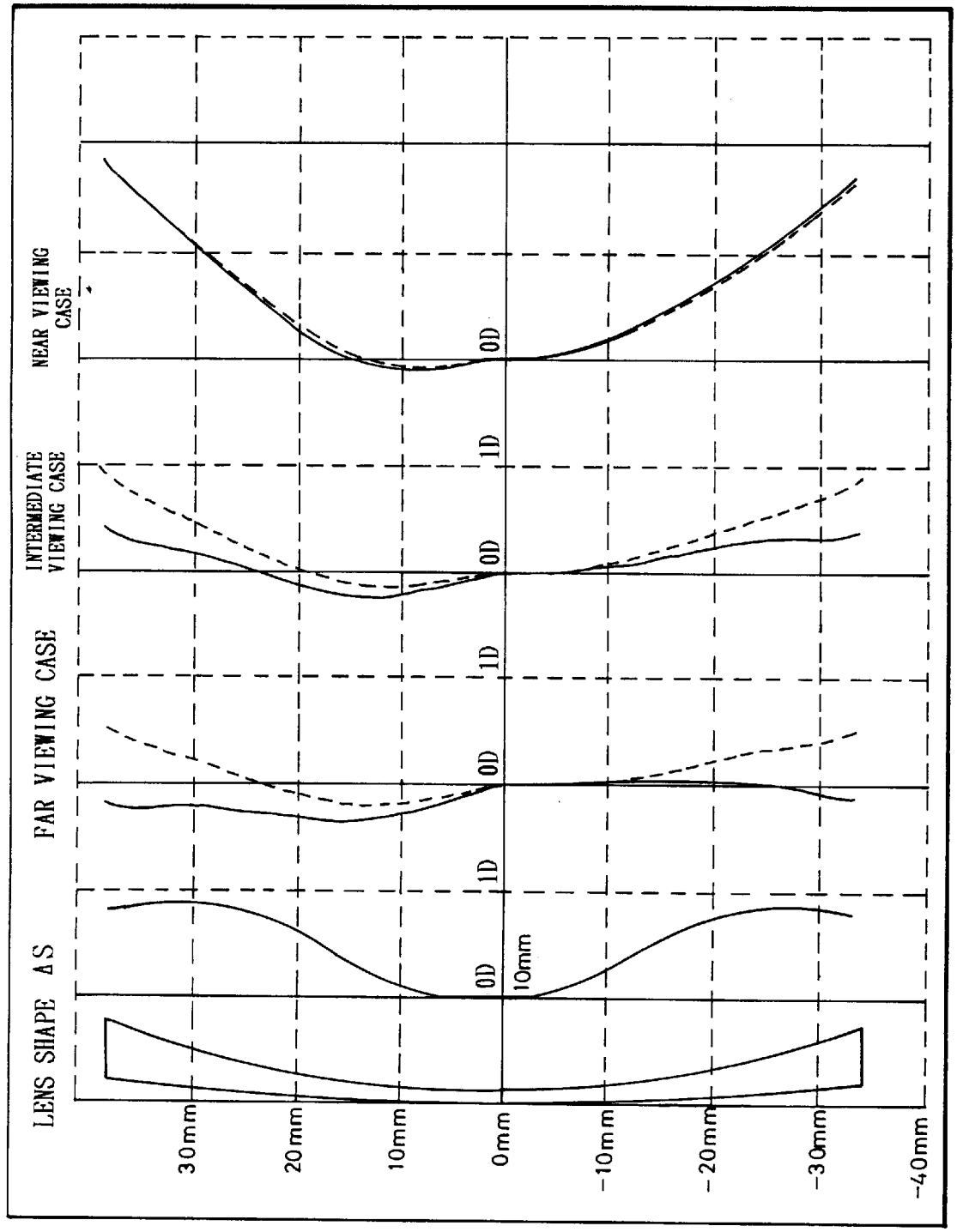
FIG. 45 is a graph for showing the relation among the shape of this negative-refractive-power aspherical spectacle lens (namely, the eighth embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 45, there is shown the relation among the (lens) shape of the negative-refractive-power aspherical spectacle lens of FIG. 44, which is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 46:
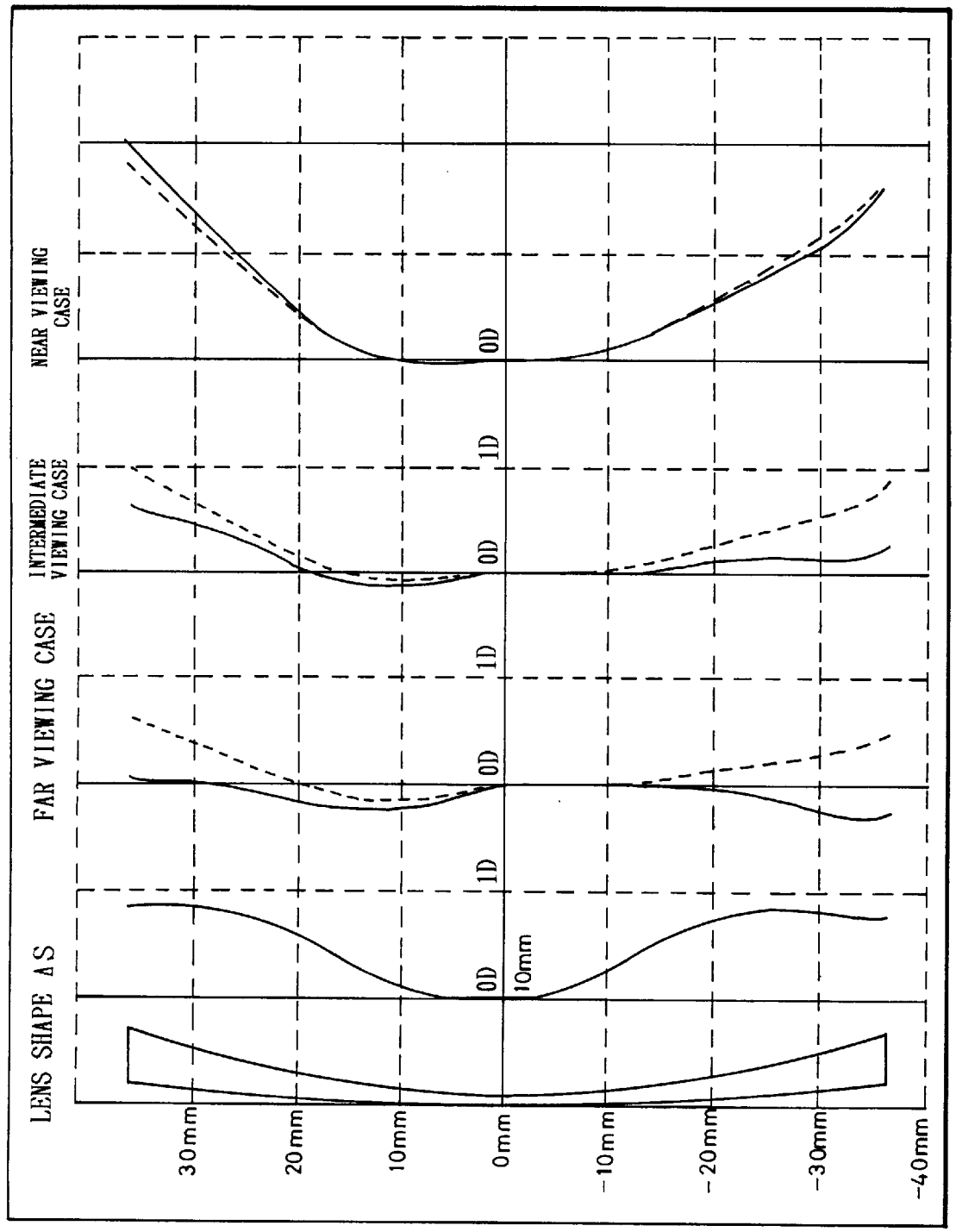
FIG. 46 is a graph for showing the relation among the shape of the negative-refractive-power aspherical spectacle lens (namely, the eighth embodiment of the present invention), in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Further, referring now to FIG. 46, there is shown the relation among the (lens) shape of the negative-refractive-power aspherical spectacle lens of FIG. 44, in which only first surface is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of far viewing, that of intermediate viewing and that of near viewing, of FIGS. 45 and 46, solid curves represent oblique astigmatic errors, and broken curves represent mean oblique errors. Incidentally, in the graphs of ΔS and the oblique astigmatic error and the mean oblique error in the cases of far viewing, of intermediate viewing and of near viewing, abscissas are represented in units of diopters.

As is seen or understood from these figures, in the case of the negative-refractive-power aspherical spectacle lenses of FIGS. 44, 45 and 46, similarly as in the case of the fourth embodiment, variation in the oblique astigmatic error due to the decentration is small in the vicinity of the optical axis (namely, a region in which the distance from the optical axis ranges from 5 to 10 mm) in comparison with the conventional negative-refractive-power aspherical spectacle lenses of FIGS. 68, 69 and 70.

Further, similarly as in the case of the fourth embodiment, in the case of the negative-refractive-power aspherical spectacle lenses according to the eighth embodiment, as is seen from these figures, there is very little mean oblique error at places located in the vicinity of the optical axis even if the places are off the optical axis thereof, so that a deviation in the refractive power of the lens at the time of measuring the refractive power is small.

The following "TABLE 16" presents ΔS in the case of the negative-refractive-power aspherical spectacle lens of FIG. 44. Further, FIG. 47 illustrates ΔS caused in the proximity of the optical axis in the case of the negative-refractive-power aspherical spectacle lens of FIG. 44.

TABLE 16

| ρ (mm) | ΔS (in diopters) |
|---|---|
| 0.000 | 0.00000 |
| 0.899 | −0.00103 |
| 2.252 | −0.00063 |
| 3.159 | 0.00403 |
| 4.073 | 0.01359 |
| 4.995 | 0.02873 |

Figure 47:
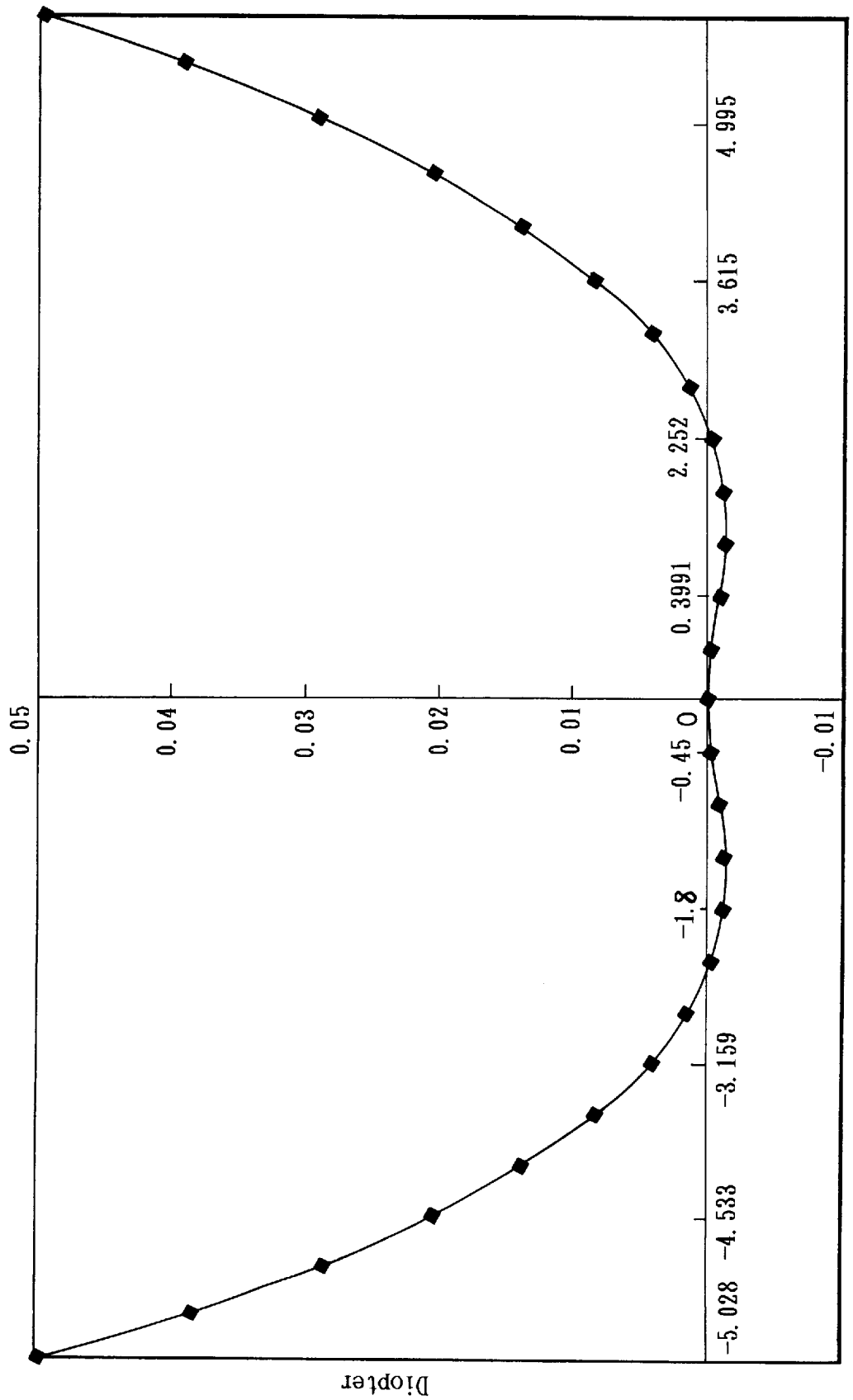
FIG. 47 is a graph for showing the difference ΔS caused in the negative-refractive-power aspherical spectacle lens (namely, the eighth embodiment of the present invention)

As is shown in TABLE 16 and FIG. 47, the inequality (3) is satisfied in a region of 10-mm diameter from the optical axis.

Further, as is seen from TABLE 16 and FIG. 47, ΔS takes a negative value at least once at the distance ρ in the range: 0<ρ≦5 (mm). Moreover, ΔS takes a positive value in a peripheral portion of the lens.

Figure 48:
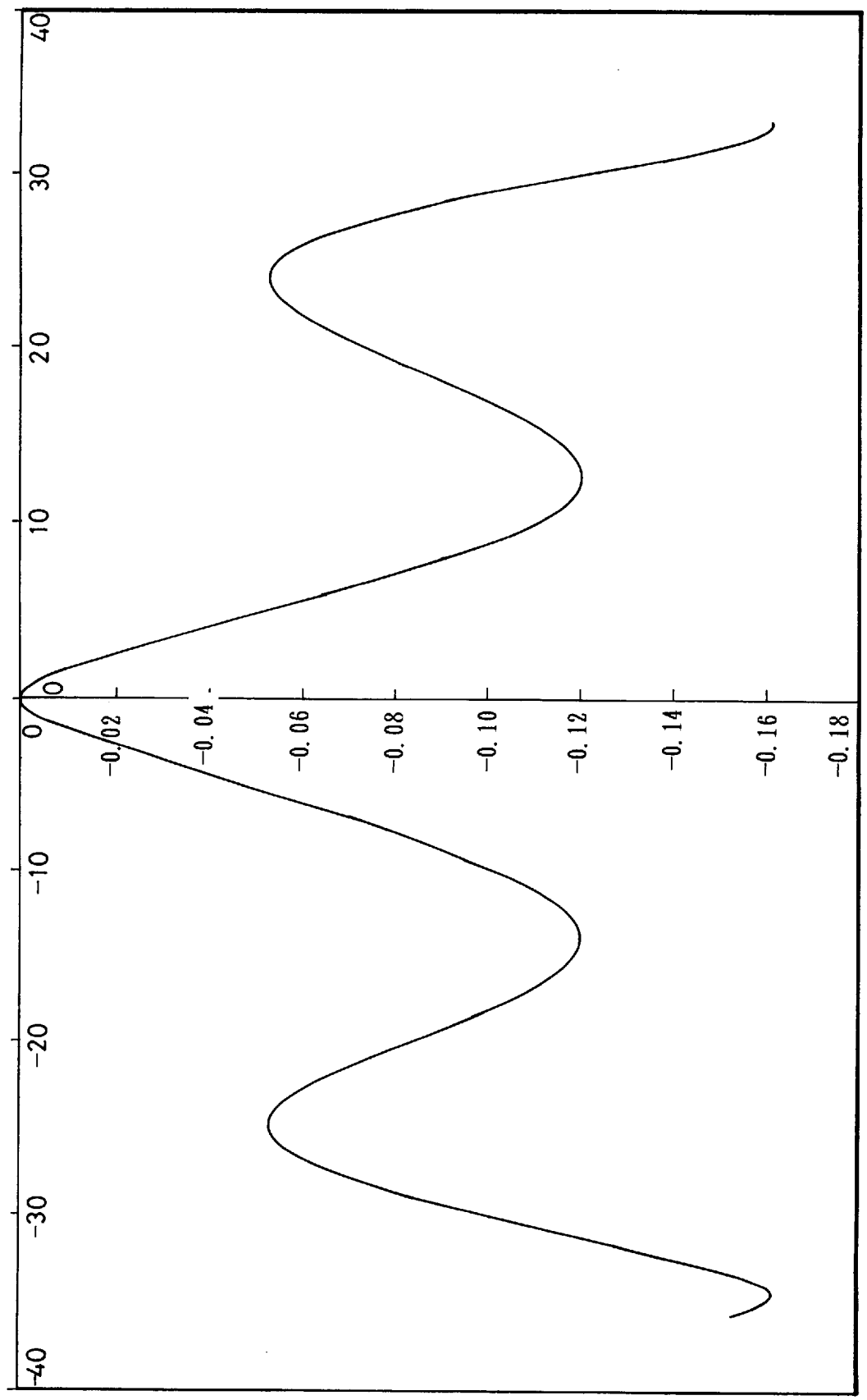
FIG. 48 is a graph for showing the oblique astigmatic error caused in the negative-refractive-power aspherical spectacle lens (namely, the eighth embodiment of the present invention)

FIG. 48 shows the oblique astigmatic error caused in the negative-refractive-power aspherical spectacle lens of FIG. 44. In FIG. 48, abscissas represent the distance from the optical axis thereof (in mm); and ordinates the oblique astigmatic error (in diopters).

As is seen from FIG. 48, in a region, which has a diameter of 40 mm, around the optical axis, in the far-viewing case, the oblique astigmatic error is within the range between ±0.15 (in diopters).

Figure 49:
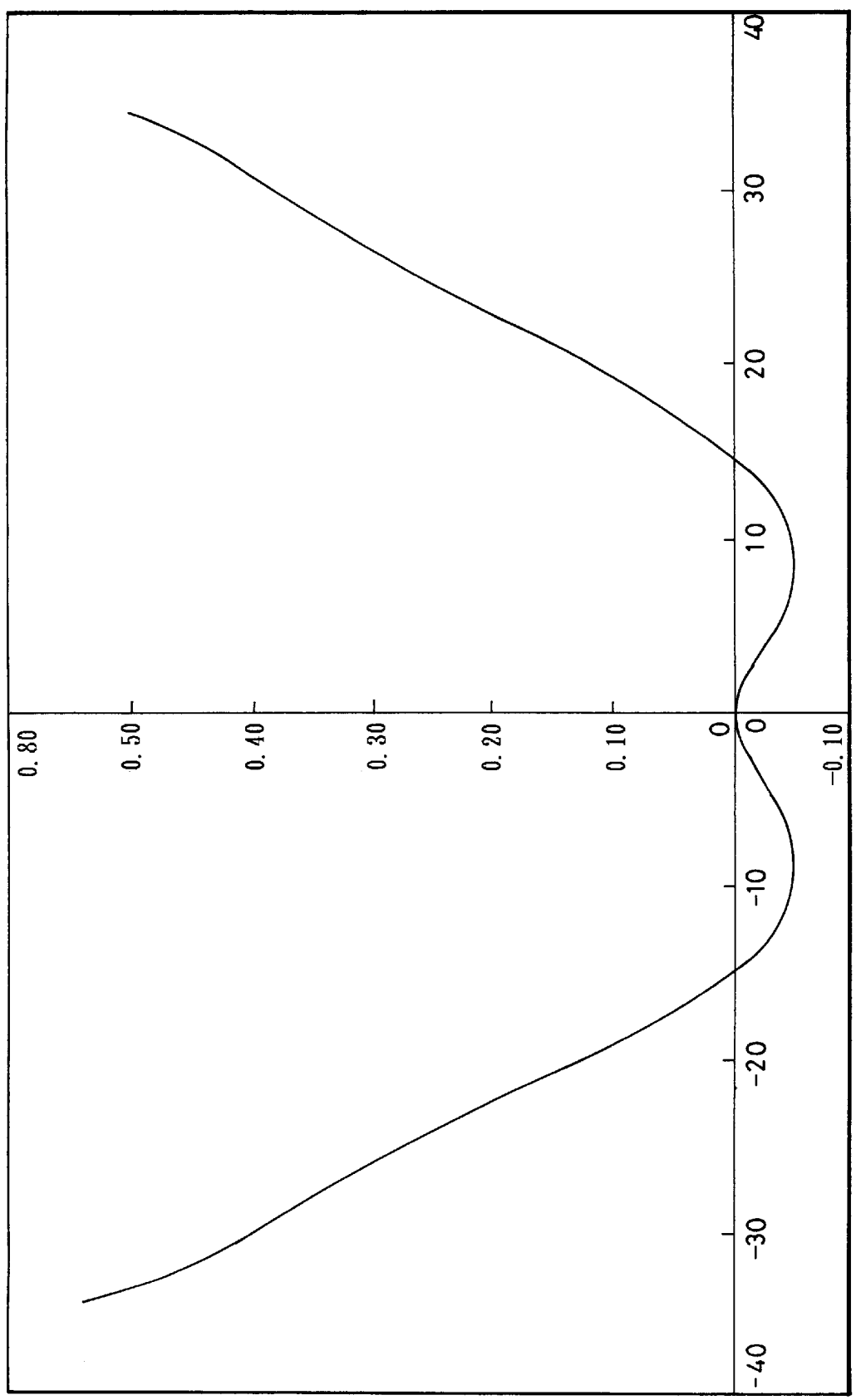
FIG. 49 is a graph for showing the mean oblique error caused in the negative-refractive-power aspherical spectacle lens (namely, the eighth embodiment of the present invention)

FIG. 49 is a graph for showing the mean oblique error caused in the negative-refractive-power aspherical spectacle lens of FIG. 44. In FIG. 49, abscissas represent the distance from the optical axis thereof (in mm); and ordinates the mean oblique error (in diopters)

As is seen from FIG. 49, in a region, which has a diameter of 30 mm, around the optical axis, in the far-viewing case, the mean oblique error is within the range between ±0.20 (in diopters).

As above described, in the case of the fourth embodiment, the first refractive surface is determined as defined in the equation (4). Thereby, the edge thickness of the lens is small in comparison with that of the conventional spherical lens. Moreover, the design of the lens is performed by taking the decentration into consideration. Thus, the performance degradation due to the decentration is reduced.

Ninth Embodiment

FIG. 50 illustrates the relation among the lens shape of another positive-refractive-power aspherical spectacle lens (namely, the ninth embodiment of the present invention) in which no decentration is caused, ΔS, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. Here, note that ΔS is corresponding to the second surface. In the graphs of FIG. 50 respectively corresponding to the case of far viewing, that of intermediate viewing and that of near viewing, solid curves represent the oblique astigmatic error, and broken curves represent the mean oblique errors. Incidentally, in the graphs of ΔS and the oblique astigmatic errors and the mean oblique errors in the cases of far viewing, of intermediate viewing and of near viewing, abscissas are represented in units of diopters.

The second surface of the positive-refractive-power aspherical spectacle lens of FIG. 50 is defined by the equation (4). Further, in the case of this positive-refractive-power aspherical spectacle lens, the design thereof in a starting stage is performed by taking decentration aberration, which is caused when this lens is "shifted" 4 mm from the optical axis thereof, into consideration as a target value of optimization, in addition to a usual target value of optimization. Moreover, the design of this lens is performed by further taking decentration aberration, which is caused when only the first surface of this lens is "shifted" 4 mm from the optical axis thereof, into consideration as a target value of optimization. Furthermore, the design of this lens is performed by setting the refractive power thereof at 3.0 D.

Further, the first refractive surface of the positive-refractive-power aspherical spectacle lens of FIG. 50 has a spherical shape.

Moreover, the refractive-power, diameter, refractive index and shape of the positive-refractive-power aspherical spectacle lens of FIG. 50, whose first surface (namely, the right-side surface as shown in FIG. 50) is an aspherical surface defined by the equation (4), are presented in the following "TABLE 17".

TABLE 17

| | |
|---|---|
| Refractive Power: | 3.0 D |
| Lens Diameter: | φ70 mm |
| Refractive Index ($n_e$): | 1.501 |
| Edge Thickness: | 0.80 mm |
| Front-surface Curvature: | $8.86179 \times 10^{-3}$ |
| Back-surface Curvature: | $2.98380 \times 10^{-3}$ |
| Aspherical Coefficients: | |
| $A_{4.0} = -4.54600 \times 10^{-7}$ | |
| $A_{4.7} = 1.96500 \times 10^{-7}$ | |
| $A_{5.4} = -1.62500 \times 10^{-8}$ | |
| $A_{6.1} = 4.02000 \times 10^{-10}$ | |

In the case of this embodiment of the present invention, the decentration corresponding to the ratio (K/H)=4/70= 0.057 (incidentally, K designates a vertical change in decentration (namely, an amount of the shift taken into account when designing the lens (mm); and H a maximum outside-diameter (namely, a lens diameter) (mm)) is taken into consideration.

Referring next to FIG. 51, there is shown the relation among the (lens) shape of the positive-refractive-power aspherical spectacle lens of FIG. 50, which is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 52:
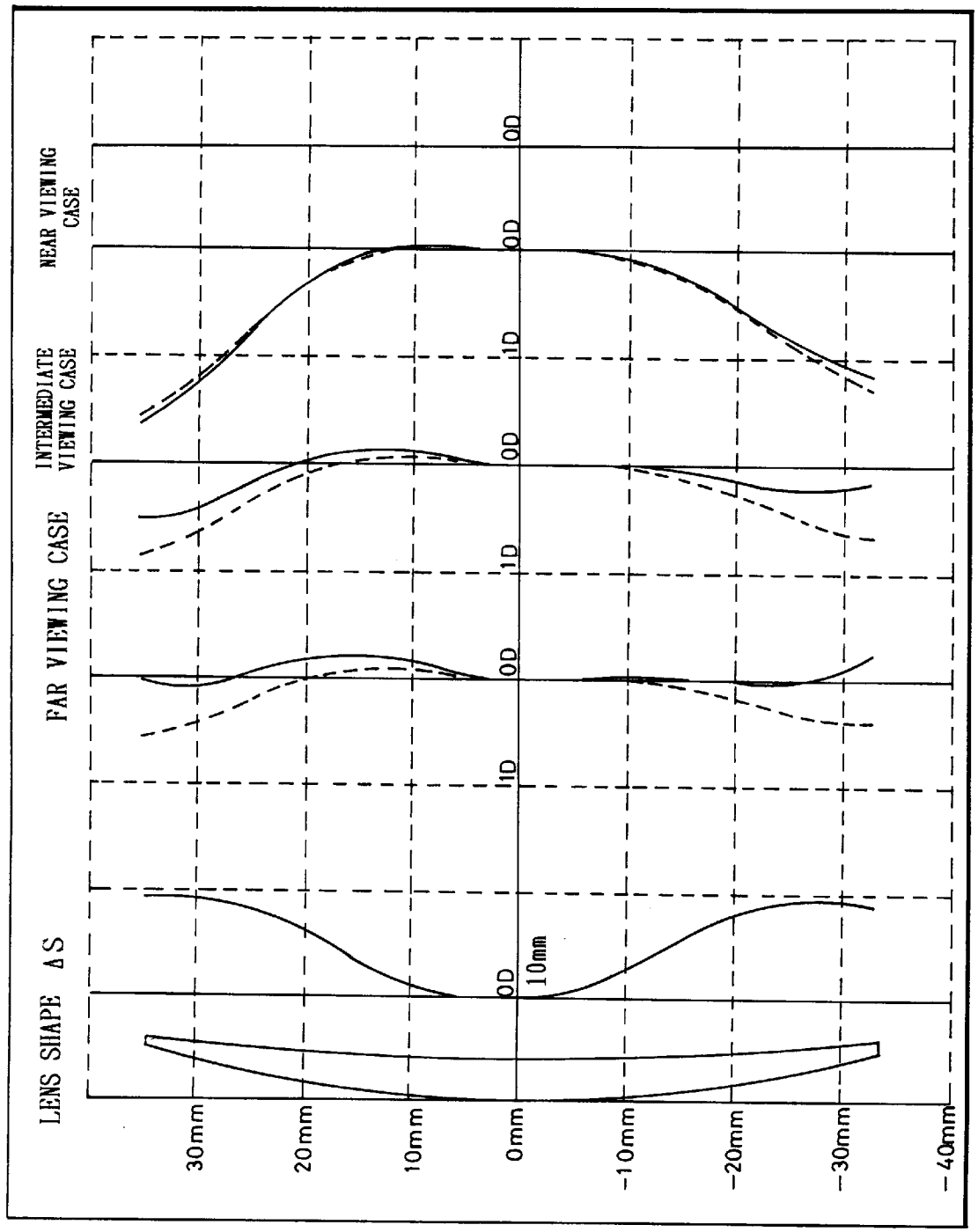
FIG. 52 is a graph for showing the relation among the shape of the positive-refractive-power aspherical spectacle lens (namely, the ninth embodiment of the present invention), in which only one of the refractive surfaces, namely, the first surface is shifted from the optical axis by 2 mm, the difference ΔS caused therein, oblique astigmatic error caused therein in the far-viewing case, the oblique astigmatic error caused therein in the intermediate-viewing case and the oblique astigmatic error caused therein in the near-viewing case.

Further, referring now to FIG. 52, there is shown the relation among the (lens) shape of the positive-refractive-power aspherical spectacle lens of FIG. 50, in which only first surface is "shifted" 2 mm from the optical axis thereof, the difference ΔS, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of far viewing, that of intermediate viewing and that of near viewing, of FIGS. 51 and 52, solid curves represent oblique astigmatic errors, and broken curves represent mean oblique errors. Incidentally, in the graphs of ΔS and the oblique astigmatic error and the mean oblique error in the cases of far viewing, of intermediate viewing and of near viewing, abscissas are represented in units of diopters.

Moreover, as is seen or understood from the figures, in the case of the positive-refractive-power aspherical spectacle lenses of FIGS. 50, 51 and 52, variation in the oblique astigmatic error due to the decentration is small in the vicinity of the optical axis (namely, a region in which the distance from the optical axis ranges from 5 to 10 mm) in comparison with the conventional positive-refractive-power aspherical spectacle lenses of FIGS. 62, 63 and 64.

Furthermore, in the case of the positive-refractive-power aspherical spectacle lenses according to the ninth embodiment, as is seen from these figures, there is very little mean oblique error at places located in the vicinity of the optical axis even if the places are off the optical axis thereof, so that a deviation in the refractive power of the lens at the time of measuring the refractive power is small, similarly as in the case of the positive-refractive-power aspherical spectacle lenses according to the first embodiment of the present invention.

The following "TABLE 18" presents ΔS in the case of the positive-refractive-power aspherical spectacle lens of FIG. 50. Further, FIG. 53 illustrates ΔS caused in the proximity of the optical axis in the case of the positive-refractive-power aspherical spectacle lens of FIG. 50.

TABLE 18

| ρ (mm) | ΔS (in diopters) |
|---|---|
| 0.000 | 0.00000 |
| 0.973 | −0.00117 |
| 1.947 | −0.00178 |
| 2.953 | 0.00074 |
| 3.907 | 0.00789 |
| 5.392 | 0.02920 |

Figure 53:
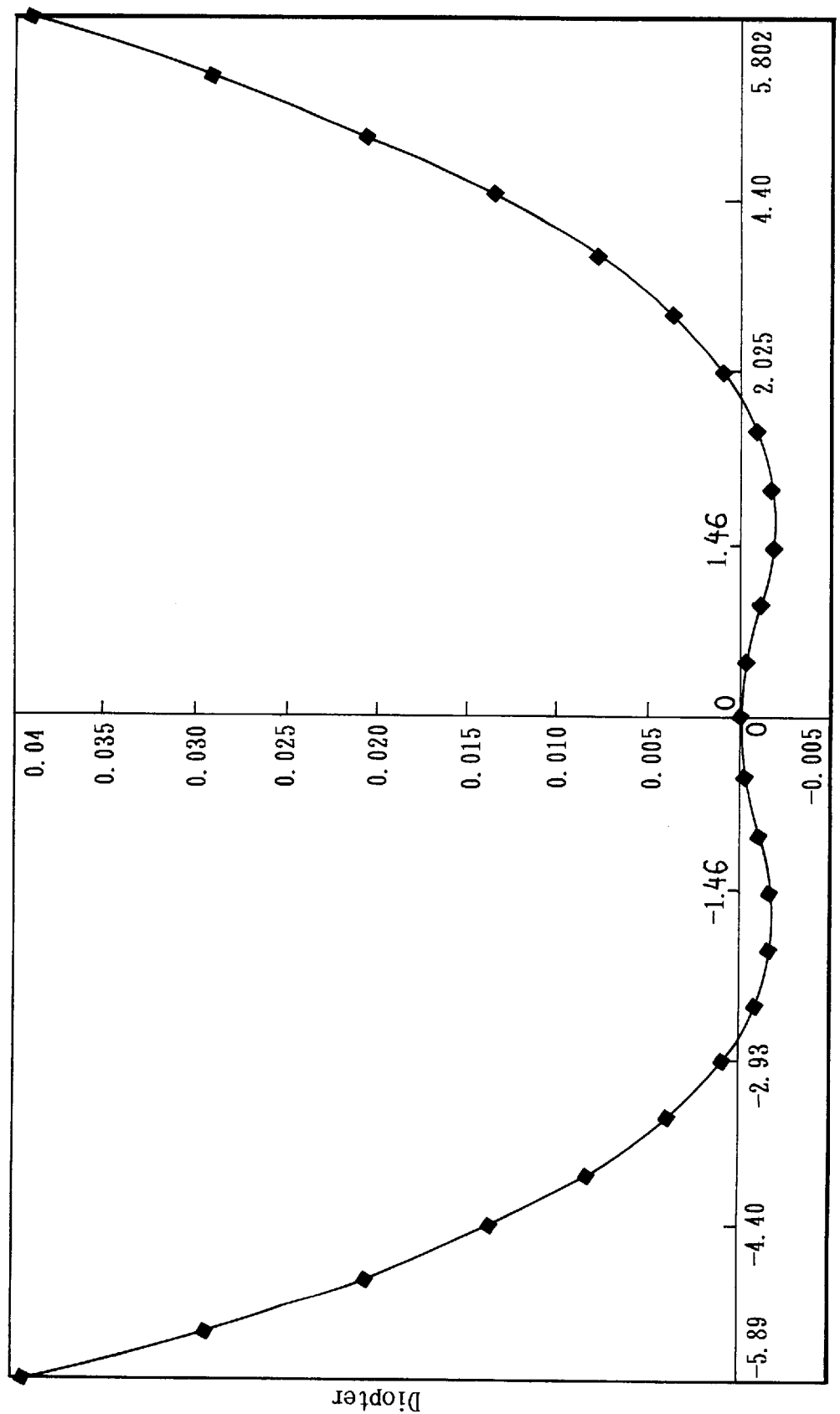
FIG. 53 is a graph for showing the difference ΔS caused in the positive-refractive-power aspherical spectacle lens (namely, the ninth embodiment of the present invention)

As is shown in TABLE 18 and FIG. 53, the inequality (3) is satisfied in a region of 10-mm diameter from the optical axis.

Further, as is seen from TABLE 18 and FIG. 53, ΔS takes a negative value at least once at the distance ρ in the range: 0<ρ≦5 (mm). Moreover, ΔS takes a positive value in a peripheral portion of the lens.

Figure 54:
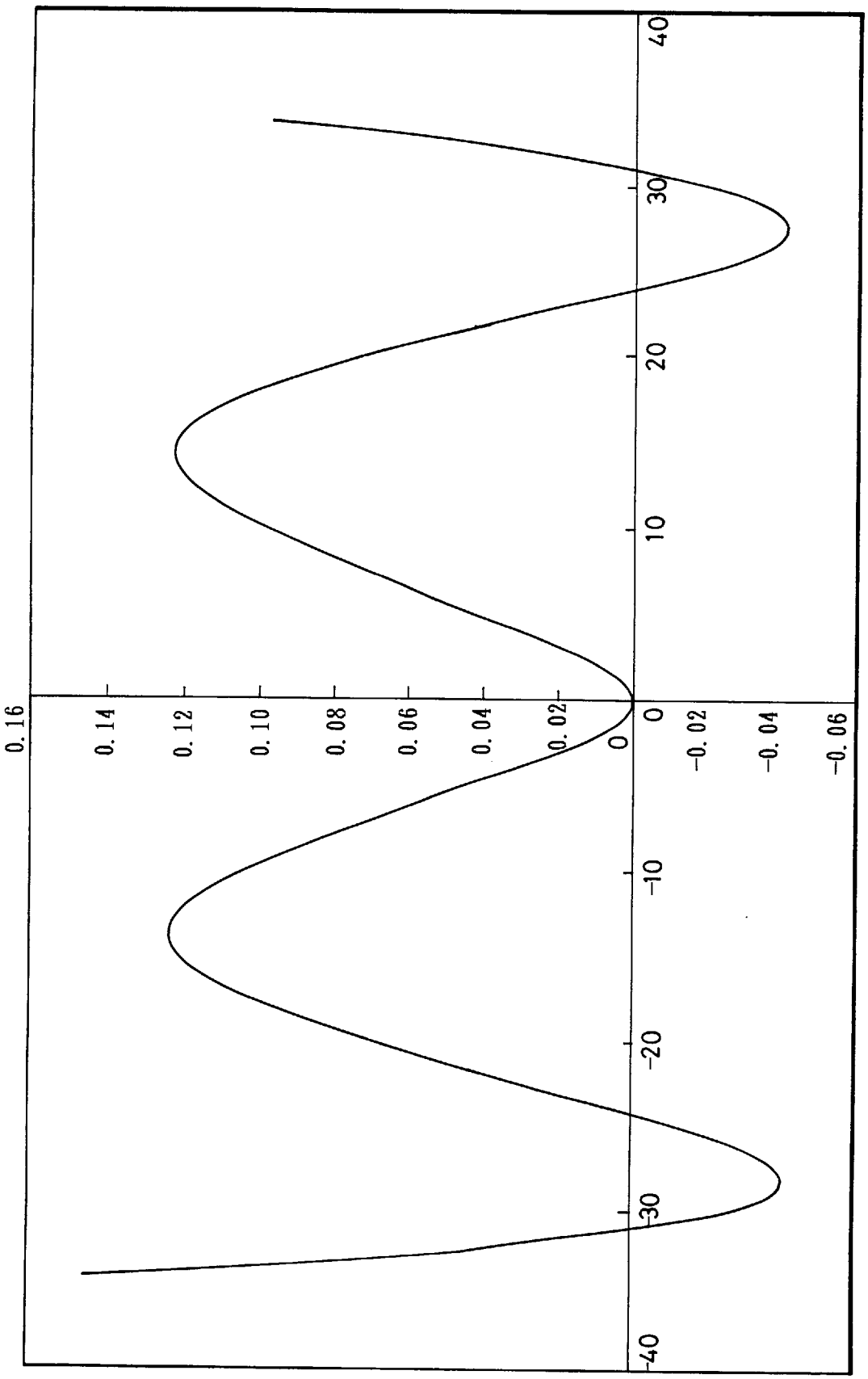
FIG. 54 is a graph for showing the oblique astigmatic error caused in the positive-refractive-power aspherical spectacle lens (namely, the ninth embodiment of the present invention)

FIG. 54 shows the oblique astigmatic error caused in the positive-refractive-power aspherical spectacle lens of FIG. 50. In FIG. 54, abscissas represent the distance from the optical axis thereof (in mm); and ordinates the oblique astigmatic error (in diopters).

As is seen from FIG. 54, in a region, which has a diameter of 40 mm, around the optical axis, in the far-viewing case, the oblique astigmatic error is within the range between ±0.15 (in diopters).

Figure 55:
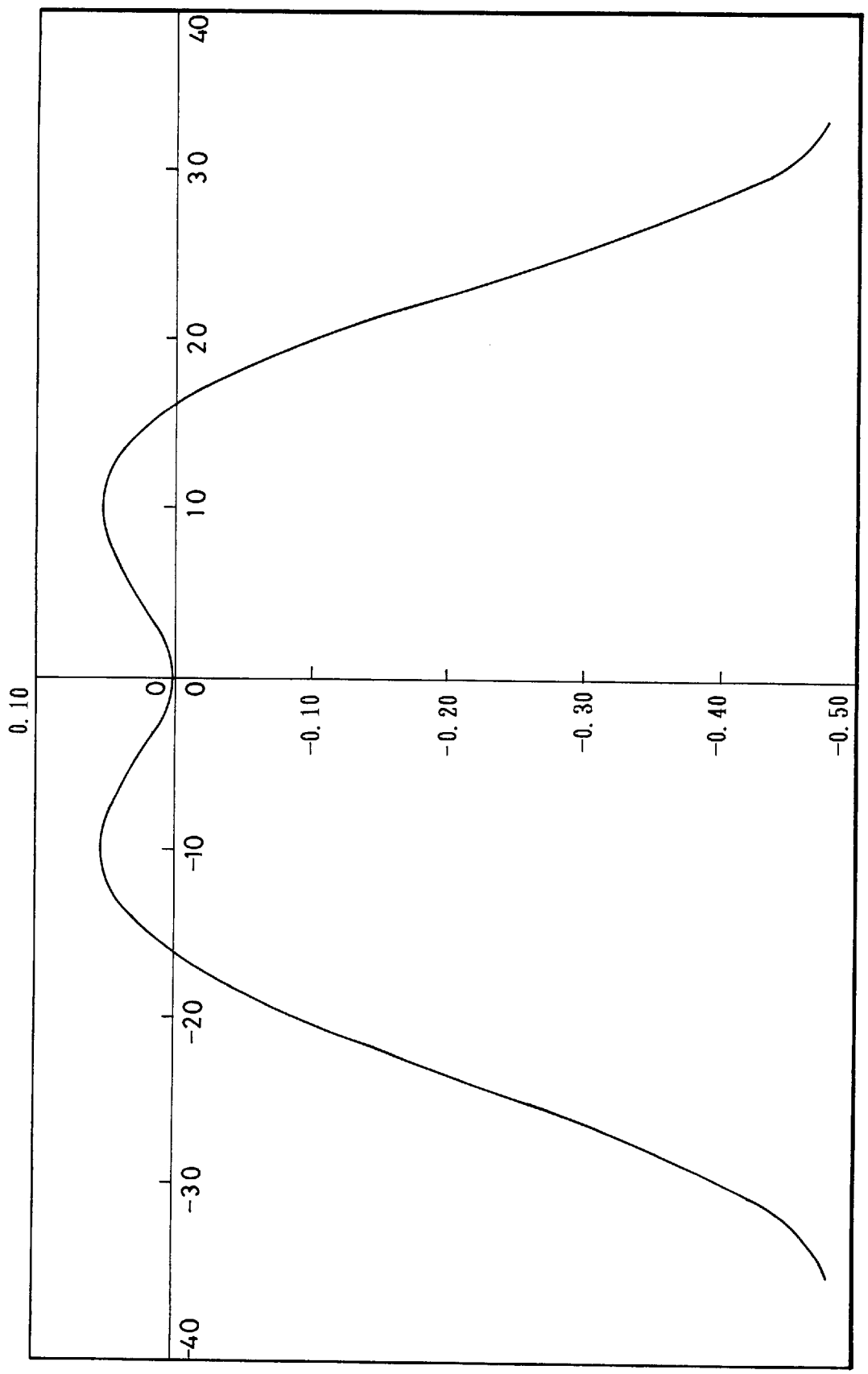
FIG. 55 is a graph for showing the mean oblique error caused in the positive-refractive-power aspherical spectacle lens (namely, the ninth embodiment of the present invention)

FIG. 55 is a graph for showing the mean oblique error caused in the positive-refractive-power aspherical spectacle lens of FIG. 50. In FIG. 55, abscissas represent the distance from the optical axis thereof (in mm); and ordinates the mean oblique error (in diopters).

As is seen from FIG. 55, in a region, which has a diameter of 30 mm, around the optical axis, in the far-viewing case, the mean oblique error is within the range between ±0.20 (in diopters).

As above described, in accordance with the ninth embodiment of the present invention, the second refractive surface is determined as defined by the equation (4). Thus, in the case of the ninth embodiment, the (center) thickness of the lens is small in comparison with that of the conventional spherical lens. Moreover, the design of the lens is performed by taking the decentration into consideration. Consequently, the performance degradation due to the decentration is reduced.

Tenth Embodiment

Figure 56:
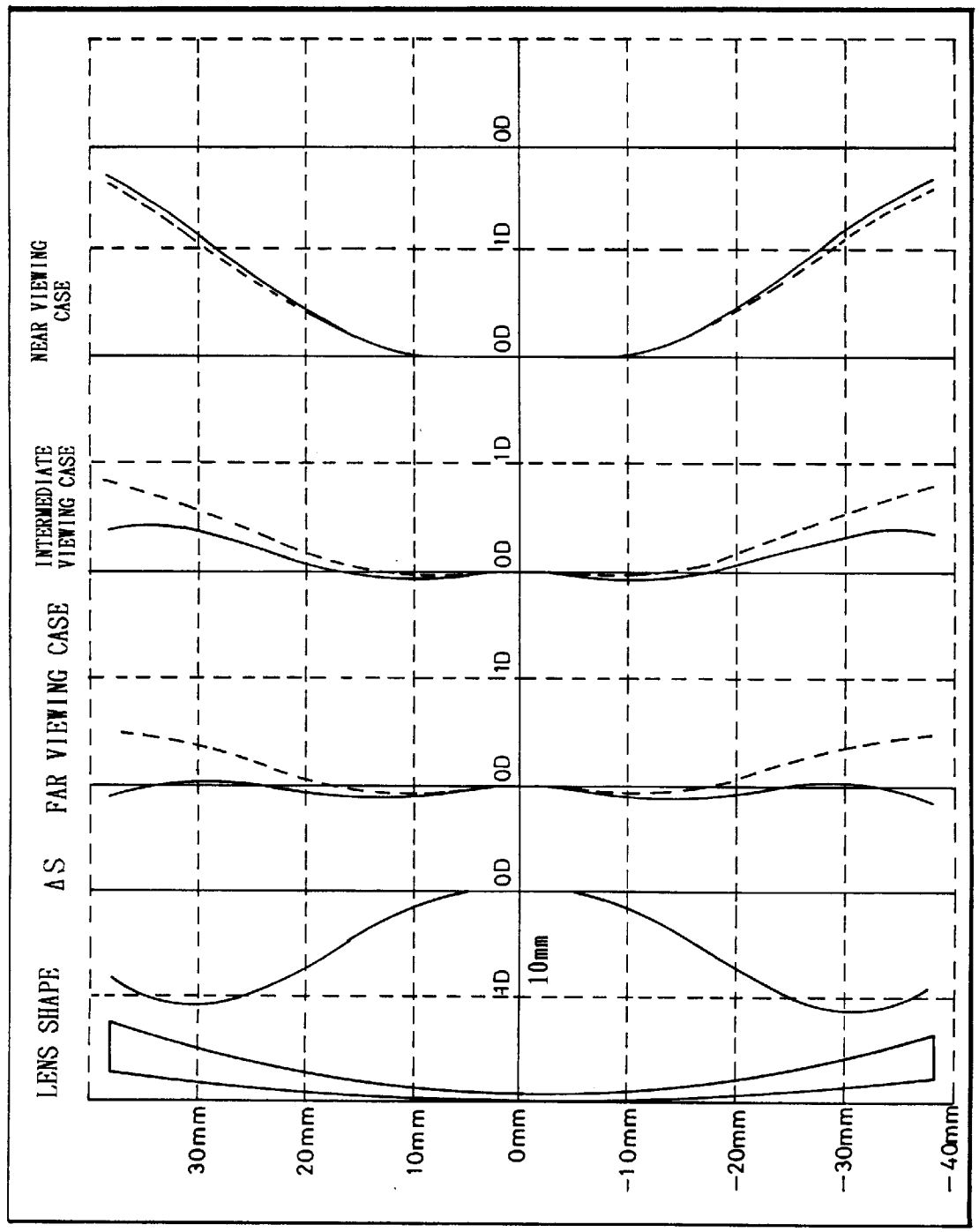
FIG. 56 is a graph for showing the relation among the shape of a negative-refractive-power aspherical spectacle lens (namely, a tenth embodiment of the present invention), in which no decentration is caused, the difference ΔS caused therein, the oblique astigmatic error caused therein in the case of viewing long-distance places, the oblique astigmatic error caused therein the case of viewing middle-distance places and the oblique astigmatic error caused therein the case of viewing short-distance places.

FIG. 56 illustrates the relation among the lens shape of a negative-refractive-power aspherical spectacle lens (namely, the tenth embodiment of the present invention) in which no decentration is caused, the difference $\Delta S$, the oblique astigmatic error and the mean oblique error caused therein in the case of far (or infinite) viewing, the oblique astigmatic error and the mean oblique error caused therein in the case of intermediate (or 1-m) viewing, and the oblique astigmatic error and the mean oblique error caused therein in the case of near (or 0.3-m) viewing. Here, note that $\Delta S$ is corresponding to the second surface. In the graphs of FIG. 56 respectively corresponding to the case of far viewing, that of intermediate viewing and that of near viewing, solid curves represent the oblique astigmatic errors, and broken curves represent the mean oblique errors. Incidentally, in the graphs of $\Delta S$ and the oblique astigmatic error and the mean oblique error in the cases of far viewing, of intermediate viewing and of near viewing, abscissas are represented in units of diopters.

The second surface of the negative-refractive-power aspherical spectacle lens of FIG. 56 is defined by the equation (4). Further, in the case of this negative-refractive-power aspherical spectacle lens, the design thereof in a starting stage is performed by taking decentration aberration, which is caused when this lens is "shifted" 5 mm from the optical axis thereof, into consideration as a target value of optimization, in addition to a usual target value of optimization. Moreover, the design of this lens is performed by further taking decentration aberration, which is caused when only the first surface of this lens is "shifted" 5 mm from the optical axis thereof, into consideration as a target value of optimization. Additionally, the design of this lens is carried out by setting the refractive power thereof at (-3.0) D.

Further, the first refractive surface of the negative-refractive-power aspherical spectacle lens of FIG. 56 has a spherical shape.

Moreover, the refractive-power, diameter, refractive index and shape of the negative-refractive-power aspherical spectacle lens of FIG. 56, whose second surface (namely, the right-side surface as shown in FIG. 56) is an aspherical surface defined by the equation (4), are presented in the following "TABLE 19".

TABLE 19

| | |
|---|---|
| Refractive Power: | -3.0 D |
| Lens Diameter: | φ75 mm |
| Refractive Index ($n_e$): | 1.501 |
| Center Thickness: | 1.00 mm |
| Edge Thickness: | 4.85 mm |
| Front-surface Curvature: | $2.99102 \times 10^{-3}$ |
| Back-surface Curvature: | $8.98204 \times 10^{-3}$ |
| Aspherical Coefficients: | |
| $A_{4.0} = 5.28900 \times 10^{-7}$ | |
| $A_{4.7} = -1.81000 \times 10^{-7}$ | |
| $A_{5.4} = 1.23000 \times 10^{-8}$ | |
| $A_{6.1} = -2.40000 \times 10^{-10}$ | |

In the case of this embodiment of the present invention, the decentration corresponding to the ratio (K/H)=5/75=0.067 (incidentally, K designates a vertical change in decentration (namely, an amount of the shift taken into account when designing the lens (mm); and H a maximum outside-diameter (namely, a lens diameter) (mm)) is taken into consideration.

Figure 57:
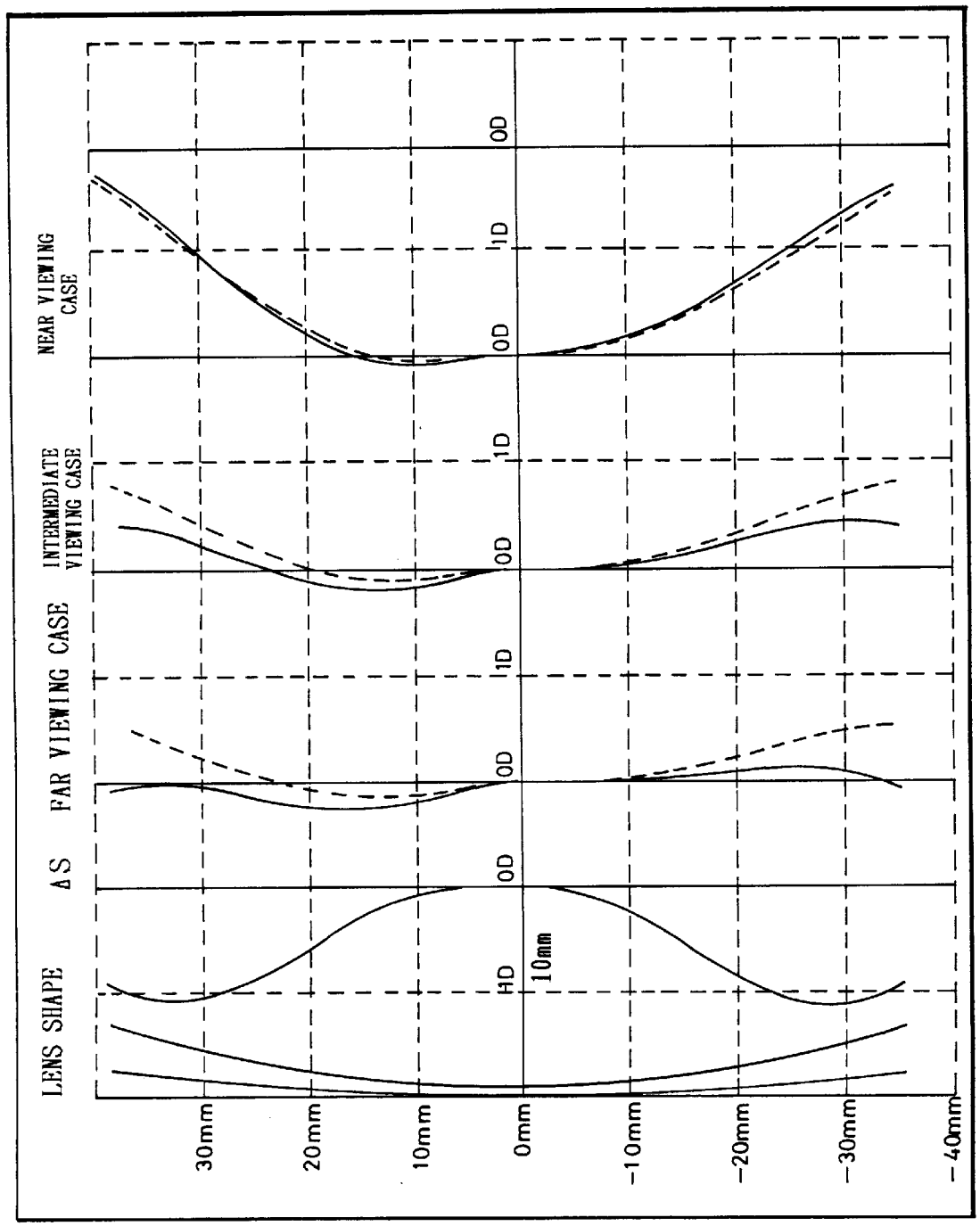
FIG. 57 is a graph for showing the relation among the shape of this negative-refractive-power aspherical spectacle lens (namely, the tenth embodiment of the present invention) shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Referring next to FIG. 57, there is shown the relation among the (lens) shape of the negative-refractive-power aspherical spectacle lens of FIG. 56, which is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

Figure 58:
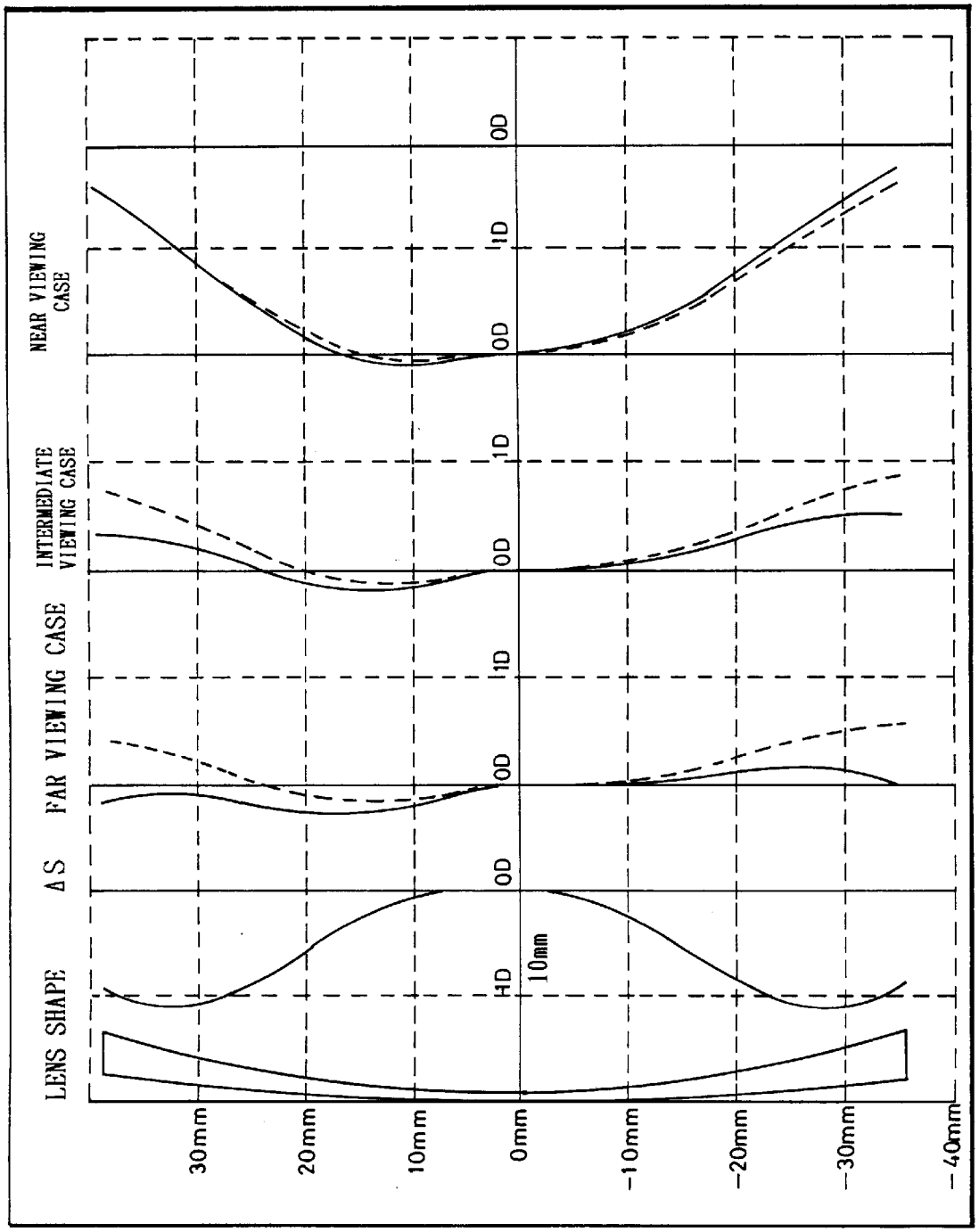
FIG. 58 is a graph for showing the relation among the shape of the negative-refractive-power aspherical spectacle lens (namely, the tenth embodiment of the present invention), in which only one of the refractive surfaces, namely, the first surface is shifted from the optical axis by 2 mm, the difference ΔS caused therein, the oblique astigmatic error caused therein in the far-viewing case, the oblique astigmatic error caused therein in the intermediate-viewing case and the oblique astigmatic error caused therein in the near-viewing case.

Further, referring now to FIG. 58, there is shown the relation among the (lens) shape of the negative-refractive-power aspherical spectacle lens of FIG. 56, in which only first surface is "shifted" 2 mm from the optical axis thereof, the difference $\Delta S$, the oblique astigmatic error and the mean oblique error caused therein in the case of far (or infinite) viewing, the oblique astigmatic error and the mean oblique error caused therein in the case of intermediate (or 1-m) viewing and the oblique astigmatic error and the mean oblique error caused therein in the case of near (or 0.3-m) viewing.

In the graphs, which respectively correspond to the case of far viewing, that of intermediate viewing and that of near viewing, of FIGS. 57 and 58, solid curves represent oblique astigmatic errors, and broken curves represent mean oblique errors. Incidentally, in the graphs of $\Delta S$ and the oblique astigmatic error and the mean oblique error in the cases of far viewing, of intermediate viewing and of near viewing, abscissas are represented in units of diopters.

As is seen or understood from these figures, in the case of the negative-refractive-power aspherical spectacle lenses of FIGS. 56, 57 and 58, similarly as in the case of the fourth embodiment, variation in the oblique astigmatic error due to the decentration is small in the vicinity of the optical axis (namely, a region in which the distance from the optical axis ranges from 5 to 10 mm) in comparison with the conventional negative-refractive-power aspherical spectacle lenses of FIGS. 68, 69 and 70.

Further, in the case of the negative-refractive-power aspherical spectacle lenses according to the tenth embodiment of the present invention, as is seen from these figures, there is very little mean oblique error at places located in the vicinity of the optical axis even if the places are off the optical axis thereof, similarly as in the case of the fourth embodiment, so that a deviation in the refractive power of the lens at the time of measuring the refractive power is small.

The following "TABLE 20" presents $\Delta S$ in the case of the negative-refractive-power aspherical spectacle lens of FIG. 56. Further, FIG. 59 illustrates $\Delta S$ caused in the proximity of the optical axis in the case of the negative-refractive-power aspherical spectacle lens of FIG. 56.

TABLE 20

| ρ (mm) | $\Delta S$ (in diopters) |
|---|---|
| 0.000 | 0.00000 |
| 0.899 | 0.00149 |
| 2.704 | 0.00420 |
| 4.071 | -0.00099 |
| 4.992 | -0.00992 |

As is shown in TABLE 20 and FIG. 59, the inequality (3) is satisfied in a region of 10-mm diameter from the optical axis.

Further, as is seen from TABLE 20 and FIG. 59, $\Delta S$ takes a positive value at least once at the distance ρ in the range:

$0<\rho \leq 5$ (mm). Moreover, $\Delta S$ takes a negative value in a peripheral portion of the lens.

Figure 60:
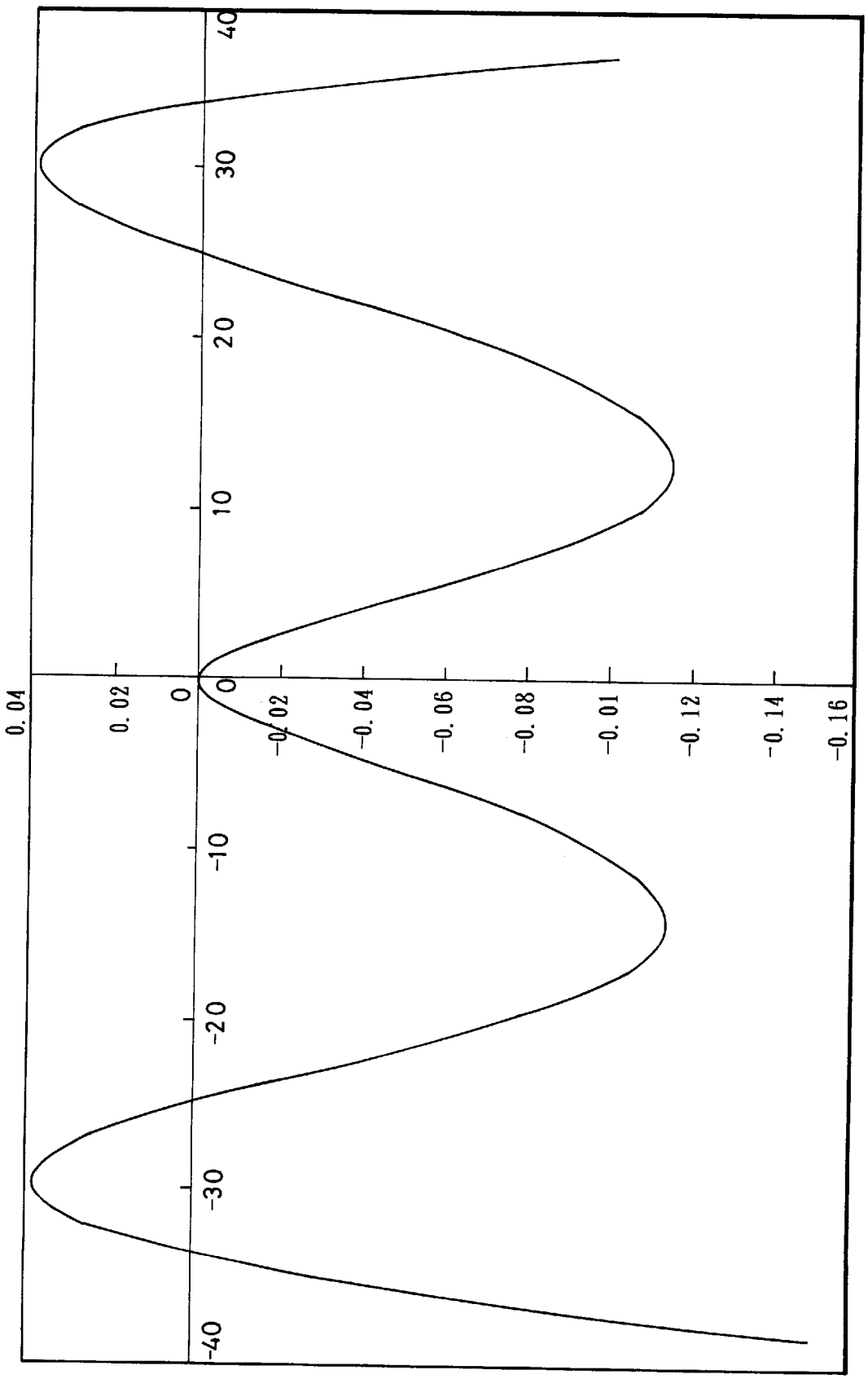
FIG. 60 is a graph for showing the oblique astigmatic error caused in the negative-refractive-power aspherical spectacle lens (namely, the tenth embodiment of the present invention)

FIG. 60 shows the oblique astigmatic error caused in the negative-refractive-power aspherical spectacle lens of FIG. 56. In FIG. 60, abscissas represent the distance from the optical axis thereof (in mm); and ordinates the oblique astigmatic error (in diopters).

As is seen from FIG. 60, in a region, which has a diameter of 40 mm, around the optical axis, in the far-viewing case, the oblique astigmatic error is within the range between ±0.15 (in diopters)

Figure 61:
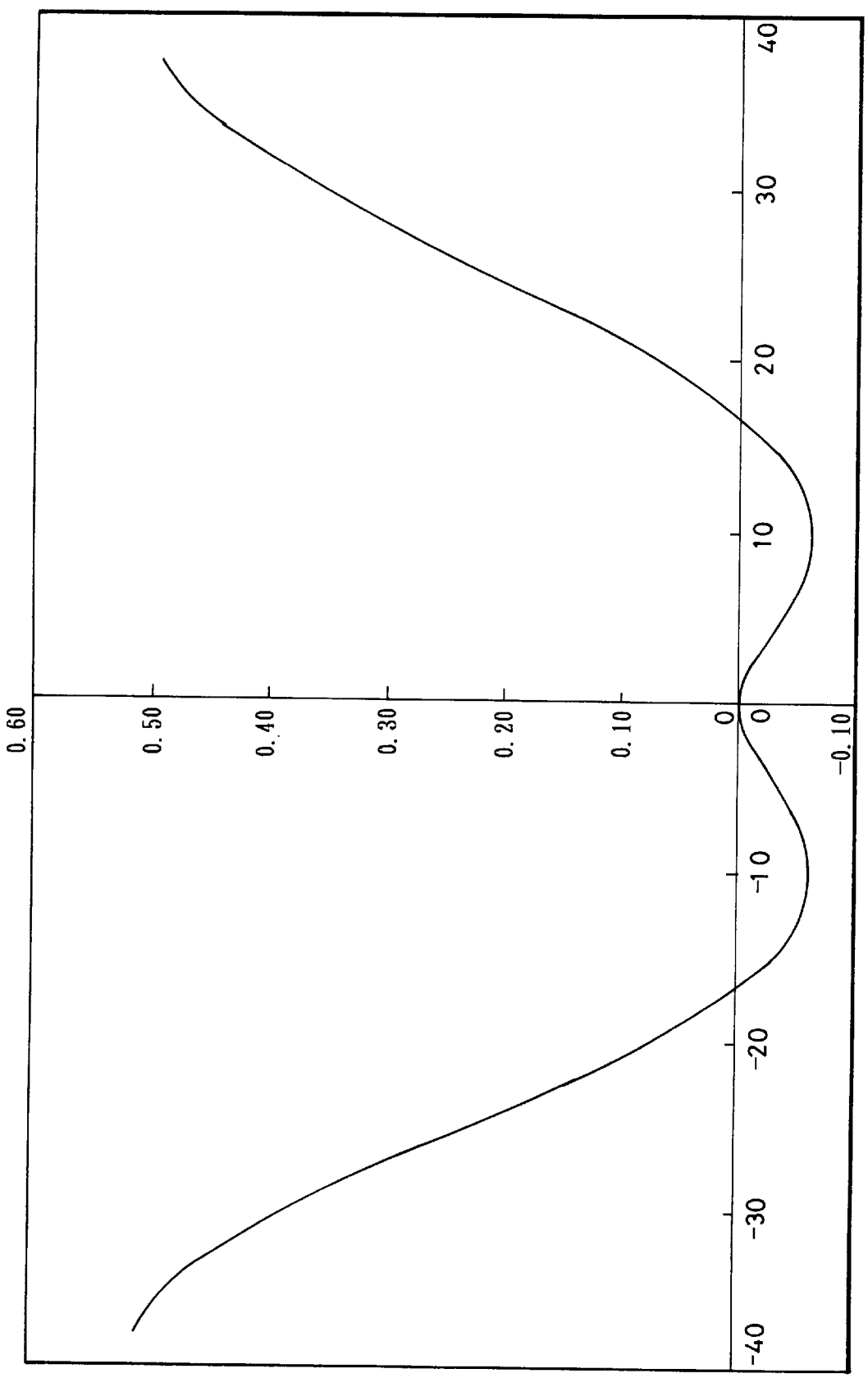
FIG. 61 is a graph for showing the mean oblique error caused in the negative-refractive-power aspherical spectacle lens (namely, the tenth embodiment of the present invention)

FIG. 61 is a graph for showing the mean oblique error caused in the negative-refractive-power aspherical spectacle lens of FIG. 56. In FIG. 61, abscissas represent the distance from the optical axis thereof (in mm); and ordinates the mean oblique error (in diopters).

As is seen from FIG. 61, in a region, which has a diameter of 30 mm, around the optical axis, in the far-viewing case, the mean oblique error is within the range between ±0.20 (in diopters)

As above described, in the case of the tenth embodiment, the second surface is determined as defined in the equation (4). Thus, the edge thickness of the lens is small in comparison with that of the conventional spherical lens. Moreover, the design of the lens is performed by taking the decentration into consideration. Consequently, the performance degradation due to the decentration is reduced.

Other Embodiments

In the case of the first to sixth embodiment of the present invention, both of the aspherical surface coefficients $A_2$ and $A_3$ are 0. However, these aspherical surface coefficients $A_2$ and $A3$ may have values which are other than 0.

Further, in the case of the aforesaid embodiments of the present invention, the lens shapes of the first and second refractive surfaces are defined by the equations (2) and (4). However, in the case of an aspherical spectacle lens of the present invention, other lens shapes may be employed as long as one or both of the first and second surfaces are defined by the equation (1)

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A single-vision aspherical spectacle lens comprising:
a pair of first and second refractive surfaces, at least one of which has an aspherical shape,
wherein at least one of the first refractive surface and the second refractive surface is defined by the following equation:

$$X(\rho) = \frac{C\rho^2}{1 + \sqrt{1 - C^2\rho^2 k}} + \sum_{i=1}^{n} A_{m_i}\rho^{m_i}$$

where mi designates a real number which is not less than 2; n is an integer which is not less than 1; X is a length of a perpendicular drawn from a point, which is positioned on the aspherical surface and is located at a distance $\rho$ from an optical axis, to a meridional plane, which contacts the aspherical surface at a vertex thereof; C is a curvature of a reference spherical surface at the vertex of the aspherical surface; k is a cone constant; and $A_{mi}$ is an aspherical coefficient of $\rho^{mi}$.

2. The aspherical spectacle lens according to claim 1, wherein the numbers n and mi take the following values:

$n=7$; $m1=2$; $m2=3$; $m3=4$; $m4=5$; $m5=6$; $m6=7$; and $m7=8$.

3. The aspherical spectacle lens according to claim 1, wherein the number mi is defined by:

$$mi = a + (i-1)b$$

where
$a > 2.0$
$b > 0$ but $b \neq$ an integer.

4. The aspherical spectacle lens according to claim 3, wherein the numbers a, b and n take the following values, respectively:

$a = 4.0$; $b = 0.7$; and $n = 4$.

5. The aspherical spectacle lens according to claim 1, wherein the first refractive surface thereof is defined by the equation, and in a case when a refractive power D (in diopters) thereof and the distance $\rho$ (in mm) meets the following conditions:

$-6.0 \leq D \leq 6.0$ and $0 < \rho \leq 5$, a meridional surface power $S(\rho)$ (in diopters) of the first refractive surface between the place at the distance $\rho$ and the vertex is defined by the equation $$s(\rho) = (n_e - 1) \frac{\frac{d^2 X}{d\rho^2}}{\left\{ 1 + \left( \frac{dX}{d\rho} \right)^2 \right\}^{3/2}}$$

where $n_e$ is a refractive index of the lens, and a difference $\Delta s$ $(= S(\rho) - S(0))$ satisfies the condition $-0.05 \leq \Delta S \leq 0.05$.

6. The aspherical spectacle lens according to claim 1, wherein the second refractive surface thereof is defined by the equation, and in a case when a refractive power D (in diopters) thereof and the distance $\rho$ (in mm) meets the following conditions:

$-6.0 \leq D \leq 6.0$ and $0 < \rho \leq 5$, a meridional surface power $S(\rho)$ (in diopters) of the first refractive surface between the place at the distance $\rho$ and the vertex is defined by the equation $$s(\rho) = (n_e - 1) \frac{\frac{d^2 X}{d\rho^2}}{\left\{ 1 + \left( \frac{dX}{d\rho} \right)^2 \right\}^{3/2}}$$

where $n_e$ is a refractive index of the lens, and a difference $\Delta s$ $(= S(\rho) - S(0))$ satisfies the condition $-0.05 \leq \Delta S \leq 0.05$.

7. The aspherical spectacle lens according to claim 1, wherein the first refractive surface thereof is defined by the equation, the second refractive surface thereof has a spherical shape, a refractive power thereof is positive, a difference $\Delta S(\rho)$ of the first refractive surface takes a positive value at least once in the following range of the distance $\rho$:

$$0<\rho\leqq 5 \text{ (mm), and}$$

the difference $\Delta S(\rho)$ of the first refractive surface takes a negative value in a peripheral portion of the lens.

8. The aspherical spectacle lens according to claim 1, wherein the first refractive surface thereof is defined by the equation, the second refractive surface thereof has a spherical shape, a refractive power thereof is negative, a difference $\Delta S(\rho)$ of the first refractive surface takes a negative value at least once in the following range of the distance $\rho$:

$$0<\rho\leqq 5 \text{ (mm), and}$$

the difference $\Delta S(\rho)$ of the first refractive surface takes a positive value in a peripheral portion of the lens.

9. The aspherical spectacle lens according to claim 1, wherein the first refractive surface thereof has a spherical shape, the second refractive surface thereof is defined by the equation, a refractive power thereof is positive, a difference $\Delta S(\rho)$ of the second refractive surface takes a positive value at least once in the following range of the distance $\rho$:

$$0<\rho\leqq 5 \text{ (mm), and}$$

the difference $\Delta S(\rho)$ of the second refractive surface takes a negative value in a peripheral portion of the lens.

10. The aspherical spectacle lens according to claim 1, wherein the first refractive surface thereof has a spherical shape, the second refractive surface thereof is defined by the equation, a refractive power thereof is negative, a difference $\Delta S(\rho)$ of the second refractive surface takes a negative value at least once in the following range of the distance $\rho$:

$$0<\rho\leqq 5 \text{ (mm), and}$$

the difference $\Delta S(\rho)$ of the second refractive surface takes a positive value in a peripheral portion of the lens.

11. The aspherical spectacle lens according to claim 1, wherein one of the first and second refractive surfaces is defined by the equation, and wherein curvature of a reference spherical surface at the vertex of the aspherical surface corresponding to the refractive surface defined by the equation is larger than that of a reference spherical surface at the vertex of the aspherical surface corresponding to the other refractive surface.

12. A single-vision aspherical spectacle lens comprising:
a pair of first and second refractive surfaces, at least one of which has an aspherical shape, wherein a lens shape thereof is determined in a design stage by taking decentration thereof into consideration.

13. The aspherical spectacle lens according to claim 12, wherein an initial shape of the aspherical spectacle lens is determined in the design stage, and wherein then, the shape of the lens is further determined by calculating at least one of an oblique astigmatic error and a mean oblique error in a case when no decentration occurs, and also calculating at least one of an oblique astigmatic error and a mean oblique error in a case when decentration occurs, through a ray tracing so that performance degradation due to decentration is small.

14. The aspherical spectacle lens according to claim 12, wherein the decentration in the design stage is in the following range:

$$0.04 \leqq (K/H) \leqq 0.08$$

where K designates a vertical change (mm and H is a maximum outside-diameter (mm).

* * * * *